US008086641B1

(12) United States Patent  
Carr

(10) Patent No.: US 8,086,641 B1
(45) Date of Patent: Dec. 27, 2011

(54) INTEGRATED SEARCH ENGINE DEVICES THAT UTILIZE SPM-LINKED BIT MAPS TO REDUCE HANDLE MEMORY DUPLICATION AND METHODS OF OPERATING SAME

(75) Inventor: David Walter Carr, Ontario (CA)

(73) Assignee: NetLogic Microsystems, Inc., Santa Clara, CA (US)

( * ) Notice: Subject to any disclaimer, the term of this patent is extended or adjusted under 35 U.S.C. 154(b) by 556 days.

(21) Appl. No.: 12/336,565

(22) Filed: Dec. 17, 2008

Related U.S. Application Data

(63) Continuation-in-part of application No. 11/963,041, filed on Dec. 21, 2007, now Pat. No. 7,953,721, which is a continuation-in-part of application No. 11/934,240, filed on Nov. 2, 2007.

(60) Provisional application No. 60/867,277, filed on Nov. 27, 2006.

(51) Int. Cl.
*G06F 7/00* (2006.01)
*G06F 17/30* (2006.01)
(52) U.S. Cl. .................. 707/797; 707/706
(58) Field of Classification Search .............. None
See application file for complete search history.

(56) References Cited

U.S. PATENT DOCUMENTS

| 4,464,650 A | 8/1984 | Eastman et al. |
| 4,606,002 A | 8/1986 | Waisman et al. |
| 5,228,115 A | 7/1993 | Natarajan |
| 5,430,869 A | 7/1995 | Ishak et al. |
| 5,446,887 A | 8/1995 | Berkowitz |
| 5,475,837 A | 12/1995 | Ishak et al. |
| 5,560,007 A | 9/1996 | Thai |
| 5,644,763 A | 7/1997 | Roy |
| 5,666,494 A | 9/1997 | Mote, Jr. |
| 5,758,024 A | 5/1998 | Alleva |
| 5,758,356 A | 5/1998 | Hara et al. |
| 5,787,430 A | 7/1998 | Doeringer et al. |
| 5,812,853 A | 9/1998 | Carroll et al. |
| 5,812,996 A | 9/1998 | Rubin et al. |
| 5,813,000 A | 9/1998 | Furlani |
| 5,822,749 A | 10/1998 | Agarwal |

(Continued)

FOREIGN PATENT DOCUMENTS

WO    WO 2004088548 A1    10/2004

OTHER PUBLICATIONS

Final Office Action dated Dec. 30, 2010 for U.S. Appl. No. 11/963,142.

(Continued)

*Primary Examiner* — Uyen Le
(74) *Attorney, Agent, or Firm* — Mahamedi Paradice Kreisman LLP; William L. Paradice, III

(57) ABSTRACT

An integrated search engine device evaluates span prefix masks for keys residing at leaf parent levels of a search tree to identify a longest prefix match to an applied search key. This longest prefix match resides at a leaf node of the search tree that is outside a search path of the search tree for the applied search key. The search engine device is also configured to read a bitmap associated with the leaf node to identify a pointer to associated data for the longest prefix match. The pointer has a value that is based on a position of a set bit within the bitmap that corresponds to a set bit within the span prefix mask that signifies the longest prefix match.

18 Claims, 45 Drawing Sheets

U.S. PATENT DOCUMENTS

| | | | |
|---|---|---|---|
| 5,897,655 | A | 4/1999 | Mallick |
| 5,918,245 | A | 6/1999 | Yung |
| 5,924,115 | A | 7/1999 | Von Herzen et al. |
| 6,035,326 | A | 3/2000 | Miles et al. |
| 6,041,053 | A | 3/2000 | Douceur et al. |
| 6,098,150 | A | 8/2000 | Brethour et al. |
| 6,115,792 | A | 9/2000 | Tran |
| 6,138,123 | A | 10/2000 | Rathbun |
| 6,219,662 | B1 | 4/2001 | Fuh et al. |
| 6,389,507 | B1 | 5/2002 | Sherman |
| 6,401,117 | B1 | 6/2002 | Narad et al. |
| 6,404,752 | B1 | 6/2002 | Allen, Jr. et al. |
| 6,421,730 | B1 | 7/2002 | Harad et al. |
| 6,430,527 | B1 | 8/2002 | Waters et al. |
| 6,441,053 | B1 | 8/2002 | Klein et al. |
| 6,460,112 | B1 | 10/2002 | Srinivasan et al. |
| 6,460,120 | B1 | 10/2002 | Bass et al. |
| 6,480,839 | B1 | 11/2002 | Whittington et al. |
| 6,490,592 | B1 | 12/2002 | St. Denis et al. |
| 6,522,632 | B1 | 2/2003 | Waters et al. |
| 6,526,055 | B1 | 2/2003 | Perlman et al. |
| 6,532,457 | B1 | 3/2003 | Tal et al. |
| 6,535,491 | B2 | 3/2003 | Gai et al. |
| 6,539,369 | B2 | 3/2003 | Brown |
| 6,553,370 | B1 | 4/2003 | Andreev et al. |
| 6,564,211 | B1 | 5/2003 | Andreev et al. |
| 6,611,832 | B1 | 8/2003 | van Lunteren |
| 6,614,789 | B1 | 9/2003 | Yazdani et al. |
| 6,633,865 | B1 | 10/2003 | Liao |
| 6,636,849 | B1 | 10/2003 | Tang et al. |
| 6,636,956 | B1 | 10/2003 | Venkatachary et al. |
| 6,662,287 | B1 | 12/2003 | Andreev et al. |
| 6,691,124 | B2 | 2/2004 | Gupta et al. |
| 6,694,323 | B2 | 2/2004 | Bumbulis |
| 6,697,276 | B1 | 2/2004 | Pereira et al. |
| 6,707,693 | B1 | 3/2004 | Ichiriu |
| 6,757,779 | B1 | 6/2004 | Nataraj et al. |
| 6,768,739 | B1 | 7/2004 | Kobayashi et al. |
| 6,778,530 | B1 | 8/2004 | Greene |
| 6,782,382 | B2 | 8/2004 | Lunteren |
| 6,831,850 | B2 | 12/2004 | Pereira et al. |
| 6,839,800 | B2 | 1/2005 | Stark |
| 6,859,455 | B1 | 2/2005 | Yazdani et al. |
| 6,868,414 | B2 | 3/2005 | Khanna et al. |
| 6,928,430 | B1 | 8/2005 | Chien et al. |
| 6,934,795 | B2 | 8/2005 | Nataraj et al. |
| 6,941,314 | B2 | 9/2005 | Andreev et al. |
| 6,944,709 | B2 | 9/2005 | Nataraj et al. |
| 6,963,868 | B2 | 11/2005 | Basso et al. |
| 7,007,027 | B2 | 2/2006 | Najork et al. |
| 7,016,904 | B1 | 3/2006 | Grove et al. |
| 7,017,021 | B2 | 3/2006 | Gupta et al. |
| 7,023,807 | B2 | 4/2006 | Michels et al. |
| 7,035,844 | B2 | 4/2006 | Andreev et al. |
| 7,047,317 | B1 | 5/2006 | Huie et al. |
| 7,062,499 | B2 | 6/2006 | Nehru et al. |
| 7,076,602 | B2 | 7/2006 | Stark et al. |
| 7,107,263 | B2 | 9/2006 | Yianilos et al. |
| 7,110,407 | B1 | 9/2006 | Khanna |
| 7,162,572 | B2 | 1/2007 | Somasundaram |
| 7,231,383 | B2 | 6/2007 | Andreev et al. |
| 7,246,198 | B2 | 7/2007 | Nataraj et al. |
| 7,257,530 | B2 | 8/2007 | Yin |
| 7,289,979 | B2 | 10/2007 | Wilson |
| 7,292,162 | B2 | 11/2007 | Samasundaram |
| 7,383,276 | B2 | 6/2008 | Lomet |
| 7,426,518 | B2 | 9/2008 | Venkatachary et al. |
| 7,437,354 | B2 | 10/2008 | Venkatachary et al. |
| 7,478,109 | B1 | 1/2009 | Panigrahy et al. |
| 7,571,156 | B1 | 8/2009 | Gupta et al. |
| RE40,932 | E | 10/2009 | Diede et al. |
| 7,603,346 | B1 | 10/2009 | Depelteau et al. |
| 7,653,619 | B1 | 1/2010 | Depelteau et al. |
| 7,697,518 | B1 | 4/2010 | De Wit |
| 7,725,450 | B1 | 5/2010 | Depelteau |
| 7,747,599 | B1 | 6/2010 | Depelteau |
| 7,805,427 | B1 | 9/2010 | Depelteau |
| 7,831,626 | B1 | 11/2010 | Depelteau |
| 7,953,721 | B1 | 5/2011 | Depelteau et al. ............ 707/3 |
| 2001/0043602 | A1 | 11/2001 | Brown |
| 2002/0089937 | A1 | 7/2002 | Venkatachary et al. |
| 2002/0116526 | A1 | 8/2002 | Brown |
| 2002/0146009 | A1 | 10/2002 | Gupta et al. |
| 2002/0147721 | A1 | 10/2002 | Gupta et al. |
| 2002/0152413 | A1 | 10/2002 | Waters et al. |
| 2002/0161969 | A1 | 10/2002 | Nataraj et al. |
| 2003/0009453 | A1 | 1/2003 | Basso et al. |
| 2003/0009466 | A1 | 1/2003 | Ta et al. |
| 2003/0093613 | A1 | 5/2003 | Sherman |
| 2003/0093646 | A1 | 5/2003 | Stark |
| 2003/0123397 | A1 | 7/2003 | Lee et al. |
| 2003/0123459 | A1 | 7/2003 | Liao |
| 2003/0163302 | A1 | 8/2003 | Yin |
| 2003/0182272 | A1 | 9/2003 | Leung et al. |
| 2003/0236793 | A1 | 12/2003 | Karlsson |
| 2004/0030686 | A1 | 2/2004 | Cardno et al. |
| 2004/0059731 | A1 | 3/2004 | Yianilos et al. |
| 2004/0062208 | A1 | 4/2004 | Brown et al. |
| 2004/0083336 | A1 | 4/2004 | Stark et al. |
| 2004/0109451 | A1 | 6/2004 | Huang et al. |
| 2004/0139274 | A1 | 7/2004 | Hui |
| 2004/0170379 | A1 | 9/2004 | Yao et al. |
| 2004/0193619 | A1 | 9/2004 | Venkatachary et al. |
| 2004/0205229 | A1 | 10/2004 | Stojancic |
| 2004/0249803 | A1 | 12/2004 | Vankatachary et al. |
| 2005/0091443 | A1 | 4/2005 | Hershkovich et al. |
| 2005/0131867 | A1 | 6/2005 | Wilson |
| 2005/0163122 | A1 | 7/2005 | Sahni et al. |
| 2005/0195832 | A1 | 9/2005 | Dharmapurikar et al. |
| 2006/0095439 | A1 | 5/2006 | Buchmann et al. |
| 2006/0167843 | A1 | 7/2006 | Allwright et al. |
| 2006/0259682 | A1 | 11/2006 | Somasundaram |
| 2007/0038626 | A1 | 2/2007 | Waters et al. |
| 2007/0276648 | A1 | 11/2007 | Andreev et al. |

OTHER PUBLICATIONS

Final Office Action dated Feb. 4, 2011 for U.S. Appl. No. 11/934,240.
Final Office Action dated Jan. 13, 2011 for U.S. Appl. No. 11/768,646.
Non-Final Office Action dated Dec. 30, 2010 for U.S. Appl. No. 11/963,041.
Non-Final Office Action dated Oct. 22, 2010 for U.S. Appl. No. 11/934,240.
Non-Final Office Action mailed Jul. 21, 2010 for U.S. Appl. No. 11/963,142.
Non-Final Office Action mailed Jun. 21, 2010 for U.S. Appl. No. 11/858,441.
Notice of Allowance mailed Jul. 13, 2010 for U.S. Appl. No. 11/864,290.
Answers.com, http://www.answers.com/topic/b-tree, B~tree: Information From Answers.com, Admitted prior art. 6 pages. printed Aug. 1, 2006.
B*-tree, http://en.wikipedia.org/wiki/B%2A-tree, Admitted prior art. 1 page. printed Sep. 15, 2006.
Canonical form http://en.wikipedia.org/wiki/Canonical_form, Admitted prior art, 1 page. printed Jul. 29, 2006.
Henry Hong-yi Tzeng, "Longest Prefix Search Using Compressed Trees", In Proceedings of IEEE Globe.com, 1998, 6 pages.
Kobayashi et al. "A Longest Prefix Match Search Engine for Multi-Gigabit IP Processing", C&C Media Research Laboratories, NEC Corporation 2000 IEEE. 13 pages.
Nasser Yazdani et al., "Prefix Trees: New Efficient Data Structures for Matching Strings of Different Lengths", IEEE, 2001, p. 76-85.
Network address processor makes embedded DRAM a virtue, http://www.electronicproducts.com/printasp?ArticleURL=oct12.oct2000, Printed Aug. 14, 2006, Admitted Prior Art, 1 page.
Srinivasan et al. "Fast Address Lookups Using Controlled Prefix Expansion" Washington University in St. Louis, ACM Sigmetrics '98/ Performance '98 Joint International Conference on Measurement and Modeling of Computer Systems. 40 pages.
Tree (data structure), http://en.wikipedia.org/wiki/Tree_data_structure, (Redirected from Tree data structure, Admitted prior art. 2 pages, printed Aug. 1, 2006.

Uga et al. "A fast and compact longest match prefix look-up method using pointer cache for very long network address", IT Network Service Systems Laboratories Midori 3-9-1 1, Musashino, Tokyo 180-8585, Japan, 1999 IEEE, 8 pages.
Final Office Action dated Sep. 23, 2010 for U.S. Appl. No. 11/963,041.
Microsoft Computer Dictionary, 2002, Microsoft Press, Fifth Edition, p. 329.
Non-Final Office Action dated Sep. 30, 2010 for U.S. Appl. No. 11/768,646.
Notice of Allowance mailed Sep. 22, 2010 for U.S. Appl. No. 11/858,441.
U.S. Appl. No. 11/858,441, filed Sep. 20, 2007.
U.S. Appl. No. 11/768,646, filed Jun. 26, 2007.
U.S. Appl. No. 11/864,290, filed Sep. 28, 2007.
Aggarwal et al. "A Model for Hierarchical Memory" *Proceedings of the Nineteenth Annual ACM Conference on Theory of Computing STOC* pp. 305-314 (1987).
Choudhury et al. "A New Buffer Management Scheme for Hierarchical Shared Memory Switches" *IEEE/ACM Transactions on Networking (TON)* 5(5):728-738 (1997).
Djordjevic et al. "A Hierarchical Memory System Environment" *Proceedings of the 1988 Workshop on Computer Architecture Education WCAE* (6 pages)(1998).
Lu et al., "A B-Tree Dynamic Router-Table Design", IEEE Transactions on Computers, 54:7, pp. 1-27, http://www.cise.uffedu/~sahn/papers/btree.pdf, (Jul. 2005).
Suri, et al., "Multiway Range Trees: Scalable IP Lookup with Fast Updates," http:/www.cs.edu/~varghese/Papers/globecome2001.pdf, Admitted Prior Art, 5 pages.
"B-Trees: Balanced Tree Data Structures," http://www.bluerwhite.org/btree/, Admitted Prior Art, Printed, 8 pages.
Chang et al., "Dynamic Routing Tables using Augmented Balanced Search Tree," National Cheng Kung University and I-Shou University, Admitted Prior Art, 35 pages.
O'Connor et al., "The iFlow Address Processor," 2001 IEEE, pp. 16-23.
Michael A. Bender et al., "Cache-oblivious B-trees", SIAM J. Comput, pp. 1-18 (2000).
R. Bayer et al., "Prefix B-Trees", ACM Trans. On Database Systems, vol. 2, No. 1, pp. 11-26 (Mar. 1977).
Non-Final Office Action mailed Apr. 27, 2010 for U.S. Appl. No. 11/963,041.
U.S. Appl. No. 11/184,243, filed Jul. 9, 2005, Depelteau, Gary.
U.S. Appl. No. 11/685,982, filed Mar. 14, 2007, Depelteau, Gary.
U.S. Appl. No. 11/934,240, filed Nov. 2, 2007, Depelteau, Gary.
U.S. Appl. No. 11/963,041, filed Dec. 21, 2007, Depelteau, Gary.
U.S. Appl. No. 11/963,142, filed Dec. 21, 2007, Depelteau, Gary.
Final Office Action dated Aug. 4, 2009 for U.S. Appl. No. 11/674,487, 22 pages.
Final Office Action dated Mar. 26, 2010 for U.S. Appl. No. 11/864,290.
Final Office Action dated 09/10/08 for U.S. Appl. No. 11/184,243, 15 pages.
Final Office Action dated Nov. 24, 2009 for U.S. Appl. No. 11/685,982, 20 pages.
Final Office Action dated Dec. 8, 2009 for U.S. Appl. No. 11/768,646, 13 pages.
Non-final Office Action dated Apr. 1, 2009 for U.S. Appl. No. 11/532,225, 8 pages.
Non-final Office Action dated Jun. 25, 2009 for U.S. Appl. No. 11/184,243, 15 pages.
Non-final Office Action dated Jun. 25, 2009 for U.S. Appl. No. 11/768,646, 12 pages.
Non-final Office Action dated Sep. 10, 2009 for U.S. Appl. No. 11/532,225, 8 pages.
Non-final Office Action dated Jul. 21, 2009 for U.S. Appl. No. 11/685,982, 20 pages.
Non-final Office Action dated Oct. 15, 2009 for U.S. Appl. No. 11/864,290, 15 pages.
Non-final Office Action dated Mar. 18, 2009 for U.S. Appl. No. 11/184,243, 15 pages.
Non-final Office Action dated Nov. 15, 2007 for U.S. Appl. No. 11/184,243, 18 pages.
Non-final Office Action dated Dec. 11, 2008 for U.S. Appl. No. 11/674,474, now Issued Patent 7,603,346, 22 pages.
Non-final Office Action dated Dec. 11, 2008 for U.S. Appl. No. 11/674,487, 23 pages.
Non-final Office Action dated Dec. 17, 2009 for U.S. Appl. No. 11/184,843, 18 pages.
Notice of Allowance dated Apr. 2, 2010 for U.S. Appl. No. 11/184,243.
Notice of Allowance dated Jan. 12, 2010 for U.S. Appl. No. 11/532,225, 6 pages.
Notice of Allowance dated Mar. 31, 2010 for U.S. Appl. No. 11/685,982.
Notice of Allowance dated Dec. 2, 2009 for U.S. Appl. No. 11/674,487, 11 pages.
Notice of Allowance dated Aug. 7, 2009 for U.S. Appl. No. 11/674,474, now Issued Patent 7,603,346, 13 pages.

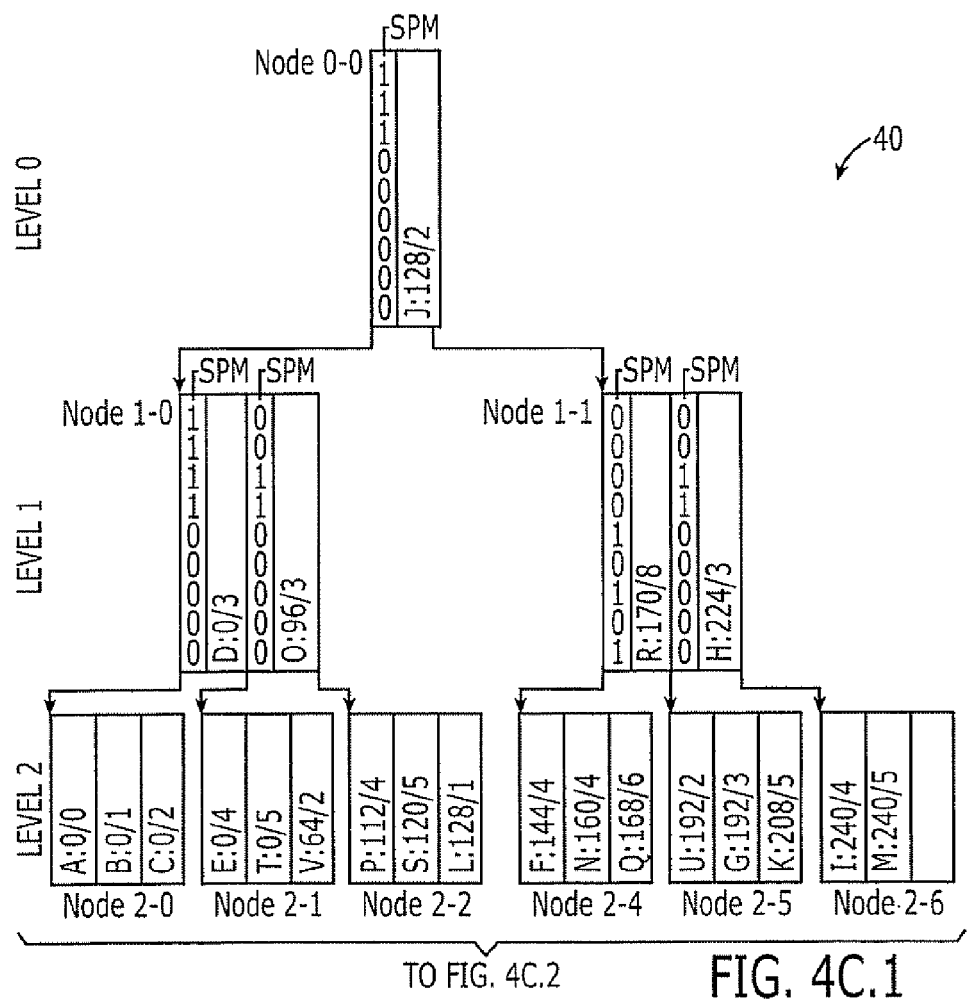
FIG. 4C.1

FROM FIG. 4C.1

| SPM Length | Handle Memory Level 0 | Node & Key | SPM Length | Handle Memory Level 1 | Node & Key | Key | Handle Memory Level 2 | Node |
|---|---|---|---|---|---|---|---|---|
| /0 | Handle A | | /0 | Handle A | | 0 | Handle A | |
| /1 | Handle L | | /1 | Handle B | | 1 | Handle B | 2-0 |
| /2 | Handle J | 0-0 | /2 | Handle C | 1-0 | 2 | Handle C | |
| /3 | | Key 0 | /3 | Handle D | Key 0 | | | |
| /4 | | | /4 | | | 0 | Handle E | |
| /5 | | | /5 | | | 1 | Handle T | 2-1 |
| /6 | | | /6 | | | 2 | Handle V | |
| /7 | | | /7 | | | | | |
| /8 | | | /8 | | | 0 | Handle P | |
| | | | /0 | | | 1 | Handle S | 2-2 |
| | | | /1 | | | 2 | Handle L | |
| | | | /2 | Handle V | | | | |
| | | | /3 | Handle O | 1-0 | 0 | Handle F | |
| | | | /4 | | Key 1 | 1 | Handle N | 2-4 |
| | | | /5 | | | 2 | Handle Q | |
| | | | /6 | | | | | |
| | | | /7 | | | 0 | Handle U | |
| | | | /8 | | | 1 | Handle G | 2-5 |
| | | | | | | 2 | Handle K | |
| | | | /0 | | | | | |
| | | | /1 | | | 0 | Handle I | |
| | | | /2 | | | 1 | Handle M | 2-6 |
| | | | /3 | | | 2 | | |
| | | | /4 | Handle N | 1-1 | | | |
| | | | /5 | | Key 0 | | | |
| | | | /6 | Handle Q | | | | |
| | | | /7 | | | | | |
| | | | /8 | Handle R | | | | |
| | | | /0 | | | | | |
| | | | /1 | | | | | |
| | | | /2 | Handle U | | | | |
| | | | /3 | Handle H | 1-1 | | | |
| | | | /4 | | Key 1 | | | |
| | | | /5 | | | | | |
| | | | /6 | | | | | |
| | | | /7 | | | | | |
| | | | /8 | | | | | |

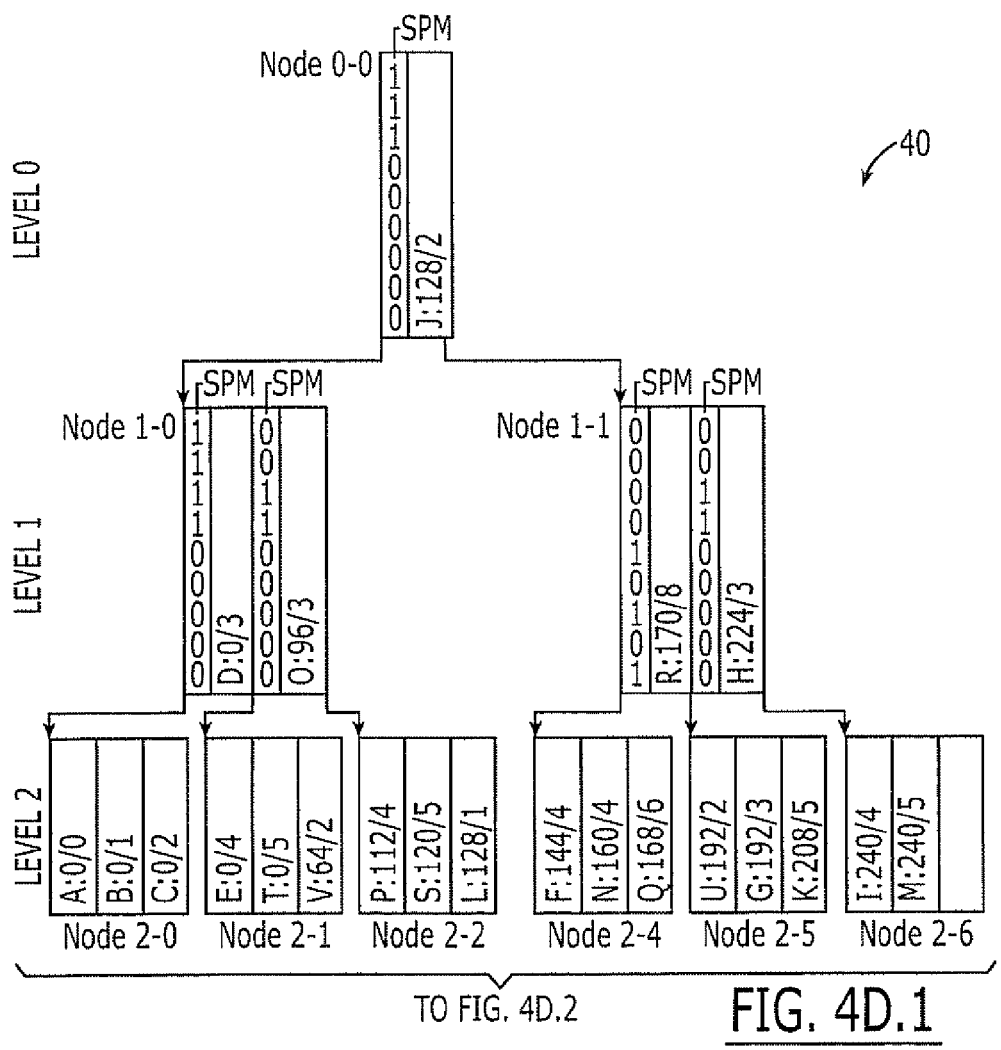
FIG. 4D.1

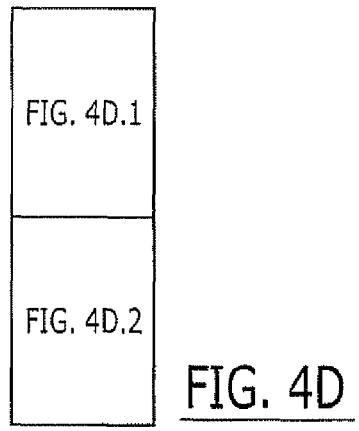
FIG. 4D
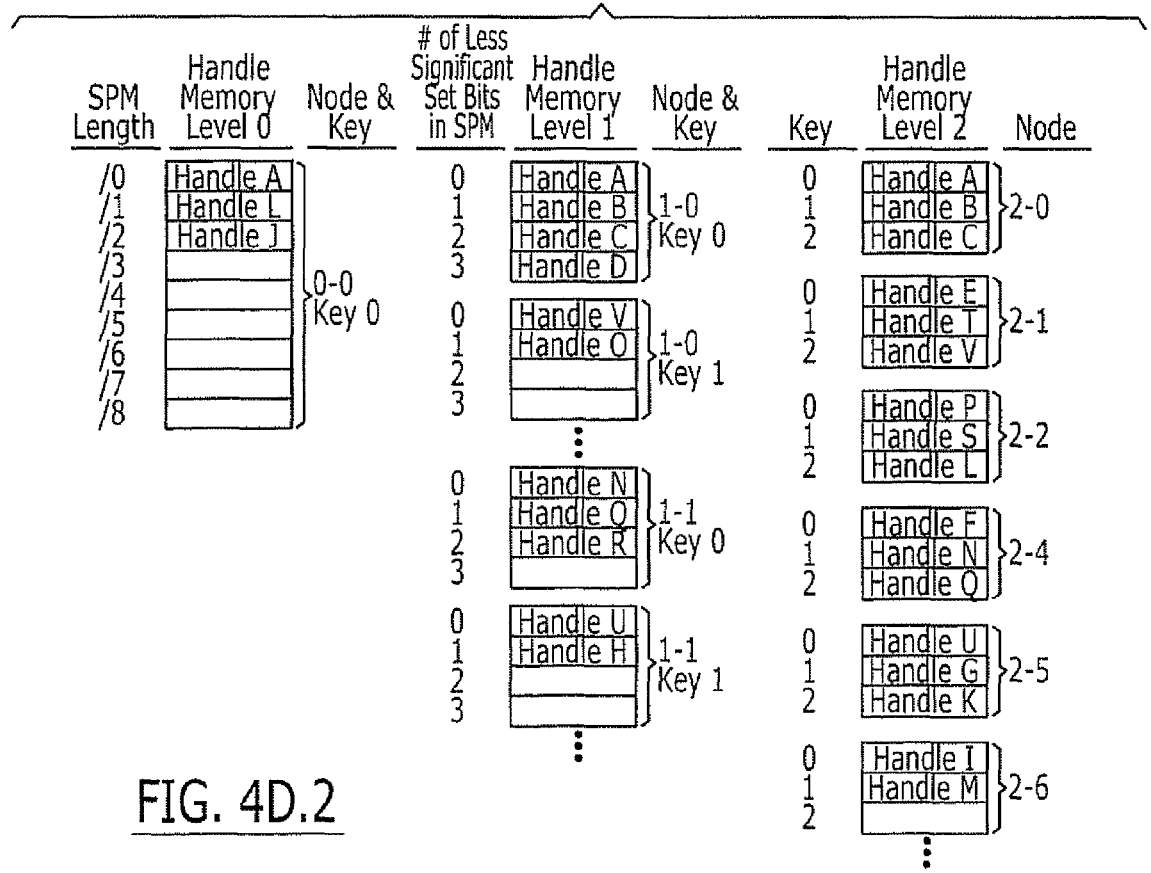
FIG. 4D.2

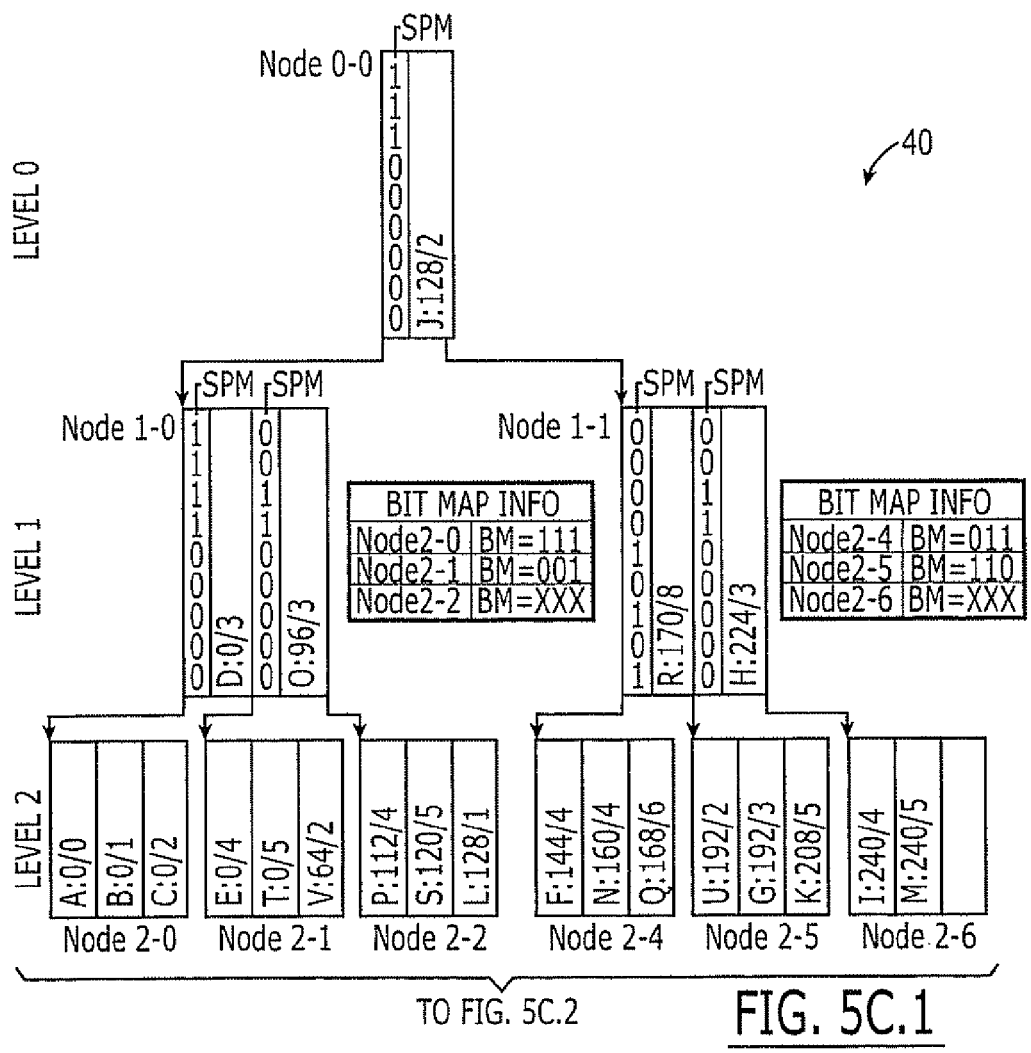
FIG. 5C.1

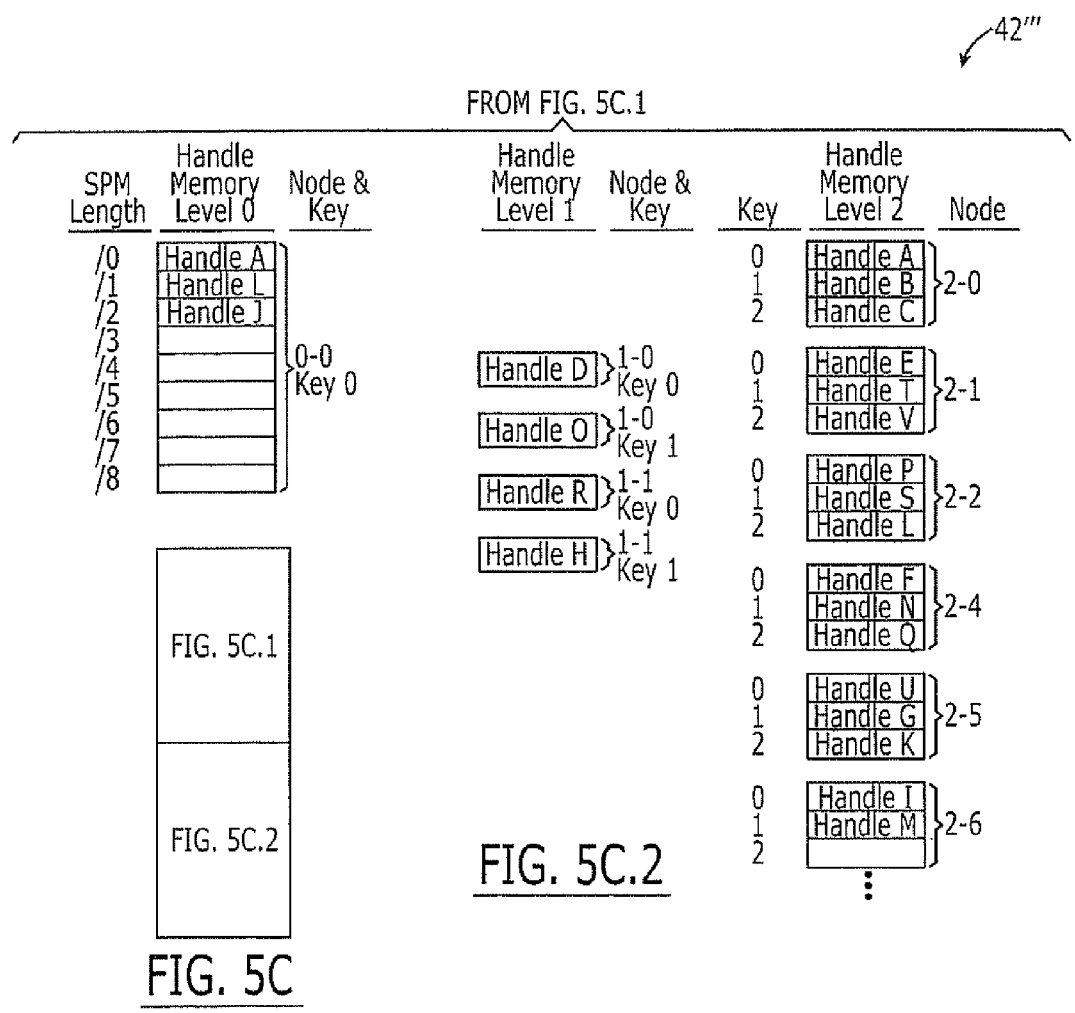

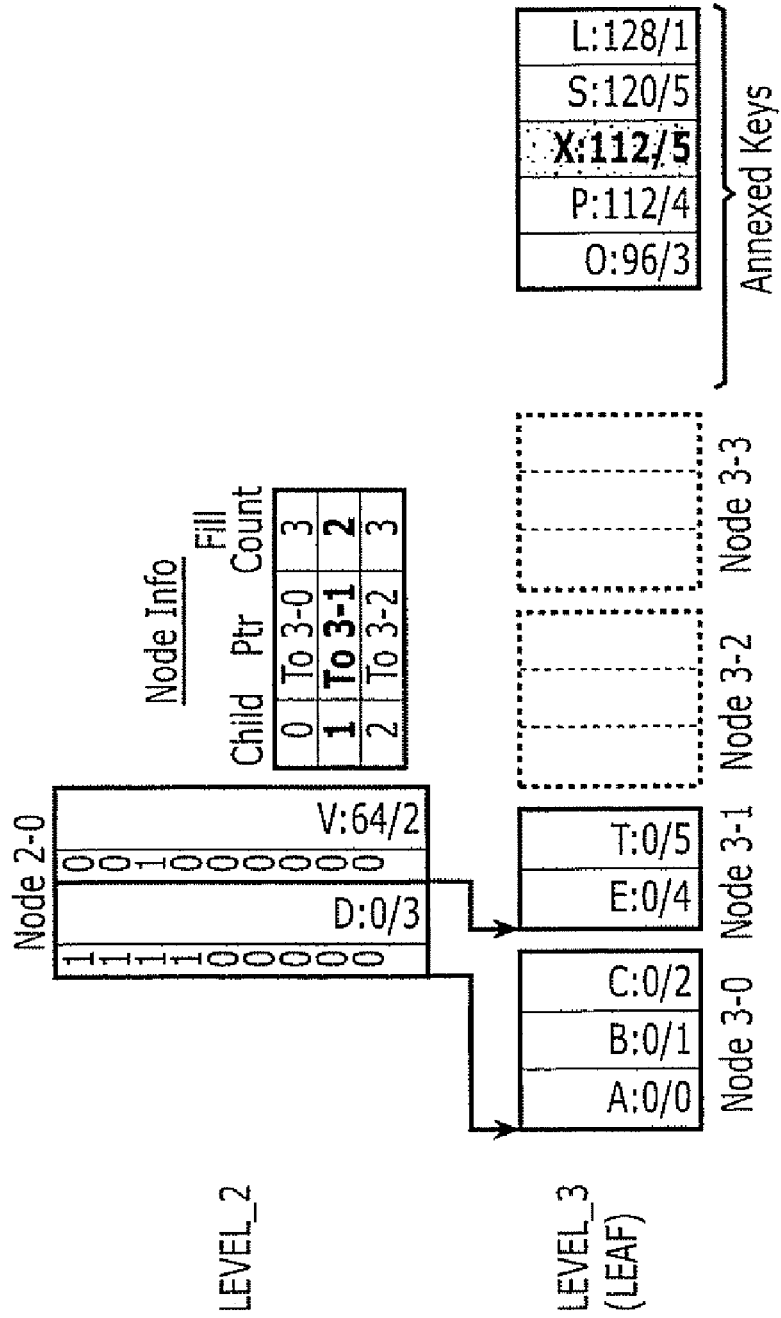

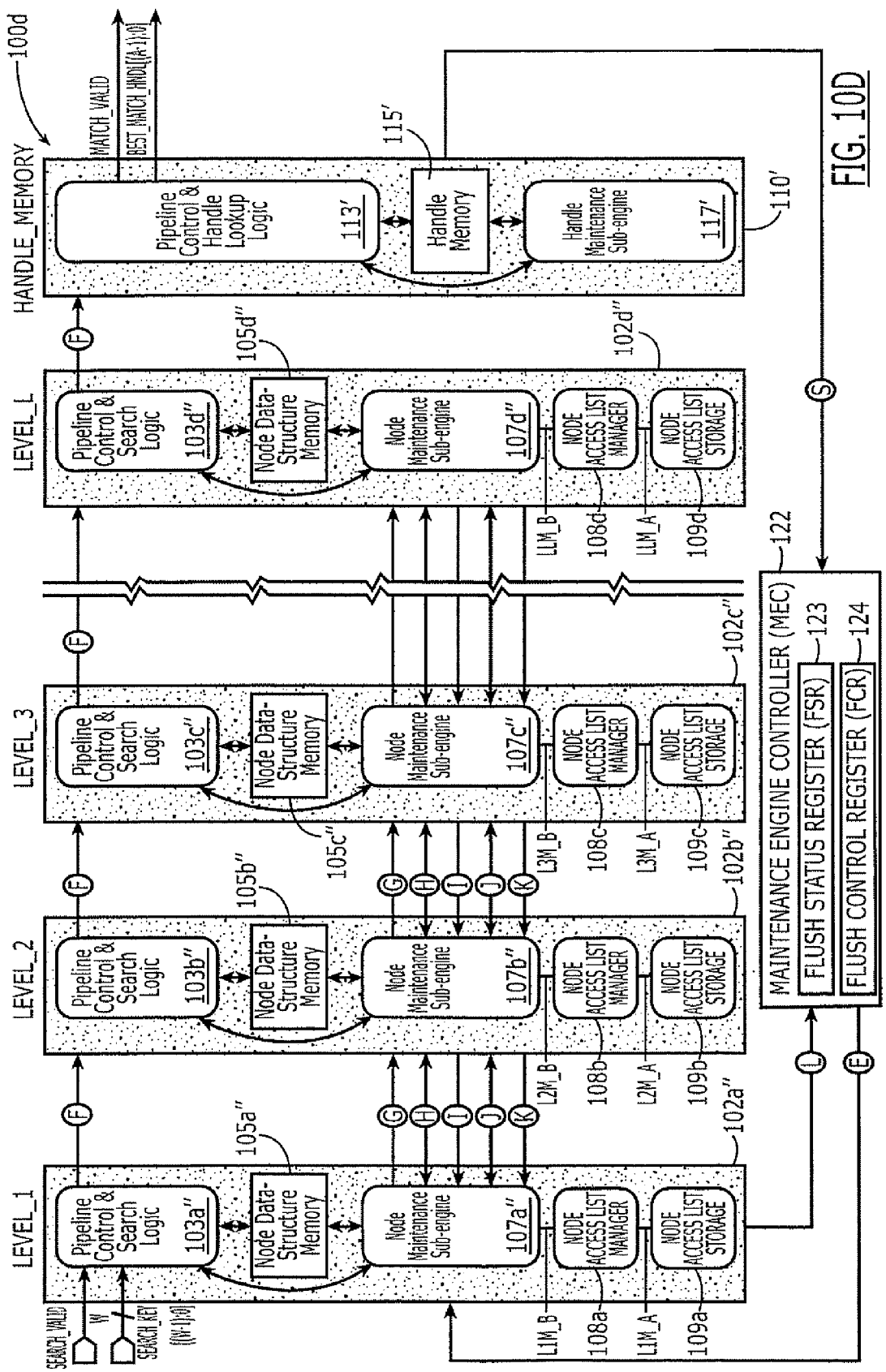

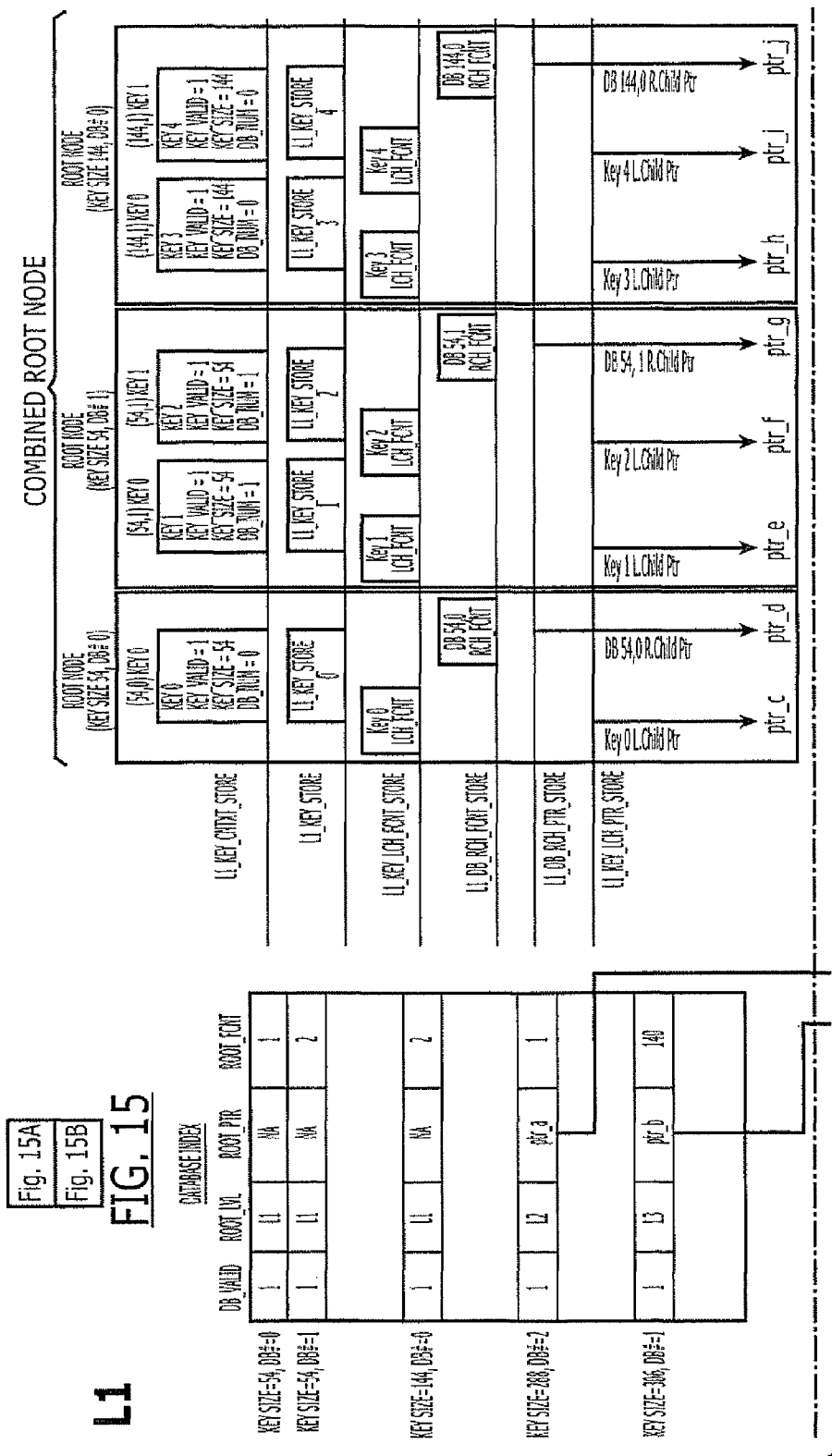

DATABASE INDEX

| | DB_VALID<44> | ROOT_LVL<43:42> | ROOT_PTR<41:29> | ROOT_FCNT<28:21> | PREF_LEN_0<20> | PREF_LEN_0_HNDL<19:0> |
|---|---|---|---|---|---|---|
| KEY SIZE=54, DB#=0 | 1 | L1 | NA | 1 | 1 | HNDL1 |
| KEY SIZE=54, DB#=1 | 1 | L1 | NA | 2 | 0 | NA |
| KEY SIZE=144, DB#=0 | 1 | L1 | NA | 2 | 0 | NA |
| KEY SIZE=288, DB#=2 | 1 | L2 | ptr_a | 1 | 1 | HNDL2 |
| KEY SIZE=306, DB#=1 | 1 | L3 | ptr_b | 140 | 0 | NA |

FIG. 17A

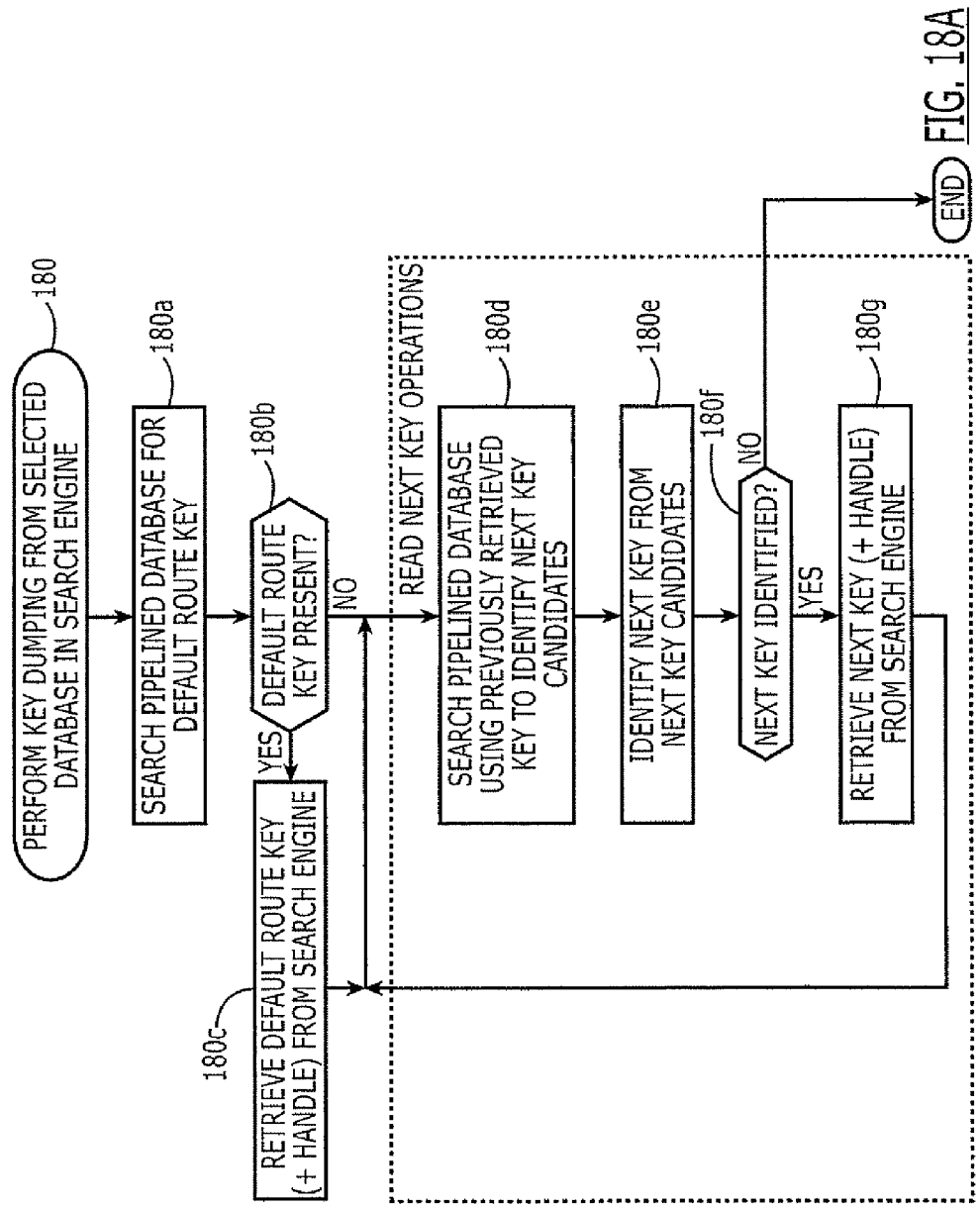

INTEGRATED SEARCH ENGINE DEVICES THAT UTILIZE SPM-LINKED BIT MAPS TO REDUCE HANDLE MEMORY DUPLICATION AND METHODS OF OPERATING SAME

REFERENCE TO PRIORITY APPLICATION

This application is a continuation-in-part of U.S. application Ser. No. 11/963,041, filed Dec. 21, 2007, now U.S. Pat. No. 7,953,721 which is a continuation-in-part of U.S. application Ser. No. 11/934,240, filed Nov. 2, 2007, now pending which claims priority to U.S. Provisional Application Ser. No. 60/867,277, filed Nov. 27, 2006, the disclosures of which are hereby incorporated herein by reference.

REFERENCE TO RELATED APPLICATION

This application is related to U.S. application Ser. No. 11/858,441, filed Sep. 20, 2007, now U.S. Pat. No. 7,831,626 entitled Integrated Search Engine Devices Having a Plurality of Multi-Way Trees of Search Keys Therein that Share a Common Root Node; U.S. application Ser. No. 11/768,646, filed Jun. 26, 2007, now pending entitled Integrated Search Engine Devices that Support LPM Search Operations Using Span Prefix Masks that Encode Key Prefix Length, and U.S. application Ser. No. 11/864,290, filed Sep. 28, 2007, now U.S. Pat. No. 7,805,427 entitled Integrated Search Engine Devices that Support Multi-Way Search Trees Having Multi-Column Nodes, the disclosures of which are hereby incorporated herein by reference.

FIELD OF THE INVENTION

The present invention relates to integrated circuit devices and, more particularly, to integrated circuit search engine devices and methods of operating same.

BACKGROUND OF THE INVENTION

Linear sorting techniques may be utilized to arrange a plurality of search prefixes (a/k/a search "keys") within an integrated circuit search engine device. One such linear sorting technique is based on the starting address of a prefix range associated with each search prefix. In the event a plurality of the search prefixes have the same starting address but different prefix lengths, then a search prefix with a shorter prefix length may be treated as being "less than" a search prefix with a longer prefix length. One example of a plurality of 8-bit search prefixes is illustrated by TABLE 1.

The search prefixes in TABLE 1 may be sorted linearly by prefix value and prefix length, as shown in FIG. 1, with the smallest search prefix (e.g., A:0/0) located on the left side of the array 10 and the largest search prefix (e.g., M:240/5) located on the right side on the array 10. To perform a linear search (i.e., lookup) operation, an applied search key is compared with every search prefix in the array 10, starting with the search prefix on the left side of the array 10, until a search prefix is found with a start address that is greater than the applied search key. Each search prefix in the array 10 that matches the applied search key is a potential longest prefix match. Once the search operation terminates at the right side of the array 10 (or at a search prefix with a start address than is greater than the applied search key), the rightmost search prefix that matches the search key is treated as the longest prefix match (LPM).

TABLE 1

| ID | KEY | ID | KEY | ID | KEY |
|----|-----|----|-----|----|-----|
| A  | 0/0 | I  | 240/4 | Q | 168/6 |
| B  | 0/1 | J  | 128/2 | R | 170/8 |
| C  | 0/2 | K  | 208/5 | S | 120/5 |
| D  | 0/3 | L  | 128/1 | T | 0/5 |
| E  | 0/4 | M  | 248/5 | U | 192/2 |
| F  | 144/4 | N | 160/4 | V | 64/2 |
| G  | 192/3 | O | 96/3 |   |   |
| H  | 224/3 | P | 112/4 |   |   |

This search operation is an iterative process, with each search prefix being compared in sequence with the applied search key. As illustrated by FIG. 2, this process can also be implemented in a hardware-based array 20, by simultaneously comparing the applied search key (e.g., 171) to all of the search prefixes within the array 20, using a plurality of comparators 22 that generate match and non-match signals. In particular, each match between the applied search key and a search prefix results in the generation of a match signal (M) and each non-match results in the generation of a "less than" signal (LT) or a "greater than" signal (GT). The comparators 22 may generate these signals as two-bit binary signals (e.g., M=11b, LT=01b, and GT=10b). The longest prefix match is represented by the search prefix associated with the rightmost match signal M, which in FIG. 2 is represented by the search prefix Q:168/2. This longest prefix match may be identified using a priority encoder (not shown) that is configured to receive the signals generated by the comparators 22.

Conventional network routing applications may also utilize tree data structures to support search operations within an integrated circuit device. These tree data structures may include b-tree structures that are kept balanced to prevent one or more branches of the tree from becoming longer that other branches of the tree and thereby increasing search latency. FIG. 3 illustrates a three-level b-tree data structure 30 containing the search prefixes of TABLE 1 and the array 20 of FIG. 2. This b-tree 30 is illustrated as including six leaf nodes at Level 2 (i.e., Nodes 2-0, 2-1, 2-2, 2-4, 2-5 and 2-6), two leaf nodes at Level 1 (Node 1-0 and 1-1) and a root node at Level 0 (Node 0-0).

As illustrated by the highlighted search path, a search of the b-tree using 171 as an applied search key begins at Node 0-0. The search prefix J at Node 0-0 represents a match with the search key 171 because 171 (i.e., 10101011b) is a match with 128/2 (i.e., 10XXXXXX), where X represents a "don't-care" value. The search then proceeds to Node 1-1 (i.e., along a right-side branch from Node 0-0 to Node 1-1) because 171 is greater than 128. No matches are present at Node 1-1 because the search key 171 (i.e., 10101011b) does not match either the search prefix R: 170/8 (10101010b) or the search prefix H:224/3 (i.e., 111XXXXX) Because the search key 171 is greater than 170 and less than 224, the search then proceeds to and terminates at Node 2-5, which is a leaf node of the b-tree 30. None of the search prefixes U:192/2, G:192/3 or K:208/5 at Node 2-5 represent a match with the search key 171. Thus, based on the illustrated search path, which traverses Nodes 0-0, 1-1 and 2-5 of the b-tree 30, only search prefix J:128/2 represents a matching entry within the search key 171. However, as illustrated best by FIG. 2, the search prefix Q:168/6, which resides at Node 2-4 of FIG. 3, actually represents the longest prefix match with the search key 171, yet this search prefix was not within the search path and was not detected during the search operation. Moreover, the search prefixes A:0/0, L:128/1 and N:160/4 also represent matches that were not within the search path. This means that the conventional sorting of prefixes within the b-tree 30 of FIG. 3 will not yield correct results for all applied search keys.

Another example of a b-tree data structure is described in U.S. Pat. No. 6,490,592, which is assigned to Nortel Networks Limited. As described at Col. 1 of the '592 patent, conventional b-tree data structures may not be well suited for search operations that require identification of longest prefix matches (LPMs) within the b-tree data structure. To address this limitation, the '592 patent describes a modified b-tree data structure that is arranged so that data elements stored therein, which have no overlapping prefixes, are arranged in a standard b-tree structure. However, other data elements that have overlapping prefixes are arranged in a modified structure so that the prefix of such a data element contains the prefixes of all such data elements that succeed it in the b-tree. This modified structure is referred to as an L-structure. FIG. 3 of the '592 patent shows portions 300 and 340 that includes a b-tree into which an L-structure 320 is inserted. Unfortunately, the use of L-structures within a b-tree may represent a form of prefix nesting that reduces a likelihood of achieving ideal b-tree properties that typically reduce search latency and result in efficient utilization of memory space. In particular, for a fixed memory capacity and latency, which is related to tree height, the number of search prefixes that can be supported within the b-tree of the '592 patent is statistically dependent on the degree of nesting within the prefix data set supported by the b-tree. Accordingly, prefix data sets that require a high degree of nesting may result in an inefficient utilization of the memory space that is required to maintain the b-tree.

A network address processor that supports longest prefix match lookup operations is disclosed in U.S. Pat. No. 7,047, 317 to Huie et al. In particular, FIGS. 2-3 of the '317 patent illustrate a lookup engine that supports an M-way tree data structure. This data structure includes a plurality of lookup tables, with each lower stage table providing an index to a key within a next higher stage table.

An additional type of b-tree data structure includes a b*tree data structure, which can require non-root nodes to be at least ⅔ full at all times. To maintain this fill requirement, a sibling node is not immediately split whenever it is full. Instead, keys are first shared between sibling nodes before node splitting is performed. Only when all sibling nodes within a group are full does a node splitting operation occur upon insertion of a new search key. FIG. 12 illustrates a conventional three-level b*tree data structure. These three levels are illustrated as L0, L1 and L2, where L0 is treated as the root level and L2 is treated as a leaf level. Level L1 is an intermediate level, which is a child relative to the root level and a parent relative to the leaf level. As will be understood by those skilled in the art, a b*tree of type N:(N+1) (i.e., 2:3, 3:4, 4:5, . . . ) requires all non-root nodes to be between N/(N+1) and 100% capacity (i.e., 67%, 75%, 80%, . . . up to 100%) before and after an insert or delete operation has been fully performed. The b*tree of FIG. 12 is a 3:4 tree, with four key locations per node (i.e., M=4).

FIG. 13A illustrates a portion of a b*tree with excess capacity having three sibling nodes at a leaf level and a parent node (at the root level) containing the search keys A-K, which represent numeric search key values. The leftmost sibling node contains the search keys A, B and C, the middle sibling node contains the search keys E, F and G and the rightmost sibling node contains the search keys I, J and K. The parent node contains the search keys D and H. These sibling nodes are at 75% capacity, which meets the requirement that all non-root nodes be between N/(N+1) and 100% capacity for a 3:4 type b*tree, where N=3. As illustrated by FIG. 13B, an insertion of the key L into the b*tree of FIG. 13A increases the rightmost sibling node to full capacity without affecting the other two sibling nodes. The additional insertion of key M into the rightmost sibling node in the b*tree of FIG. 13B causes the transfer of key I to the parent node and the transfer of key H from the parent node to the middle sibling node, as illustrated by FIG. 13C.

FIG. 13D illustrates the further insertion of node N into the rightmost sibling node, which causes an overflow that ripples through the parent and middle sibling nodes into the leftmost sibling node, which is now at full capacity. In FIG. 13E, a split between the sibling nodes and an increase in population of the parent node occurs in response to the further insertion of key O into the rightmost sibling node. This split from three to four sibling nodes is necessary to maintain a capacity of all non-root nodes in a range from 75% to 100% capacity, for N=3.

FIGS. 14A-14D illustrate three insertion examples that result in the splitting of sibling nodes having no excess capacity. As illustrated by FIG. 14A, the insertion of any additional key (#) into a b*tree with sibling nodes at full capacity results in a split among the sibling nodes and a repopulation of these nodes at equivalent levels (shown at 75%). In FIG. 14B, the insertion of key D+ into the leftmost sibling node results in a split that causes keys D, G and K to move to the parent node (displacing keys E and J) and a grouping of keys D+, E and F together in a sibling node. In FIG. 14C, the insertion of key I+ into the middle sibling node results in a split that causes keys D, H and K to move to the parent node (displacing keys E and J) and a grouping of keys I, I+ and J together in a sibling node. Finally, in FIG. 14D, the insertion of key N+ into the rightmost sibling node results in a split that causes keys D, H and L to move to the parent node (displacing keys E and J) and a grouping of keys M, N and N+ together in a rightmost sibling node. Thus, as illustrated by FIGS. 14B-14D, the value of the search key to be inserted into sibling nodes having no excess capacity influences the nature of the overflow and regrouping of keys during an operation to split the sibling nodes. This means that conventional hardware to perform insert operations may need to account for every possible insert location amongst the plurality of sibling nodes.

SUMMARY OF THE INVENTION

A search engine device according to some embodiments of the present invention includes a hierarchical memory that is configured to store a b-tree of search prefixes and span prefix masks (SPMs) therein. Some of these SPMs are evaluated during each search operation. SPMs serve to identify search prefixes that match an applied search key, yet reside at nodes of the b-tree that are not traversed during the search operation (e.g., lie lower and left of the search path). Such matches are typically referred to as longest prefix matches (LPMs). The search engine device also includes handle memory. This handle memory may be configured to support a respective handle memory block for each search prefix within each of a plurality of nodes of the b-tree that reside at a leaf parent level within the b-tree. Each of these handle memory blocks may have sufficient capacity to support one result handle per bit within a span prefix mask associated with a corresponding search prefix. In other cases, each of these handle memory blocks may have sufficient capacity to support only M+1 handles, where M is a positive integer corresponding to a quantity of search prefixes supported by each of a plurality of leaf nodes within the b-tree.

An additional embodiment of the present invention includes a pipelined search engine device having at least one storage device therein. This storage device is configured to support a tree data structure having at least a first search prefix and at least a first span prefix mask therein that supports LPM operations. This first span prefix mask has a value that encodes an identity of at least a second search prefix in the tree data structure that is a prefix match to the first search prefix. This encoding of the identity is based on positions of "set" bits within the first span prefix mask.

Still further embodiments of the present invention include methods of searching a b-tree of search prefixes within a hierarchical memory. These methods include evaluating span prefix masks (SPMs) associated with each of a plurality of search prefixes located at first nodes within the b-tree during a search operation. This evaluating step is performed to identify search prefixes that match an applied search key yet reside at nodes of the b-tree that are not traversed during the search operation. In this manner, search prefixes that represent longest prefix matches (LPMs) can be identified in situations where a conventional b-tree search operation would not correctly detect a longest prefix match (LPM). These span prefix masks may be configured so that each bit of the mask that has been set operates to identify a respective search prefix within the b-tree. In particular, each bit of a first one of the span prefix masks that has been set identifies a respective search prefix within the b-tree having a value that is less than a value of the search prefix to which the first one of the span prefix masks corresponds.

Additional embodiments of the present invention include an integrated search engine having a hierarchical memory therein that is configured to support a plurality of multi-way trees of search keys. These multi-way trees, which share a common root node within the hierarchical memory, support respective databases of search keys. In addition, the child pointers associated with each database within the common root node may be allocated at a single key level of granularity. This means that each search key within the common root node may be associated with a pair of child pointers to lower nodes within the hierarchical memory whenever each search key within the common root node is associated with a different multi-way tree of search keys.

In particular, the search engine is configured so that a number of child pointers associated with the common root node varies in proportion to the number of search keys supported by the common root node and the number of databases associated with these root node search keys. The search engine may also be configured to support multiple databases of search keys that are organized as respective multi-way trees having different tree heights. In this case, the databases having tree heights less than a maximum tree height supported by the search engine have respective root nodes located beneath the common root node in the hierarchical memory. According to further aspects of these embodiments, the key storage associated with the common root node is provided by flip-flops and the key storage associated with any root node of a tree that is located below a highest level of the hierarchical memory is provided by row addressable random access memory. The hierarchical memory may also be configured to support a database index table, which stores root node pointers for databases having root nodes located below the highest level of the hierarchical memory.

Still further embodiments of the present invention include methods of operating a search engine device by repeatedly reading next keys (and associated handles) from a database within the search engine device in order to identify and transfer some or possibly all of the contents of the database to another device (e.g., command host) requesting the database contents. According to these embodiments, an operation to read a next key includes: (i) searching a pipelined database within the search engine device with a first key to identify at least one key therein that is greater than the first key and then (ii) executing a next key fetch operation in the pipelined database to identify the next key from the at least one key. The next key and a handle associated with the next key are then retrieved from the search engine device (e.g., transferred to a command host).

In particular, the operation to read the next key may include searching the pipelined database within the search engine device with a first key to identify a respective next key candidate that is greater than the first key at each of a plurality of levels of the pipelined database. In addition, the next key fetch operation may include identifying the next key as the next key candidate located at a lowest level of the pipelined database containing a net key candidate. These next key read operations may have lower priority relative to other higher priority operations, such as search operations. Accordingly, the operation to search the pipelined database to determine a next key may be held in an instruction queue until an idle cycle within the search engine device is detected. Upon detection, the idle cycle may be replaced with the next key search operation. Similarly, a next key fetch operation may be held in the queue until an idle cycle is detected.

According to further embodiments of the invention, the next key fetch operation may be preceded by operations to generate ready messages that pass upstream through the pipelined stages of the search engine device. In particular, a ready message may be passed from a second level of the pipelined database to an immediately next higher first level of the pipelined database in response to storing a next key candidate at the second level of the pipelined database. Thereafter, the next key fetch operation may include passing a first next key candidate from the first level of the pipelined database to the second level of the pipelined database. Then, if a second next key candidate is stored at the second level of the pipelined database, the first next key candidate received by the second level may be dropped from further transfer and the second next key candidate may be passed to an immediately next lower third level of the pipelined database. Alternatively, if a second next key candidate is not stored at the second level of the pipelined database, then the first next key candidate received by the second level may be further passed from the second level of the pipelined database to the third level of the pipelined database.

Methods of operating a search engine device according to further embodiments of the invention include sequentially dumping a plurality of keys from a pipelined database within the search engine device by performing the following step: (a) searching the pipelined database with a previously retrieved key from the pipelined database to identify a next one of the plurality of keys from the pipelined database that is greater than or less than the previously retrieved key. Thereafter, step (b) includes retrieving the next one of the plurality of keys identified in step (a) from the search engine device. Steps (a) and (b) are then repeated in sequence at least once using the next one of the plurality of keys retrieved in step (b) as the previously retrieved key in the following step (a). According to these embodiments of the invention, step (a) includes searching the pipelined database with a previously retrieved key from the pipelined database to identify a plurality of next key candidates at respective levels of the pipelined database that are greater than or less than the previously retrieved key. Step (b) includes retrieving the next one of the plurality of keys as the smallest valued one of the plurality of next key candidates identified in step (a).

In still further embodiments of the invention, an integrated search engine device is provided that contains a pipelined arrangement of a plurality of search and tree maintenance sub-engines therein. This pipelined arrangement of sub-engines includes a hierarchical memory, which is configured to store a plurality of databases of search prefixes. These databases are arranged as a corresponding plurality of multi-way trees that span multiple levels of the hierarchical memory. The plurality of search and tree maintenance sub-engines are configured to respond to a database flush command by redesignating active nodes of a selected database within the hierarchical memory as free nodes using downstream and upstream communications between the plurality of search and tree maintenance sub-engines. These upstream communications include a maintenance ready message that signifies when a search and tree maintenance sub-engine issuing the maintenance ready message and all lower search and tree maintenance sub-engines within the search engine device have redesignated their corresponding active nodes within the selected database as free nodes. These upstream communications can be passed between the sub-engines without limiting a search bandwidth of the search engine device.

According to these embodiments, each of the plurality of search and tree maintenance sub-engines responds to a database flush command by reading through node locations in its respective node access list and then returning node locations assigned to the selected database to a free list by updating its respective node access list to reflect a removal of the selected database from the search engine device. Moreover, the highest level one of the plurality of search and tree maintenance sub-engines is further configured to respond to the database flush command by updating a value of a root node pointer associated with the selected database. In particular, the highest level one of the plurality of search and tree maintenance sub-engines may be configured to respond to the database flush command by updating entries within a database index table that are associated with the selected database.

Methods of operating search engine devices according to additional embodiments of the invention include evaluating a span prefix mask (SPM) for a key residing at leaf parent level of a search tree to thereby identify a prefix match to an applied search key that resides at a leaf node of the search tree that is outside a traversal path of the search tree for the applied search key. An operation is also performed to read a bitmap associated with the leaf node from memory during a traversal of a node at the leaf parent level. This reading of a bitmap is performed to identify a pointer to associated data (e.g., handle) for the prefix match. This pointer has a value that is based on a position of a set bit within the bitmap that corresponds to a set bit within the span prefix mask that signifies the prefix match. According to some of these embodiments of the invention, the reading of a bitmap is followed by a reading a handle for the prefix match from handle memory in the event the prefix match is a longest prefix match that resides outside the traversal path of the search tree for the applied search key. The reading of the bitmap may also be followed by passing the pointer from a leaf parent level of the search tree to a leaf level of the search tree.

These operations may also be performed by an integrated search engine device, which includes a pipelined arrangement of a plurality of search and tree maintenance sub-engines. This pipelined arrangement may include a hierarchical memory that is configured to store a plurality of databases of keys therein, which are arranged as a corresponding plurality of search trees that span multiple levels of the hierarchical memory. The plurality of search and tree maintenance sub-engines is configured to evaluate a span prefix mask for a key residing at leaf parent level of a search tree to identify a prefix match to an applied search key that resides at a leaf node of the search tree that is outside a traversal path of the search tree for the applied search key. The plurality of search and tree maintenance sub-engines is further configured to read a bitmap associated with the leaf node to identify a pointer to associated data for the prefix match. The pointer has a value that is based on a position of a set bit within the bitmap that corresponds to a set bit within the span prefix mask that signifies the prefix match.

BRIEF DESCRIPTION OF THE DRAWINGS

FIG. 4C illustrates the three-level b-tree data structure of FIG. 4A along with a diagram that illustrates an allocation of handle memory to support the corresponding b-tree data structure.

FIG. 4D illustrates the three-level b-tree data structure of FIG. 4A along with a diagram that illustrates an alternative allocation of handle memory to support the corresponding b-tree data structure when M<W, where M is a positive integer that represents a maximum number of search prefixes within a leaf node of the b-tree and W is a positive integer that represents a width of the search prefixes.

FIG. 5C illustrates the three-level b-tree data structure of FIG. 4A along with a diagram that illustrates a bit map memory and an alternative allocation of handle memory to support the corresponding b-tree data structure.

FIGS. 9A-9H illustrate portions of a three-level SPM b-tree data structure that can be supported by the search engine device of FIG. 7, at various stages of an insert overflow operation.

FIGS. 10A-10D are block diagrams of integrated search engine devices according to embodiments of the present invention.

FIG. 17A illustrates a database index table having columns therein that support a zero prefix length indicators and handles associated with default route prefixes, according to embodiments of the present invention.

FIG. 18A is a flow diagram of operations performed by a search engine device according to embodiments of the present invention.

DESCRIPTION OF PREFERRED EMBODIMENTS

Figure 1:
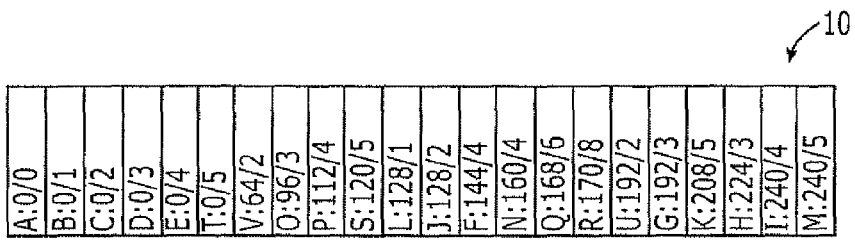
FIG. 1 illustrates a plurality of 8-bit search prefixes of varying prefix length that are sorted linearly based on prefix value (address) and prefix length, according to the prior art.
Figure 2:
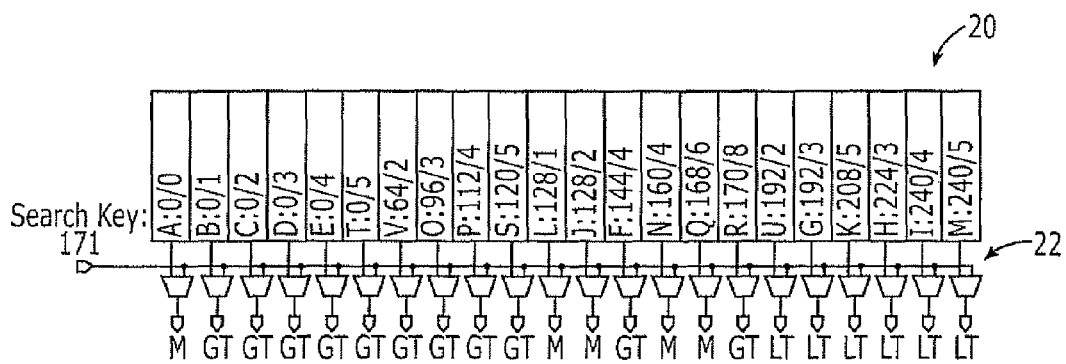
FIG. 2 illustrates a conventional hardware-based array of search prefixes that supports parallel search operations.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout. Moreover, the phrase "communicatively coupled" includes both direct and indirect forms of electrical coupling and the term "key" may be used as a shorthand notation for the more general term "prefix", including both fully specified prefixes and non-fully specified prefixes.

Figure 4A:
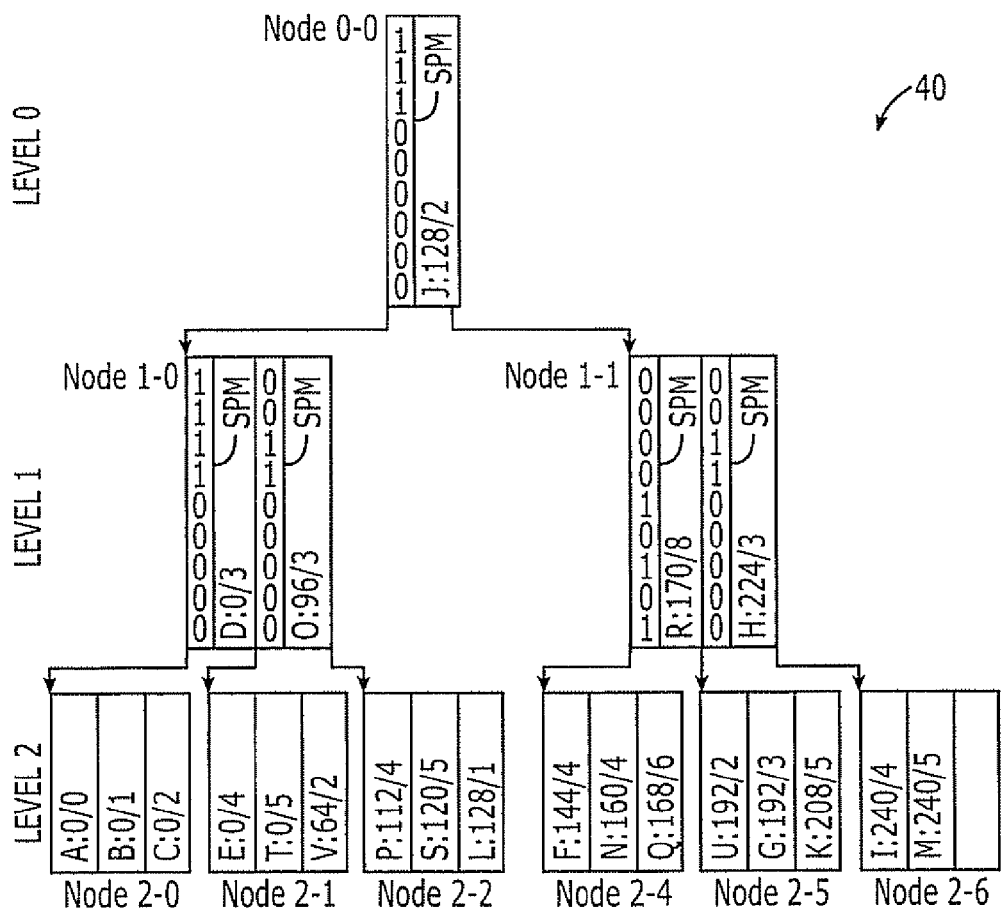
FIG. 4A illustrates a three-level b-tree data structure that contains search prefixes and span prefix masks (SPMs) according to an embodiment of the present invention.

FIG. 4A illustrates a b-tree 40 that contains search prefixes and span prefix masks (SPMs) according to embodiments of the present invention, which may be embodied within a hardware search engine device containing a hierarchical memory. The b-tree 40 includes a root node (Node 0-0) at Level 0, two nodes (Node 1-0 and 1-1) at Level 1 and six nodes (Node 2-0, 2-1, 2-2, 2-4, 2-5 and 2-6) at Level 2. The six nodes at Level 2 represent leaf nodes. Each leaf node is configured to support a maximum of three search prefixes. The two nodes at Level 1 represent nodes at the leaf parent level (i.e., one level above the leaf nodes). Each of the nodes at Level 1 contains two search prefixes and two span prefix masks. The root node contains one search prefix and one span prefix mask. These span prefix masks (SPMs) supplement the b-tree 40 to ensure that all matches for an applied search key, including a longest prefix match, are found in response to a search operation. Each span prefix mask may contain W+1 mask bits in the form of a mask vector, where W is a positive integer that represents a width of the search prefixes in the b-tree 40. For purposes of illustration only, these search prefixes are illustrated as having a width W of eight (8) bits, however, most applications require the use of search prefixes that are substantially wider that those illustrated herein. Each span prefix mask associated with a respective search prefix in a non-leaf node identifies the search prefix itself and all shorter prefixes of the search prefix that are located below and to the left of the search prefix in the b-tree 40. Thus, the span prefix mask for the search prefix J:128/2, for example, is configured to identify the search prefix J:128/2 and the shorter prefixes L:128/1 and A:0/0, which are located at leaf nodes 2-0 and 2-2, respectively. The search prefixes at the leaf nodes do not require span prefix masks because these prefixes are located at terminal nodes of the b-tree 40 and no shorter prefixes exist at any lower level of the b-tree 40.

To derive bits 0 through 8 of the 9-bit SPM corresponding to search prefix J:128/2 at node 0-0, bit-by-bit AND operations may be performed between the search prefix J and the nine 8-bit vectors illustrated by TABLE 2. Performing these AND operations results in the identification of search prefixes A:0/0, L:128/1 and J:128/2, which means the span prefix mask corresponding to search prefix J:128/2 within the b-tree 40 equals: SPM[0:8]=111000000.

TABLE 2

| SPM LENGTH | VECTOR | SEARCH PREFIX | "AND" RESULT | IS RESULT EQUAL TO SEARCH PREFIX OR SHORTER PREFIX WITHIN LEFT SUB-TREE? | SPM VALUE |
|---|---|---|---|---|---|
| /0 | 00000000 | 128 = 10000000 | 0/0 = A | YES | SPM[0] = 1 |
| /1 | 10000000 | 128 = 10000000 | 128/1 = L | YES | SPM[1] = 1 |
| /2 | 11000000 | 128 = 10000000 | 128/2 = J | YES | SPM[2] = 1 |
| /3 | 11100000 | 128 = 10000000 | 128/3 | NO | SPM[3] = 0 |

TABLE 2-continued

| SPM LENGTH | VECTOR | SEARCH PREFIX | "AND" RESULT | IS RESULT EQUAL TO SEARCH PREFIX OR SHORTER PREFIX WITHIN LEFT SUB-TREE? | SPM VALUE |
|---|---|---|---|---|---|
| /4 | 11110000 | 128 = 10000000 | 128/4 | NO | SPM[4] = 0 |
| /5 | 11111000 | 128 = 10000000 | 128/5 | NO | SPM[5] = 0 |
| /6 | 11111100 | 128 = 10000000 | 128/6 | NO | SPM[6] = 0 |
| /7 | 11111110 | 128 = 10000000 | 128/7 | NO | SPM[7] = 0 |
| /8 | 11111111 | 128 = 10000000 | 128/8 | NO | SPM[8] = 0 |

To derive bits 0 through 8 of the 9-bit SPM corresponding to search prefix D:0/3 at node 1-0, bit-by-bit AND operations may be performed between the search prefix D and the nine 8-bit vectors illustrated by TABLE 3. Performing these AND operations results in the identification of search prefixes A:0/0, B:0/1, C:0/2 and D:0/3, which means the span prefix mask corresponding to search prefix D:0/3 within the b-tree 40 equals: SPM[0:8]=111100000.

To derive bits 0 through 8 of the 9-bit SPM corresponding to search prefix R:170/8 at node 1-1, bit-by-bit AND operations may be performed between the search prefix R and the nine 8-bit vectors illustrated by TABLE 5. Performing these AND operations results in the identification of search prefixes N:160/4, Q:168/6 and R:170/8, which means the span prefix mask corresponding to search prefix R:170/8 within the b-tree 40 equals: SPM[0:8]=000010101.

TABLE 3

| SPM LENGTH | VECTOR | SEARCH PREFIX | "AND" RESULT | IS RESULT EQUAL TO SEARCH PREFIX OR SHORTER PREFIX WITHIN LEFT SUB-TREE? | SPM VALUE |
|---|---|---|---|---|---|
| /0 | 00000000 | 0 = 00000000 | 0/0 = A | YES | SPM[0] = 1 |
| /1 | 10000000 | 0 = 00000000 | 0/1 = B | YES | SPM[1] = 1 |
| /2 | 11000000 | 0 = 00000000 | 0/2 = C | YES | SPM[2] = 1 |
| /3 | 11100000 | 0 = 00000000 | 0/3 = D | YES | SPM[3] = 1 |
| /4 | 11110000 | 0 = 00000000 | 0/4 | NO | SPM[4] = 0 |
| /5 | 11111000 | 0 = 00000000 | 0/5 | NO | SPM[5] = 0 |
| /6 | 11111100 | 0 = 00000000 | 0/6 | NO | SPM[6] = 0 |
| /7 | 11111110 | 0 = 00000000 | 0/7 | NO | SPM[7] = 0 |
| /8 | 11111111 | 0 = 00000000 | 0/8 | NO | SPM[8] = 0 |

To derive bits 0 through 8 of the 9-bit SPM corresponding to search prefix O:96/3 at node 1-0, bit-by-bit AND operations may be performed between the search prefix O and the nine 8-bit vectors illustrated by TABLE 4. Performing these AND operations results in the identification of search prefixes V:64/2 and O:96/3, which means the span prefix mask corresponding to search prefix O:96/3 within the b-tree 40 equals: SPM[0:8]=001100000.

TABLE 4

| SPM LENGTH | VECTOR | SEARCH PREFIX | "AND" RESULT | IS RESULT EQUAL TO SEARCH PREFIX OR SHORTER PREFIX WITHIN LEFT SUB-TREE? | SPM VALUE |
|---|---|---|---|---|---|
| /0 | 00000000 | 96 = 01100000 | 0/0 | NO | SPM[0] = 0 |
| /1 | 10000000 | 96 = 01100000 | 0/1 | NO | SPM[1] = 0 |
| /2 | 11000000 | 96 = 01100000 | 64/2 = V | YES | SPM[2] = 1 |
| /3 | 11100000 | 96 = 01100000 | 96/3 = O | YES | SPM[3] = 1 |
| /4 | 11110000 | 96 = 01100000 | 96/4 | NO | SPM[4] = 0 |
| /5 | 11111000 | 96 = 01100000 | 96/5 | NO | SPM[5] = 0 |
| /6 | 11111100 | 96 = 01100000 | 96/6 | NO | SPM[6] = 0 |
| /7 | 11111110 | 96 = 01100000 | 96/7 | NO | SPM[7] = 0 |
| /8 | 11111111 | 96 = 01100000 | 96/8 | NO | SPM[8] = 0 |

TABLE 5

| SPM LENGTH | VECTOR | SEARCH PREFIX | "AND" RESULT | IS RESULT EQUAL TO SEARCH PREFIX OR SHORTER PREFIX WITHIN LEFT SUB-TREE? | SPM VALUE |
|---|---|---|---|---|---|
| /0 | 00000000 | 170 = 10101010 | 0/0 | NO | SPM[0] = 0 |
| /1 | 10000000 | 170 = 10101010 | 128/1 | NO | SPM[1] = 0 |
| /2 | 11000000 | 170 = 10101010 | 128/2 | NO | SPM[2] = 0 |
| /3 | 11100000 | 170 = 10101010 | 160/3 | NO | SPM[3] = 0 |
| /4 | 11110000 | 170 = 10101010 | 160/4 = N | YES | SPM[4] = 1 |
| /5 | 11111000 | 170 = 10101010 | 168/5 | NO | SPM[5] = 0 |
| /6 | 11111100 | 170 = 10101010 | 168/6 = Q | YES | SPM[6] = 1 |
| /7 | 11111110 | 170 = 10101010 | 170/7 | NO | SPM[7] = 0 |
| /8 | 11111111 | 170 = 10101010 | 170/8 = R | YES | SPM[8] = 1 |

To derive bits 0 through 8 of the 9-bit SPM corresponding to search prefix H:224/3 at node 1-1, bit-by-bit AND operations may be performed between the search prefix H and the nine 8-bit vectors illustrated by TABLE 6. Performing these AND operations results in the identification of search prefixes U:192/3 and H:224/3, which means the span prefix mask corresponding to search prefix H:22418 within the b-tree 40 equals: SPM[0:8]=001100000.

TABLE 6

| SPM LENGTH | VECTOR | SEARCH PREFIX | "AND" RESULT | IS RESULT EQUAL TO SEARCH PREFIX OR SHORTER PREFIX WITHIN LEFT SUB-TREE? | SPM VALUE |
|---|---|---|---|---|---|
| /0 | 00000000 | 224 = 11100000 | 0/0 | NO | SPM[0] = 0 |
| /1 | 10000000 | 224 = 11100000 | 128/1 | NO | SPM[1] = 0 |
| /2 | 11000000 | 224 = 11100000 | 192/2 = U | YES | SPM[2] = 1 |
| /3 | 11100000 | 224 = 11100000 | 224/3 = H | YES | SPM[3] = 1 |
| /4 | 11110000 | 224 = 11100000 | 224/4 | NO | SPM[4] = 0 |
| /5 | 11111000 | 224 = 11100000 | 224/5 | NO | SPM[5] = 0 |
| /6 | 11111100 | 224 = 11100000 | 224/6 | NO | SPM[6] = 0 |
| /7 | 11111110 | 224 = 11100000 | 224/7 | NO | SPM[7] = 0 |
| /8 | 11111111 | 224 = 11100000 | 224/8 | NO | SPM[8] = 0 |

As illustrated by TABLES 2-6, the bit corresponding to the longest prefix that is set within a span prefix mask represents the search prefix associated with the span prefix mask. For example, as illustrated by TABLE 2, the /2 bit of the span prefix mask associated with the search prefix J:128/2 in node 0-0 corresponds to J:128/2 itself. As will be understood by those skilled in the art, the search prefix associated with a span prefix mask can always be inferred, but it is preferable in hardware and software implementations of the search operations described herein to set the span prefix mask bit corresponding to the search prefix. For some implementations, the setting of this bit can also result in an efficient way of encoding the length of the search prefix based on the bit position of the longest prefix bit of the span prefix mask that is set for the search prefix. This can save a bit within $\log_2 W$ bits per search prefix, depending on how an implementation operates to encode the prefix length.

Fortunately, each search prefix need only be represented once per level of the b-tree 40 to a guarantee a first pass search success for all possible search keys. Moreover, the set bits within each span prefix mask for a corresponding search prefix need only account for shorter prefixes that are located within a left sub-tree of the corresponding search prefix. For example, the search prefix A:010, which is the leftmost search prefix within the leftmost leaf node 2-0, is represented by the least significant bit of the span prefix mask associated with the search prefix J at the root node 0-0 and the least significant bit of the span prefix mask associated with the search prefix D within node 1-0.

Figure 3:
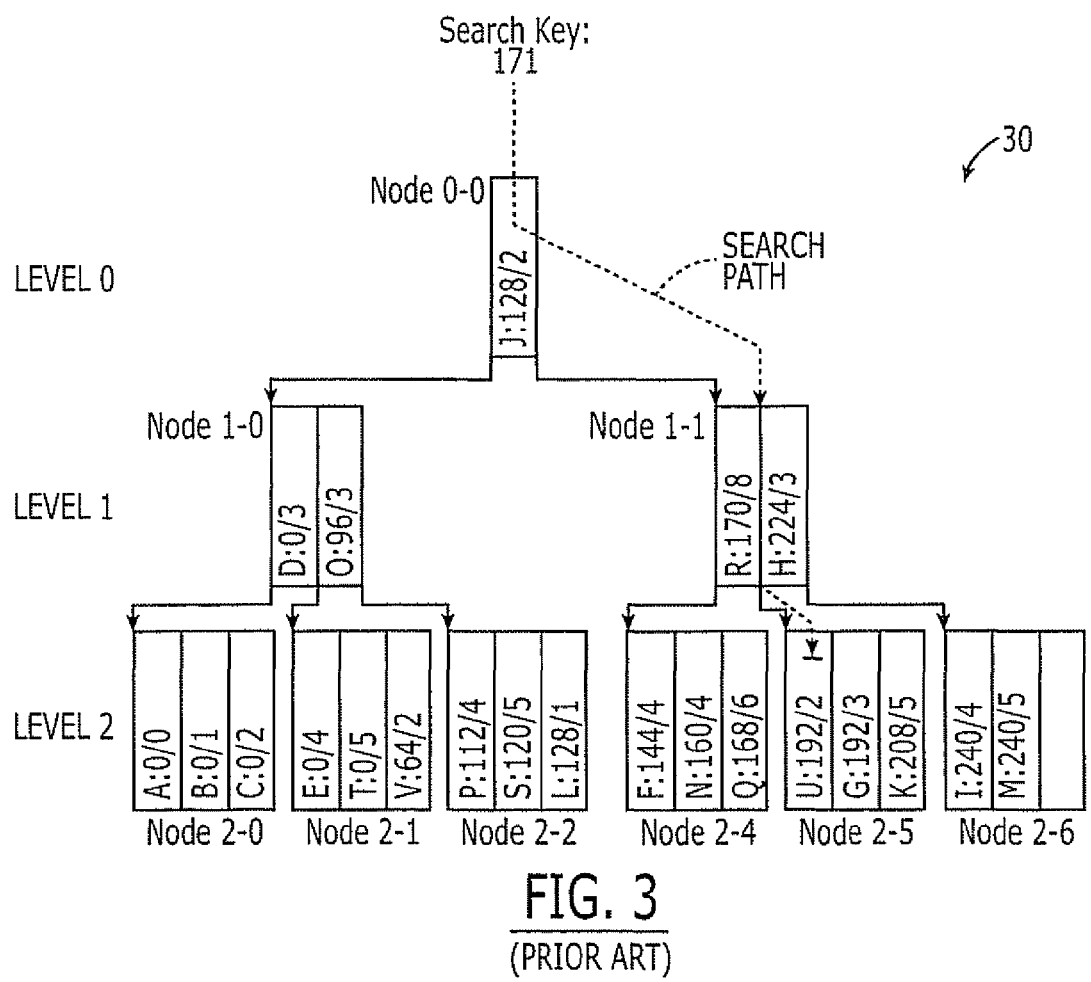
FIG. 3 illustrates a conventional three-level b-tree data structure containing the search prefixes illustrated by FIGS. 1 and 2.
Figure 4B:
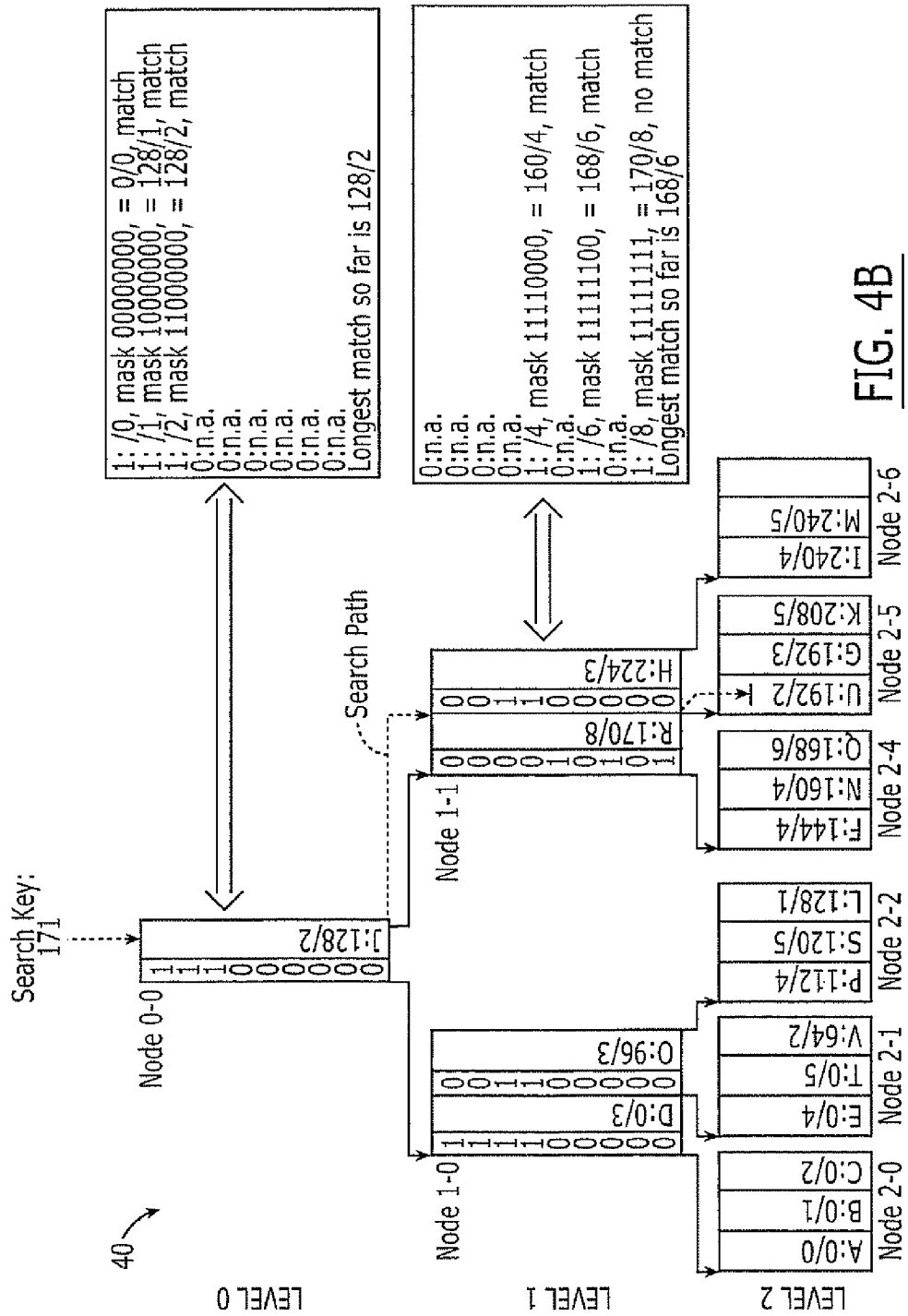
FIG. 4B illustrates an annotated three-level b-tree data structure that contains search prefixes and span prefix masks (SPMs) according to an embodiment of the present invention.

As described previously with respect to FIG. 3, a search of the b-tree 30 in FIG. 3 failed using 171 as a search key because the search prefix Q:168/6, which is the longest prefix match to the search key 171, was not encountered during the search operation. However, the performance of a corresponding search in the b-tree 40 of FIG. 4B results in the correct detection of search prefix Q:168/6 as the longest prefix match to the search key 171. As illustrated by the breakout box to the right of node 0-0 and TABLE 2, a traversal of the search prefix J:128/2 at node 0-0 (and corresponding SPM) results in the identification of three (3) matching search prefixes within the b-tree 40. These matching search prefixes include: A:0/0, L:128/1 and J:128/2, with the search prefix J:128/2 being the longest prefix match to the search key 171 at Level 0 of the search operation. The identification of search prefixes A:0/0 and L:128/1, which are located outside the search path associated with the applied search key 171, represents a type of "lookahead" search to Levels 1 and 2 of the b-tree 30.

Because the search key 171 is greater than 128, the next stage of the search at Level 1 passes down and to the right of node 0-0 to node 1-1. At node 1-1, it is apparent that the search key 171 is greater than the search prefix R:170/8 and less than the search prefix H:224/3, which means the next stage of the search operation at Level 2 passes to node 2-5, which contains no matching search prefixes. Here, the breakout box to the right of node 1-1 shows that the span prefix mask associated with the search prefix R:170/8 identifies three search prefixes (N:160/4, Q:168/6 and R:170/8) as being within the b-tree 40 even though the search path passes to the right of the search prefix R and does not encounter leaf node 2-4 of the b-tree 40, which contains the additional matching search prefixes of N:160/4 and Q:168/6. These three search prefixes are identified by ANDing the vectors 11110000 (corresponding to SPM /4), 11111100 (corresponding to SPM /6) and 11111111 (corresponding to SPM /8) with 170, which is represented in binary format as 10101010b. This ANDing operation is illustrated more fully by TABLE 5. Of the identified search prefixes N:160/4, O:168/6 and R:170/8 within the breakout box to the right of node 1-1, search prefix Q:168/6 represents a longest prefix match to the applied search key 171. Thus, even though the search prefix Q:168/6 is not within the search path that extends from node 0-0 to node 1-1 and then terminates at node 2-5, it is properly identified as a longest prefix match with the aid of the SPMs. In this manner, the SPM associated with search prefix R:170/8 supports a "lookahead" search operation to node 2-4, which is outside the search path associated with the applied search key 171.

Search operations within a search engine device according to some embodiments of the invention result not only in the detection of a longest prefix match within a database of entries (e.g., a hierarchical memory containing a multi-level b-tree), but also in the generation of result data, which is typically provided to a command host responsible for issuing search and other instructions to the search engine device. This result data, which is referred to herein as "handles," may be maintained within handle memory associated with the search engine device.

One approach to updating a hierarchical memory that supports a b-tree in accordance with FIG. 4A includes representing a handle associated with a search prefix at multiple levels within the b-tree. This incurs the cost of additional handle memory, but allows for highly efficient updates to the hierarchical memory. A requirement that each handle associated with a search prefix be stored up to once for each level of the b-tree can result in the total handle memory size being much greater than the amount of memory needed for one handle times the maximum number of search prefixes supported by the b-tree. However, because it is typically difficult to predict or tightly control a distribution of search prefixes and their corresponding handles within a b-tree, an efficient way to reduce handle memory is by tailoring the shape of a b-tree to minimize handle memory usage. Here, the worst case for handle memory usage is to provide storage for one handle per each bit of each SPM in each node above the leaf level and one handle for each search prefix in each leaf node.

FIG. 4C illustrates the three-level b-tree 40 of FIG. 4A along with a diagram that illustrates an allocation of a handle memory 42 to support the b-tree 40. This handle memory 42 includes one handle memory block for each leaf node at Level 2 of the b-tree 40 and one handle memory block for each search prefix at the leaf parent level and higher levels (e.g., Levels 0 and 1) of the b-tree 40. Each handle memory block at the leaf parent level and higher level(s) provides sufficient storage for one handle per bit of the span prefix mask associated with the corresponding search prefix. Accordingly, as illustrated at FIG. 4C, a maximum of nine (9) handles (i.e., W+1 handles) may be stored in a handle memory block associated with the search prefix at the root node (i.e., node 0-0) of the b-tree 40, with the number of valid handles in the handle memory block being equivalent to the number of bits set within the corresponding span prefix mask. Each of the handle memory blocks at the leaf parent level is also configured to store as many as nine (9) handles. Fortunately, each handle memory block at the leaf level, which contains most of the search prefixes within the b-tree, only needs sufficient capacity to store one handle per search prefix within a node at the leaf level. Each handle memory block at the leaf level can be indexed based on the search prefix position of the longest matching prefix within the leaf node at which a search terminated. Moreover, it is only necessary to perform one read operation on the dedicated handle memory 42 per search. Thus, there is no need to perform one read operation on the handle memory for each level of the tree as there is when performing a search operation on a hierarchical memory containing the b-tree.

In the search example described above with respect to FIG. 4B, the longest matching prefix was shown to be Q:168/6. The search prefix Q was not found by traversing the node where search prefix Q was located within the b-tree 40, but was instead based on the /6 bit being set in the SPM associated with search prefix R:170/8 at node 1-1, key 0. Indexing the handle memory 42 in FIG. 4C using the position of search prefix R as the reference, identifies a sub-block of handles with valid handles. These valid handles are represented by the handle words corresponding to the /4, /6 and /8 bits of the corresponding SPM. Reading the location in handle memory 42 associated with the /6 bit returns "Handle Q" which is the correct handle for the longest matching prefix Q:168/6.

As illustrated by FIG. 4D, it is possible to save some handle storage space at the leaf parent level within the b-tree for those cases where MSW within the b-tree (i.e., where the number M of search prefixes within each leaf node (e.g., 3) is less than the width of the search prefixes in the b-tree (e.g., 8)). In this special case, instead of needing handle storage space for W+1 (e.g., 9) handles per search prefix, it is only necessary to store M+1 (e.g., 4) handles per search prefix at the leaf parent level. This reduced capacity handle memory 42' is illustrated at FIG. 4D.2. This special case scenario may also be applied at any non-leaf level where the capacity (i.e., # of search prefixes) of all sub-trees to the non-leaf level is less than W.

Figure 5A:
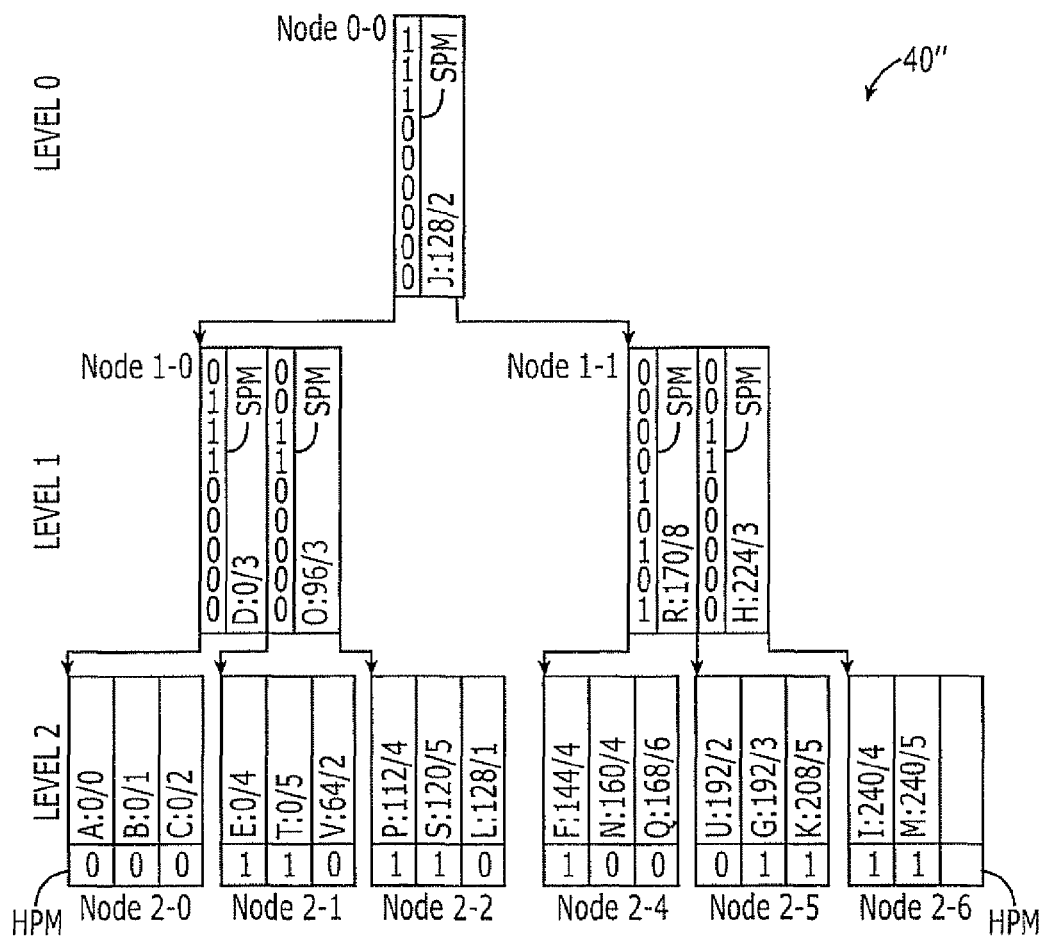
FIG. 5A illustrates a three-level b-tree data structure that contains search prefixes and span prefix masks (SPMs) according to another embodiment of the present invention.

A three-level b-tree data structure 40" that contains search prefixes and span prefix masks (SPMs) according to another embodiment of the present invention is illustrated by FIG. 5A. This b-tree data structure 40" is similar to the b-tree 40 of FIG. 4A, however, three differences are present. The first difference can be understood by evaluating, for example, the span prefix masks (SPMs) associated with the search prefix J at the root node (node 0-0) and the search prefix D at node 1-0, in FIG. 5A. At the root node, the /0 bit of the SPM (i.e., SPM[0]) associated with the search prefix J is set to "1" to thereby reflect the presence of search prefix A at a lower leaf node (i.e., node 2-0). The setting of this bit is consistent with the results illustrated by TABLE 2. However, at node 1-0, the /0 bit of the SPM associated with the search prefix D is held at "0" to thereby remove any identification of the search prefix A at the leaf node 2-0, because it has already been identified by the SPM associated with search prefix J at a higher level within the b-tree 40". Thus, in FIG. 5A, a search prefix is reflected only once in an SPM, and then only at the highest level that it can be represented within the b-tree 40".

The second and third differences are present because it is necessary to know if a handle (i.e., result) associated with a search prefix is stored in memory associated with a location of the search prefix within the b-tree or associated with an SPM bit being set to represent the search prefix at a higher level within the b-tree. In particular, the second difference involves setting a corresponding bit in an SPM to represent the SPM's search prefix only if that search prefix is not identified in another SPM at a higher level within the b-tree. For example, the /2 bit of the SPM corresponding to search prefix J is set to "1" to thereby reflect the search prefix J, and the /3 bits of the SPMs corresponding to the search prefixes D, O and H at nodes 1-0 and 1-1 are all set to "1" because none of these search prefixes are identified in the SPM corresponding to the search prefix J at a higher level in the b-tree 40". However, if the search prefix D, O, or H was identified in the SPM corresponding to search prefix J, then the /3 bit of the corresponding SPM for that search prefix would not be set at level 1 in the b-tree 40". The third difference includes using one "handle present mask" bit (HPM) per search prefix within the leaf nodes to indicate whether the corresponding search prefix has been identified in an SPM at a higher level in a b-tree. Thus, at node 2-0 in FIG. 5A, for example, all mask bits are set to "0" because the search prefixes A, B and C are all represented at higher levels within the b-tree 40". In particular, the search prefix A is identified in the SPM corresponding to the search prefix J at the root node and the search prefixes B and C are identified in the SPM corresponding to the search prefix D at node 1-0. At node 2-1, the mask bits for search prefixes E and T are set to "1" because neither of these search prefixes are represented in an SPM at a higher level node in the b-tree 40". However, the mask bit for the search prefix V is set to "0" because the search prefix V is represented by the /2 bit in the SPM associated with the search prefix O at node 1-0.

Figure 5B:
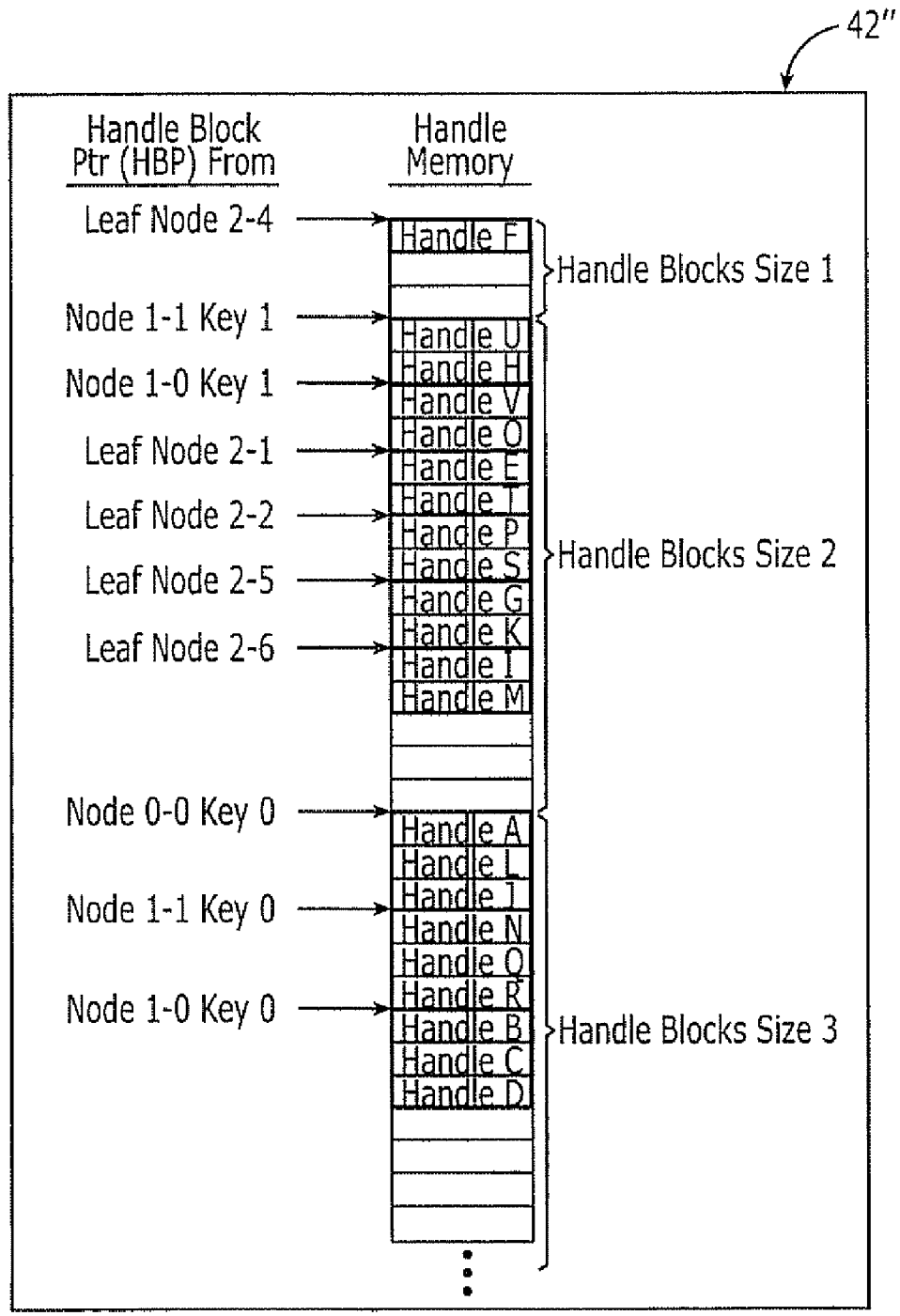
FIG. 5B illustrates an allocation of handle memory that supports the b-tree data structure of FIG. 5A.

Because each search prefix in the b-tree 40" is represented by only one set SPM bit or one set HPM bit, the capacity of a memory needed to support the corresponding handles for the search prefixes in the b-tree 40" can be significantly reduced relative to the handle memories 42 and 42' illustrated by FIGS. 4C.2 and 4D.2. This is because each handle only has to be stored once within a handle memory. As illustrated by FIG. 5B, an exemplary allocation of a handle memory 42" for the b-tree 40" of FIG. 5A includes a variable-sized handle memory block for each search prefix at the leaf parent level or higher and one variable-sized handle memory block for each leaf node. Each leaf node and each search prefix at the leaf parent level or higher may use a corresponding handle block pointer (HBP) to point to a respective handle memory block. Thus, for search prefix J at node 0-0, a respective HBP points to a handle memory block having a capacity of three handles corresponding search prefixes A, L and J. Similarly, for search prefix H (at node 1-1, key 1) an HBP points to a handle memory block having a capacity of two handles corresponding to search prefixes U and H. And, for leaf node 2-5, an HBP points to a handle memory block having a capacity of two handles corresponding to search prefixes G and K.

Finally, because fully specified search prefixes (e.g., search prefix R:170/8 at node 1-1, key 0) cannot be prefixes of other prefixes, they will never be represented in SPMs located at higher levels within the b-tree. Accordingly, whenever a fully specified search prefix is present at a leaf parent level or higher level within a b-tree, the HBP associated with this fully specified search prefix will point to a block of handle memory that is equivalent in size to the number of set bits within the SPM corresponding to this fully specified search prefix and the last handle in this block will correspond to the fully specified search prefix. This special case is best illustrated by the handle block in FIG. 5B that corresponds to the search prefix R at node 1-1, key 0. This handle block includes the handles N and Q, which correspond to set bits within the SPM for the search prefix R, and the additional handle R.

Figure 6:
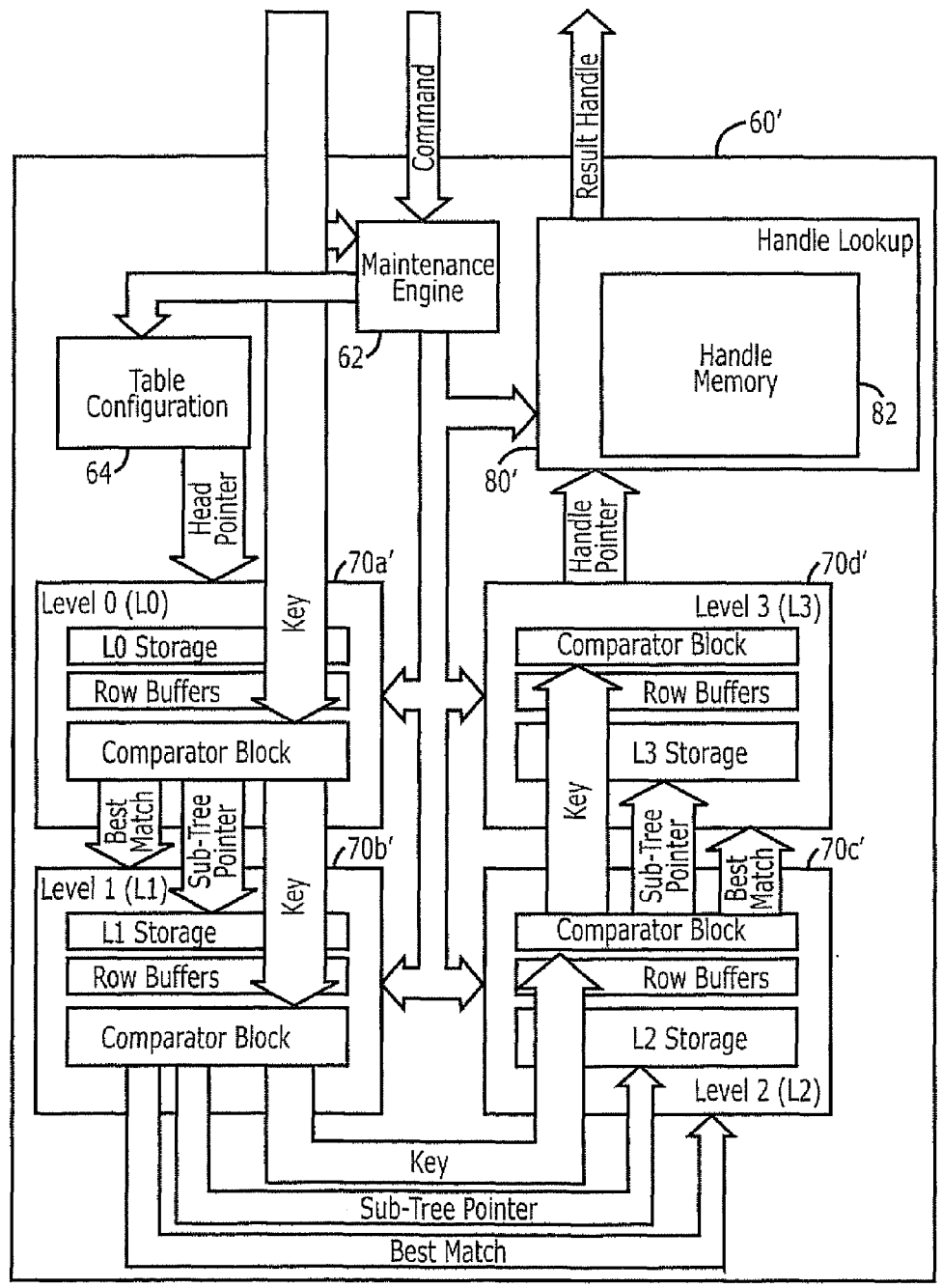
FIG. 6 is a block diagram of a pipelined search engine device that supports the b-tree data structure of FIG. 4B and an allocation of handle memory, according to an embodiment of the invention.

FIG. 6 illustrates a block diagram of a pipelined search engine device 60' that supports the above-described b-tree data structures (with SPMs) and handle memory and is responsive to applied search keys and commands. This search engine device 60', which supports multiple four-level b-trees as separate tables (i.e., databases), which share the same node storage and search logic, includes a plurality of pipeline stages 70a'-70d' dedicated to each b-tree level and a separate pipeline stage 80' for the final result handle lookup and generation of result handles. Alternative embodiments of the search engine device 60' can support b-trees having more or less than four levels. The first pipeline stage 70a' represents a Level 0 block (L0) of the b-tree containing Level 0 storage elements, row buffers (optional in some designs) and comparator logic. The first pipeline stage 70a' is responsive to a head pointer and a key. The second pipeline stage 70b' represents a Level 1 block (L1) containing Level 1 storage elements, row buffers (optional in some designs) and comparator logic. The second pipeline stage 70b' is responsive to a sub-tree pointer, a best match result generated by the first pipeline stage 70a' and the key. Similarly, the third pipeline stage 70c' represents a Level 2 block (L2) containing Level 2 storage elements, row buffers (optional in some designs) and comparator logic. The third pipeline stage 70c' is responsive to a sub-tree pointer, a best match result generated by the second pipeline stage 70b' and the key. The fourth pipeline stage 70d' represents a Level 3 block (L3) containing Level 3 storage elements, row buffers (optional in some designs) and comparator logic. The fourth pipeline stage 70d', which generates a handle block pointer, is responsive to a sub-tree pointer, a best match result generated by the third pipeline stage 70c' and the key. The final pipeline stage is a handle lookup stage 80', which performs handle lookup operations within a handle memory 82 to thereby generate a result handle in response to the handle block pointer.

A table maintenance engine 62 is also provided, which integrates with the four pipeline stages 70a'-70d' and the handle lookup stage 80'. This table maintenance engine 62 performs operations including search key insertion and deletion operations during idle search clock cycles. A table configuration circuit 64 is provided, which can support multiple search trees and map a table ID associated with a received search request to a tree head pointer (HEAD POINTER) for the corresponding table. Because of the pipelined structure of the search engine device 60', the maximum search rate can equal the maximum clock speed supported by the four pipeline stages 70a'-70d' and the handle lookup stage 80'.

The table maintenance engine 62 receives search keys and commands on behalf of the search engine device 60' and forwards search commands to the table configuration circuit 64. The table maintenance engine 62 also queues up any key insert or key delete commands (i.e., update commands) it receives for processing because key insertion and key deletion typically cannot be completed in a simple single pass through the search engine pipeline. When idle command cycles indicate there are memory access opportunities available to perform table maintenance accesses on the memories (L0, L1, L2, L3) within each pipeline stage 70a'-70d' and the handle memory 82 within the handle lookup stage 80', the maintenance engine 62 performs maintenance accesses corresponding to portions of a key insert or key delete request. The maintenance engine 62 can process an insert or delete request and manage search memory node allocation to thereby allocate free nodes when needed to process key inserts and returning freed nodes to a pool when freed during key deletes. To ensure search coherency and permit searching while the maintenance engine 62 processes a key update command, the maintenance engine 62 makes a copy of nodes that must be modified while processing updates and only modifies these "temporary" copies. Once all node copies have been modified at all necessary levels for a key update, the maintenance engine 62 updates pointers in all necessary search levels to point to the modified node copies it was working on and reclaims the original nodes, which were copied, for future use. These pointers are updated in a manner that preserves search coherency on every lookup.

Once all temporary node copies at all levels have been properly updated, a special command is executed within the pipeline of stages to thereby cause each level of the b-tree to point to the node copies and reclaim the nodes that are being replaced. This update process propagates through the pipeline across all levels at the same speed as a search command.

Accordingly, all searches that enter the pipeline before the special command will search against a database before any changes pertaining to the update are applied, but any searches that enter the pipeline after the special command will search against a database that appears to have been instantly and completely modified to reflect the update. In this manner, it is not necessary to temporarily stall the multiple levels of the search engine device 60' while an update is being performed.

The table configuration circuit 64 receives search commands from the maintenance engine 62, which include a table ID for the table to be searched. The table configuration circuit 64 then maps the table ID, corresponding to a unique b-tree within the search engine device 60', to a root tree node pointer in the Level 0 block 70a'. The table configuration circuit 64 then forwards this pointer to the Level 0 block 70a' instructing it to perform a search starting at the root node pointed to by the root tree node pointer.

Each of the Level 0, Level 1 and Level 2 blocks 70a'-70c' corresponds to one of the upper three levels of an SPM b-tree. Each level receives a search key, a sub-tree pointer and an indication of the best match found by the previous levels in the search. In the case of the Level 0 block 70a', which is only utilized (as the root level) when the height of the search tree equals four, this best match input indication is always null. A Level 0, Level 1 or Level 2 block reads a search node from its node storage based on the sub-tree pointer it receives and buffers it in a set of flip-flops within its respective row buffer sub-block. Each node stores a set of keys, SPM bit-masks and sub-tree pointers. The comparator sub-block compares the search key to all of the keys and the SPM bit-masks read from the node storage sub-block and determines the best match for the search key, if any, and also determines which of the node's sub-tree pointers the search should follow for the next level of the search. The Level 0, Level 1 or Level 2 block forwards the sub-tree pointer it finds to the next lower level block along with the search key. If the next lower level block finds a new best match, then this best match for the search key is forwarded to the next lower level search stage. However, if no new best match is found, then the best match from the previous higher stage is forwarded to the next stage.

The Level 4 block corresponds to the leaf level of the SPM b-tree. It receives a search key, sub-tree pointer and any indication of a best match from the previous levels in the search. The Level 4 block reads a search node from its node storage based on the sub-tree pointer that it receives and buffers it in a set of flip-flops within its row buffer sub-block. The comparator sub-block compares the search key to all of the keys read from the node storage sub-block and determines a best match, if any. If the Level 4 block finds a new best match for the search key, then it forwards its own best match as the handle pointer to the handle lookup block 80'. Otherwise, if no new best match is found, then the best match received from the prior stage is passed as the handle pointer.

The handle lookup block 80' receives an indication of the best match found by the Level 0-Level 3 search stages 70a'-70d' and uses the best match as an index to lookup a search result handle in the handle memory 82. In response to the index, the handle memory 82 outputs a retrieved handle as the result handle (i.e., the search result).

A search engine device according to additional embodiments of the present invention is configured as a pipelined search engine having a multiple levels of hierarchical processing logic. As described and illustrated more fully hereinbelow with respect to FIGS. 7-11, each (LEVEL_i) includes: (i) control and search logic, (ii) storage for that level's node data-structures, and (iii) a node maintenance sub-engine. The node maintenance sub-engine locally handles node modifications for that level's nodes, communicates with its child level (i.e., next lowest level the hierarchy) to assist in handling node overflows and undertows at that level (does not apply to leaf level) and communicates with its parent level to get support in handling its own node overflows and underflows (does not apply to LEVEL_1). Each level (LEVEL_i) also communicates with a handle memory lookup engine (HANDLE_MEMORY) to delegate and coordinate handle memory updates that must be kept in sync with node data structure updates.

Figure 7:
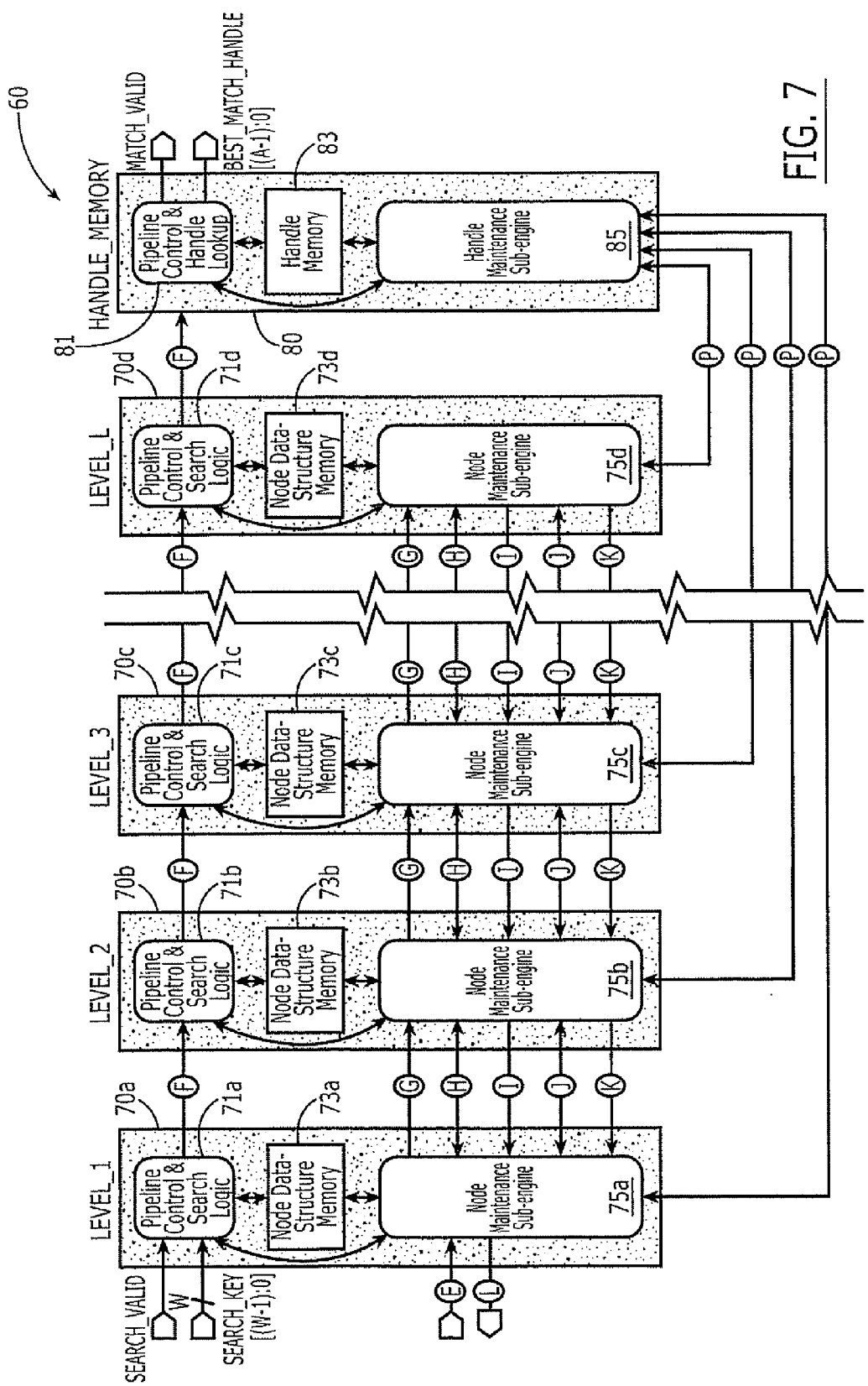
FIG. 7 is a block diagram of an integrated search engine device according to an embodiment of the present invention.

Referring now to FIG. 7, an integrated circuit search engine 60 according to additional embodiments of the present invention includes a pipelined arrangement of search and tree maintenance sub-engines 70a-70d and a final stage handle memory lookup engine 80 therein. Each of these sub-engines 70a-70d includes a corresponding level of a hierarchical memory therein. Thus, the first search and tree maintenance sub-engine 70a contains the highest level of the hierarchical memory and the fourth search and tree maintenance sub-engine 70d contains the lowest level of the hierarchical memory. The second and third search and tree maintenance sub-engines 70b and 70c contain respective intermediate levels of the hierarchical memory. The number of intermediate levels of the hierarchical memory may vary depending on the application to which the search engine 60 is applied. The search and tree maintenance sub-engines 70a-70d are also identified by the reference labels LEVEL_1, LEVEL_2, LEVEL_3, . . . , LEVEL_L, which identify the memory level supported therein. Alternatively, the reference labels LEVELS), LEVEL_1, . . . , LEVEL_L−1 could also be used to reflect the same relative levels, as show by FIGS. 3-6. The reference character "L" represents a positive integer equal to a maximum height of the tree that can be supported by the search engine 60. The hierarchical memory is configured to store a multi-way tree (e.g., b-tree, b*tree, b+tree) of search prefixes that spans the plurality of memory levels. The hierarchical memory is also preferably configured to support increases in a height of the multi-way tree relative to a leaf node level of the multi-way tree, which can be fixed in location at a lowest one of the plurality of memory levels (i.e., LEVEL_L) within the fourth search and tree maintenance sub-engine 70d. These increases in the height of the multi-way tree typically occur as a capacity of the multi-way tree increases in response to search prefix insertions.

The first search and tree maintenance sub-engine 70a is illustrated as including a first pipeline control and search logic module 71a, which is also referred to herein more generally as a first control module, a first level node memory 73a, which operates as a highest memory level within the hierarchical memory, and a first node maintenance sub-engine 75a. This first level node memory 73a may be provided by row addressable memory or, as described more fully hereinbelow with respect to FIG. 15, flip-flop memory or combinations of row addressable and flip-flop memory, for example. The second search and tree maintenance sub-engine 70b is illustrated as including a second pipeline control and search logic module 71b, which is also referred to herein more generally as a second control module, a second level node memory 73b, which operates as a second highest memory level within the hierarchical memory, and a second node maintenance sub-engine 75b. The third search and tree maintenance sub-engine 70c is illustrated as including a third pipeline control and search logic module 71c, which is also referred to herein more generally as a third control module, a third level node memory 73c, which operates as a third highest memory level within the hierarchical memory, and a third node maintenance sub-engine 75c. The fourth search and tree maintenance sub-engine 70d is illustrated as including a fourth pipeline control and search logic module 71d, which is also referred to herein more generally as a fourth control module, a fourth level node memory 73d, which operates as a lowest memory level within the hierarchical memory, and a fourth node maintenance sub-engine 75d. As described more fully hereinbelow, the first, second and third level node memories 73a-73c may be configured to store search prefixes, SPMs and related tree data in some embodiments of the present invention. These memories are also referred to herein as a node-data-structure memories. The handle memory lookup engine 80 includes a pipeline control and handle lookup logic module 81, a handle memory 83 and a handle maintenance sub-engine 85.

Upon commencement of a search operation, the first control module 71a receives a search valid signal SEARCH_VALID, which initiates a search operation within the search engine 60 when asserted, and a corresponding applied search key SEARCH_KEY[(W−1):0], which is also treated herein more generally as an applied search prefix (e.g., a fully specified search prefix). In response, the first control module 71a may generate a plurality of signals that are passed downstream on an internal interface/bus F to the next highest control module within the pipeline. This next highest control module is illustrated as the second control module 71b. The plurality of signals passed downstream on interface/bus F may include: SEARCH_VALID, SEARCH_KEY[(W−1):0], NEXT_LEVEL[(J−1):0], NEXT_PTR[(P−1):0], MATCH_VALID, BEST_MATCH_LEVEL[(J−1):0], BEST_MATCH_PTR[(P−1):0], BEST_MATCH_KEY_POS[(K−1):0] and BEST_MATCH_KEY_OFFSET[(F−1):0]). These signals and the operations performed by the pipelined control modules 71a-71d are described more fully hereinbelow with respect to FIGS. 10A-10C and 11A-11B.

The first node maintenance sub-engine 75a is illustrated as being communicatively coupled to a maintenance request interface E and a maintenance acknowledgment interface L. The maintenance request interface E may be used to pass maintenance instructions (e.g., insert, delete, age, learn, search and learn (SNL)) to the search engine 60 for processing therein and the maintenance acknowledgment interface L may be used to communicate maintenance results and status information back to an issuing host processor (not shown). Interfaces G, H, I, J and K extend between the node maintenance sub-engines 75a-75d, as illustrated. Interface G is a maintenance information interface, which can communicate maintenance information downstream (for inserts and deletes), and a bidirectional interface H is "key drop" interface, which supports upstream requests (for prefixes) and downstream transfers of search prefixes between the plurality of levels (LEVEL_1, . . . , LEVEL_L) of the search engine 60. Interface I is a child modification interface, which supports upstream transfers of information relating to child nodes associated with a lower memory level. Interface J is a bidirectional "key raise" interface, which supports upstream transfers of search prefixes between the plurality of levels of the search engine 60 and downstream transfers of parent acknowledgment information. Interface K is a maintenance "ready" interface, which indicates a ready/non-ready status (done or error). Finally, interface P is a handle update interface, which supports handle memory updates within the handle memory lookup engine 80. As illustrated, this interface is coupled to each of the search and tree maintenance sub-engines 70a-70d in the pipeline. In some embodiments of the present invention, the handle memory lookup engine 80 may have the same general configuration illustrated by FIGS. 4C-4D and 11A-11B.

Figure 8A:
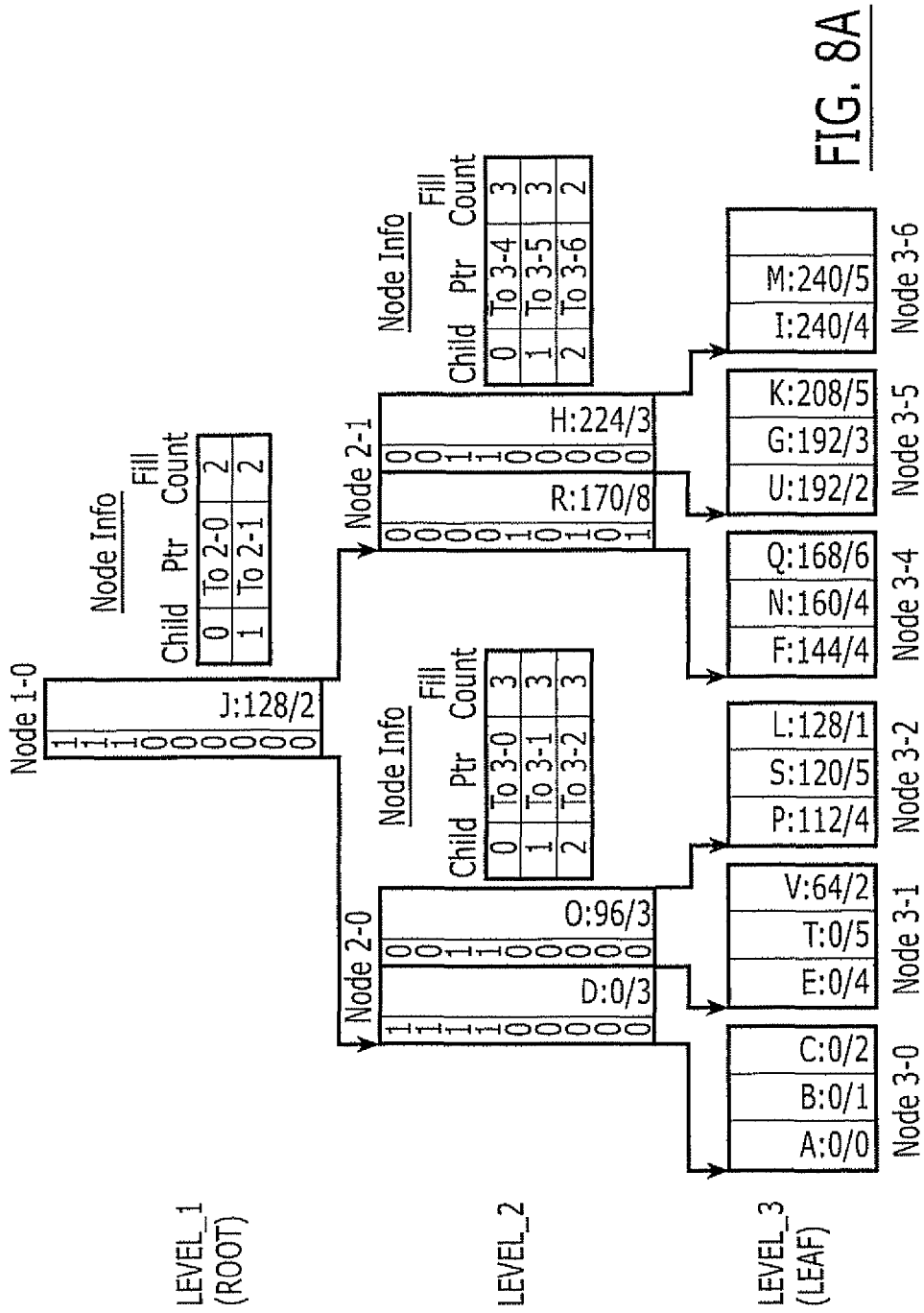
FIGS. 8A-8B illustrate a three-level SPM b-tree data structure that can be supported by the search engine device of FIG. 7, before and after insertion of a search prefix therein requiring leaf node splitting.
Figure 8B:
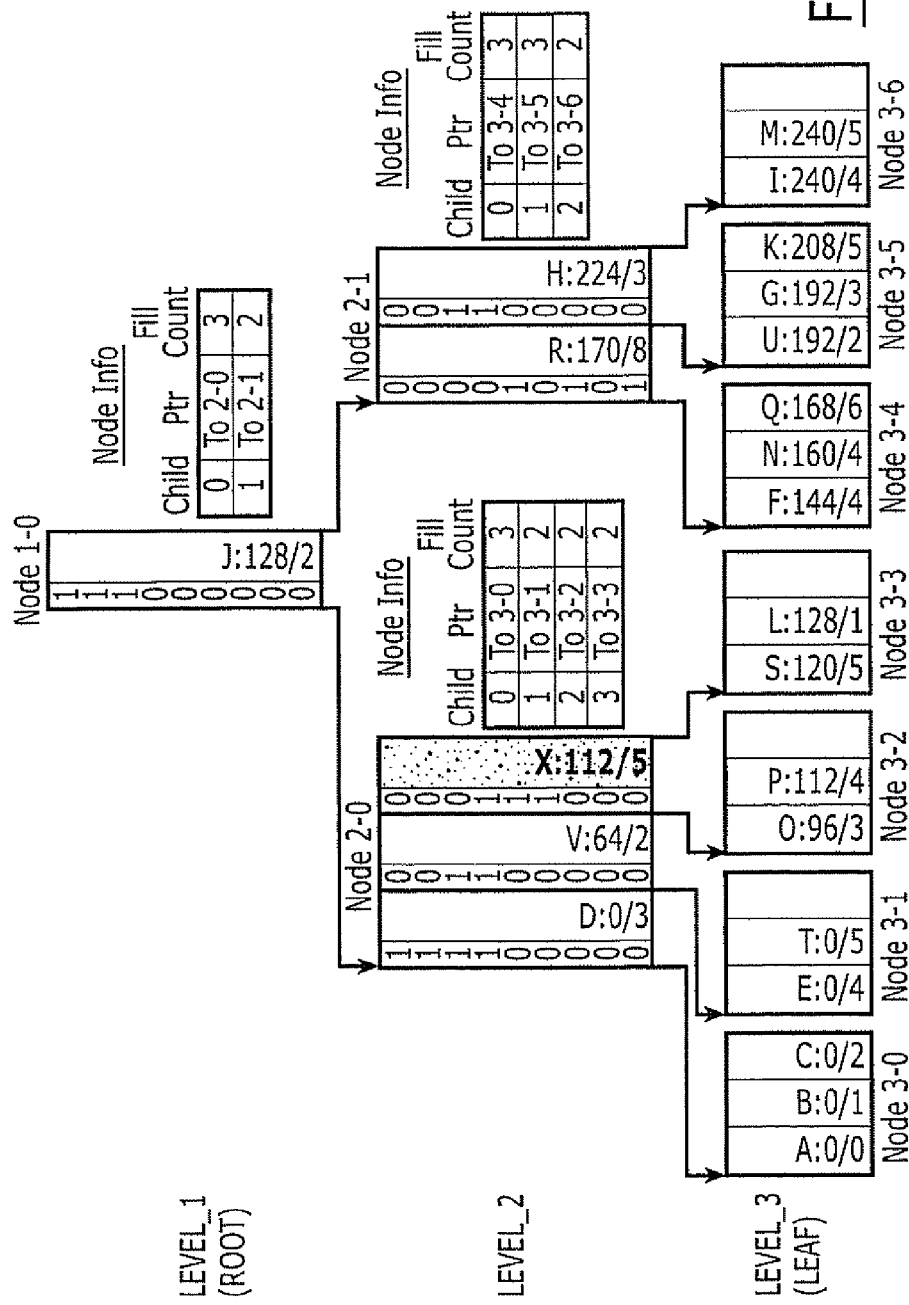

Some methods of operating the search engine 60 of FIG. 7 will now be described more fully with reference to FIGS. 8A-8B and 9A-9H for the simplified case where L (i.e., maximum tree height) equals 3. These methods reflect operations performed within the search engine 60, in response to an insert instruction. In particular, FIG. 8A illustrates a "before" snapshot of a three-level b-tree data structure containing search prefixes and span prefix masks (SPMs) according to embodiments of the present invention and FIG. 8B illustrates an "after" snapshot of the three-level b-tree data structure, which has been updated by the insertion of search prefix X:112/5 therein. The three-level b-tree in FIG. 8A includes a root node (NODE 1-0) at LEVEL_1 with two child nodes (NODE 2-0, NODE 2-1) located at LEVEL_2. The root node (NODE 1-0) contains the search prefix J:128/2 (and corresponding 9-bit SPM) and two pointers to the two child nodes, which each have a fill count of 2. NODE 2-0 at LEVEL_2 includes two search prefixes (with corresponding SPMs), which are illustrated as D:0/3 and O:96/3. NODE 2-1 at LEVEL_2 includes two search prefixes (with corresponding SPMs), which are illustrated as R:170/8 and H:224/3. NODE 2-0 points to three leaf nodes (NODES 3-0, 3-1 and 3-2), which each have a fill count of 3. NODE 2-1 points to two leaf nodes (NODES 3-4 and 3-5), which each have a fill count of 3, and a third leaf node (NODE 3-6), which has a fill count of 2. The exemplary b-tree of FIG. 8A assumes that M=3 (i.e., maximum of three keys per node) at each level, with a required node utilization of ⅔ of M.

The three-level b-tree in FIG. 8B, includes a root node (NODE 1-0) at LEVEL_1 with two child nodes (NODE 2-0, NODE 2-1) located at LEVEL_2. The root node (NODE 1-0) contains the search prefix J:128/2 (and corresponding 9-bit SPM) and two pointers to the two child nodes. NODE 2-0 at LEVEL_2 includes three search prefixes (with corresponding SPMs), which are illustrated as D:0/3 and V:64/2 and the newly added search prefix: X:112/5. NODE 2-1 at LEVEL_2 includes two search prefixes (with corresponding SPMs), which are illustrated as R:170/8 and H:224/3. NODE 2-0 points to four leaf nodes: NODES 3-0, 3-1, 3-2 and 3-3. NODE 3-0 has a fill count of 3 and NODES 3-1, 3-2 and 3-3 have a fill count of 2 (resulting from a split operation). NODE 2-1 points to two leaf nodes (NODES 3-4 and 3-5), which each have a fill count of 3, and a third leaf node (NODE 3-6), which has a fill count of 2.

Operations for generating the b-tree data structure of FIG. 8B by inserting the search prefix X:112/5 into the b-tree data structure of FIG. 8A will now be described more fully with reference to FIGS. 7 and 9A-9H. In particular, in response to an INSERT_START command received on the maintenance request interface E, the search path follows the LEVEL_1 left side child pointer 0 from root NODE 1-0 to NODE 2-0 at LEVEL_2 and then follows the right side child pointer 2 from NODE 2-0 to NODE 3-2 in LEVEL_3, which is fully occupied at a fill count of 3. The node maintenance sub-engine 75c at LEVEL_3 determines that the insert prefix X:112/5 should be inserted between prefix P:112/4 in key position 0 and prefix S:120/5 in key position 1 of NODE 3-2. But, this proposed insertion violates the maximum fill count requirement (M=3) for this leaf node and therefore requires additional insert overflow processing.

Figure 9A:
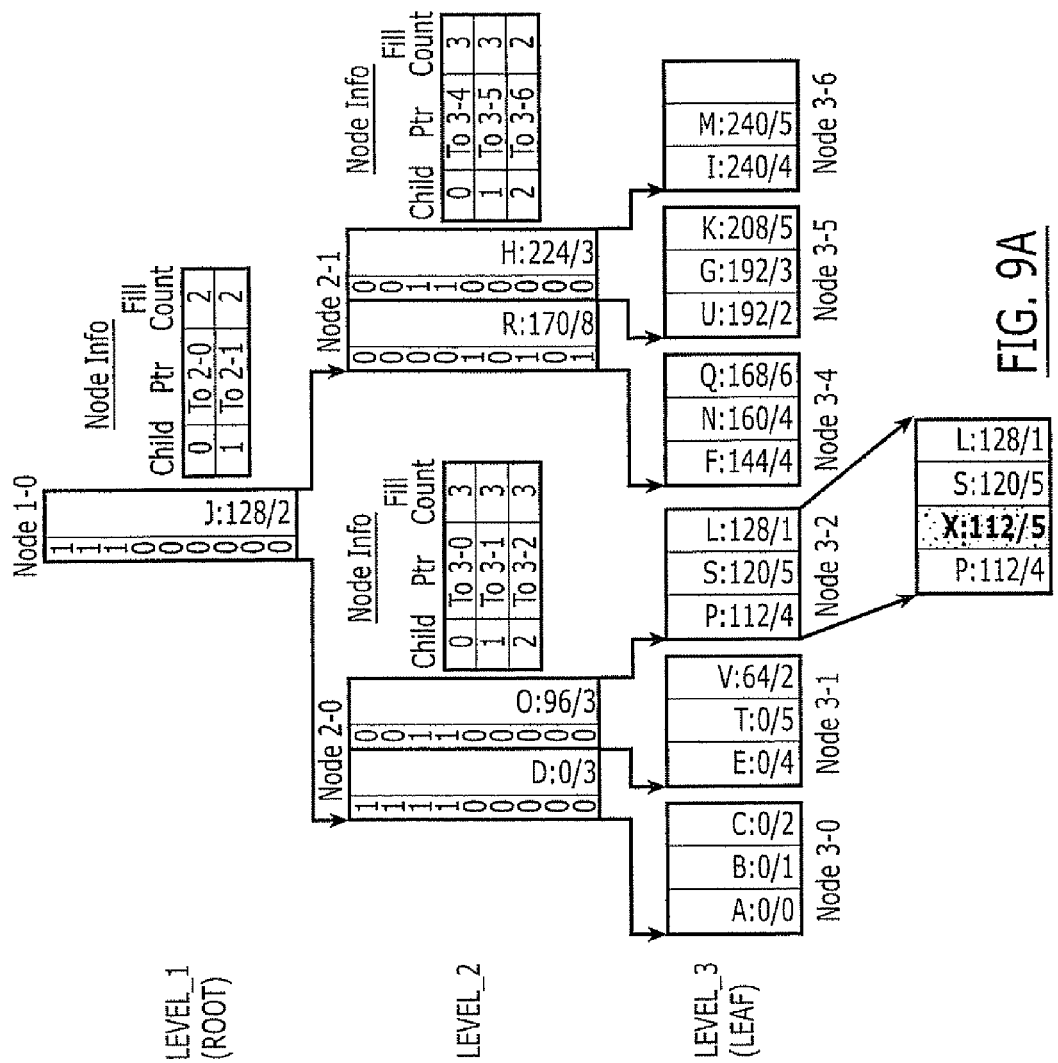

The first node maintenance sub-engine 75a within the first search and tree maintenance sub-engine 70a at LEVEL_1 also recommends (via its G interface) to LEVEL_2 a redistribution between NODES 2-0 and 2-1 if NODE 2-0 incurs an overflow in response to the insert command. The second node maintenance sub-engine 75b at LEVEL_2 recommends (via its G interface) to LEVEL_3 a 2->3 split starting with NODES 3-1 and 3-2, if NODE 3-2 incurs an overflow. In response to this recommendation, the third node maintenance sub-engine 75c at LEVEL_3 recognizes that the node to be inserted into, NODE 3-2, is already full and will overflow if the insert is to proceed as illustrated by FIG. 9A. Thus, the third node maintenance sub-engine 75c at LEVEL_3 must undergo an insert overflow operation by performing the 2->3 node split involving NODES 3-1 and 3-2.

Figure 9B:
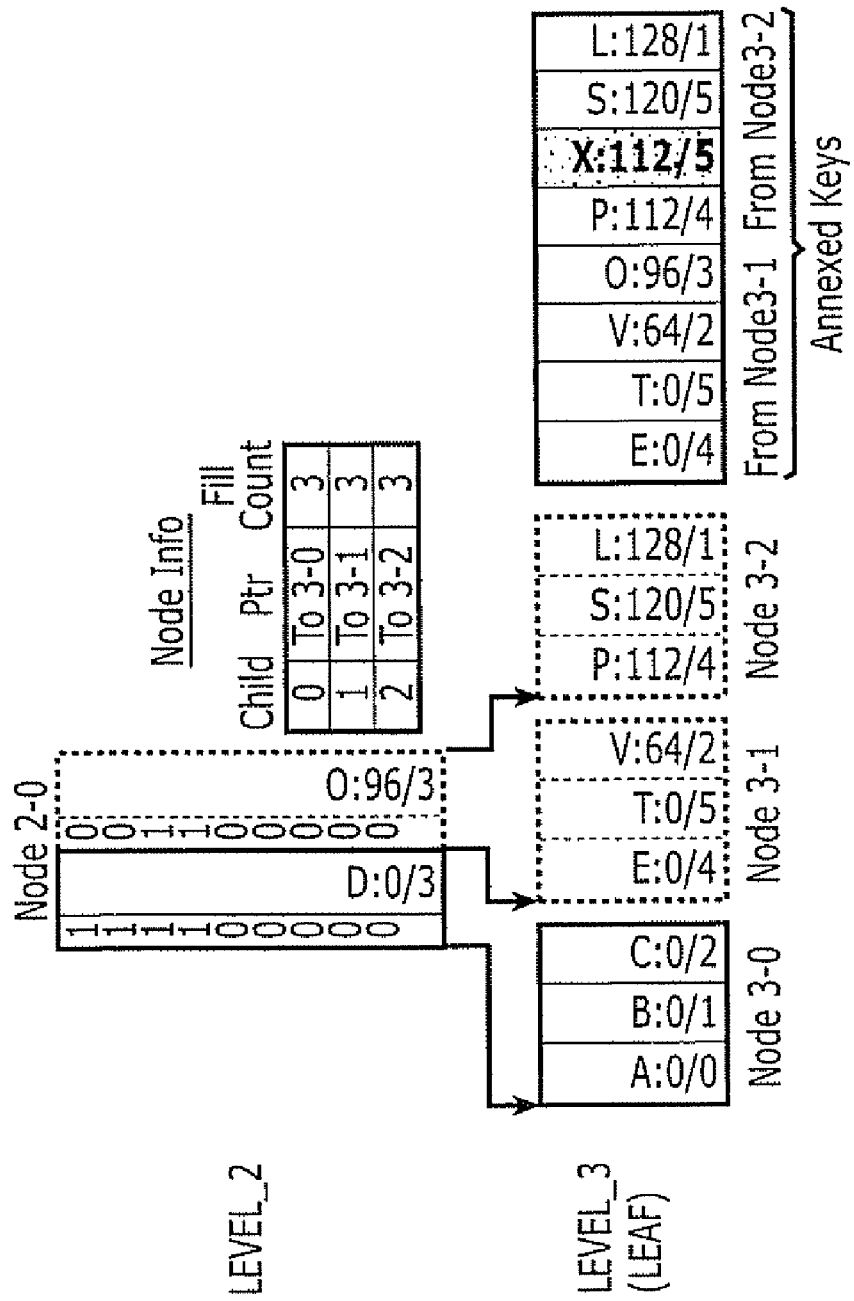
Figure 9C:
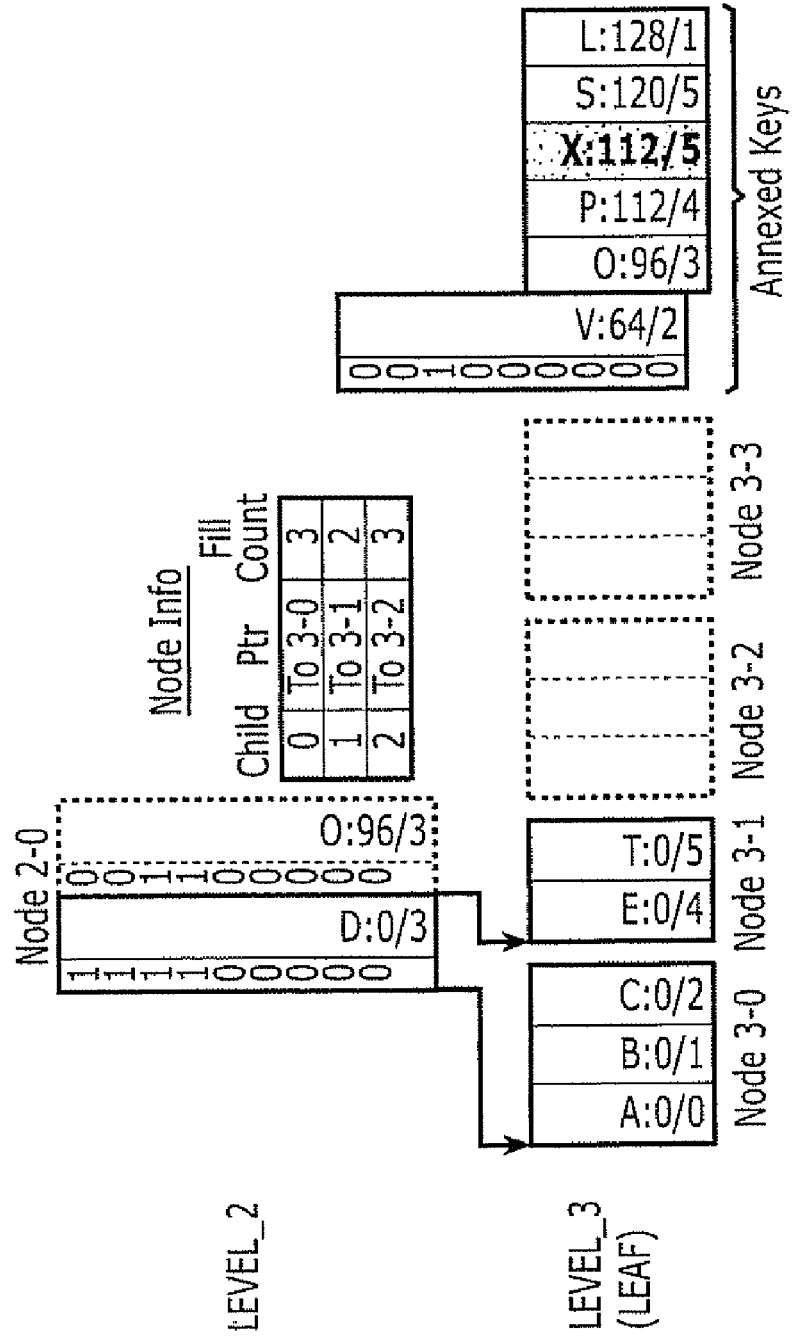

Referring now to FIG. 9B, the third node maintenance sub-engine 75c annexes all the prefixes in NODES 3-1 and 3-2 with the parent prefix O:96/3 located between them (from LEVEL_2). To do this, LEVEL_3 requests (via interface H) that LEVEL_2 drop the prefix at NODE 2-0, key position 1, down to LEVEL_3 and LEVEL_2 responds back on interface H with prefix O:96/3. The third node maintenance sub-engine 75c at LEVEL_3 then writes two prefixes (E:0/4 and T:0/5) back to NODE 3-1 so that a 2/3 fill condition in NODE 3-1 is achieved, as illustrated by FIG. 9C. In addition, LEVEL_3 prepares the SPM for the next prefix V:64/2, which is to be raised up to the node data structure memory 73b in LEVEL_2 based on the two prefixes placed in NODE 3-1. Referring now to FIG. 9D, the sub-engine 75c at LEVEL_3 then sends a child modification message to LEVEL_2 for NODE 3-1, via interface I, and LEVEL_2 updates its child node information for NODE 2-0, child 1 (i.e., NODE 3-1). The sub-engine 75c at LEVEL_3 then raises prefix V:64/2 (and its SPM) up to LEVEL_2 on interface J and LEVEL_2 puts this raised prefix into NODE 2-0, key position 1, as illustrated.

Figure 9E:
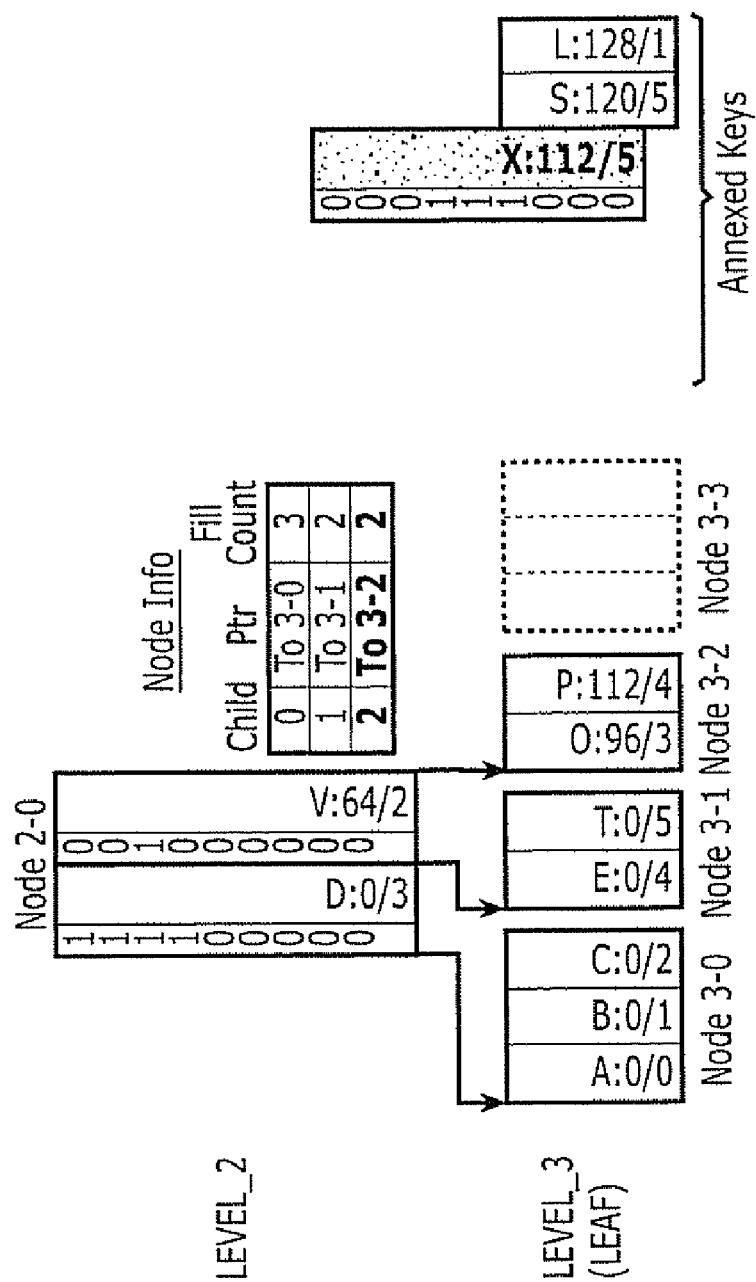

Referring now to FIG. 9E, the third node maintenance sub-engine 75c at LEVEL_3 then transfers the next two prefixes (O:96/3 and P:112/4) back to NODE 3-2 and prepares the SPM for the inserted prefix: X:112/5, so that this prefix and SPM can be written into the second node memory 73b at LEVEL_2. The third node maintenance sub-engine 75c then sends a child modification message to the second node maintenance sub-engine 75b at LEVEL_2 for NODE 3-2 (via interface I) and LEVEL_2 updates its child information for NODE 2-0, child 2. The sub-engine 75c at LEVEL_3 also allocates a node pointer for NODE 3-3 (from a free list (not shown)), the newly added node.

Figure 9F:
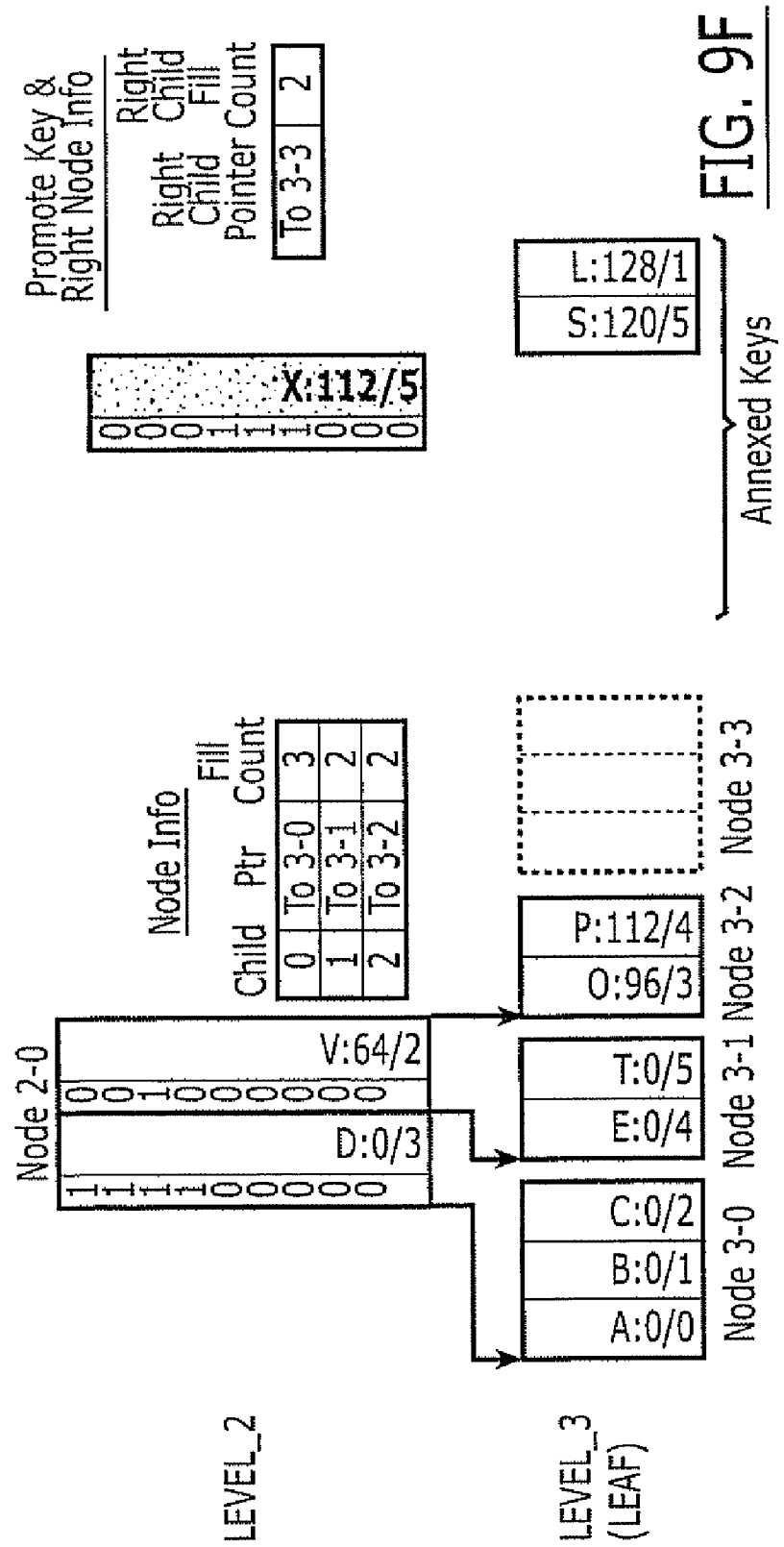
Figure 9G:
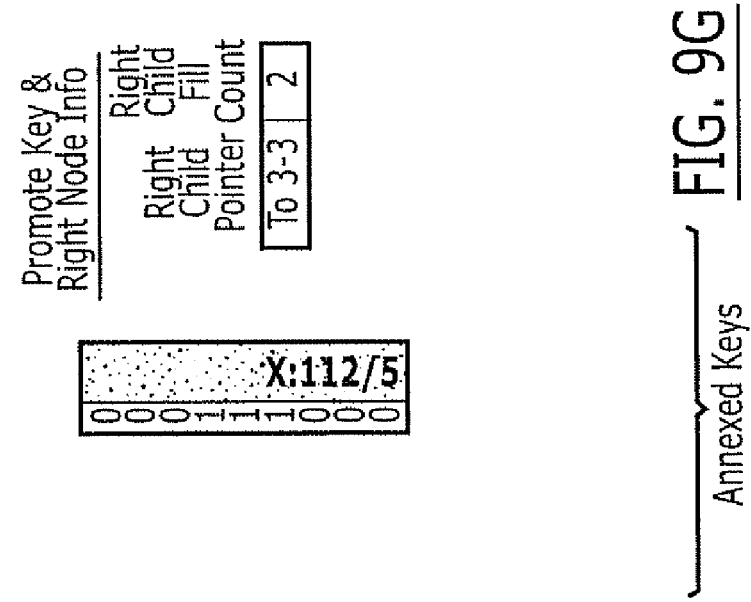
Figure 9G:
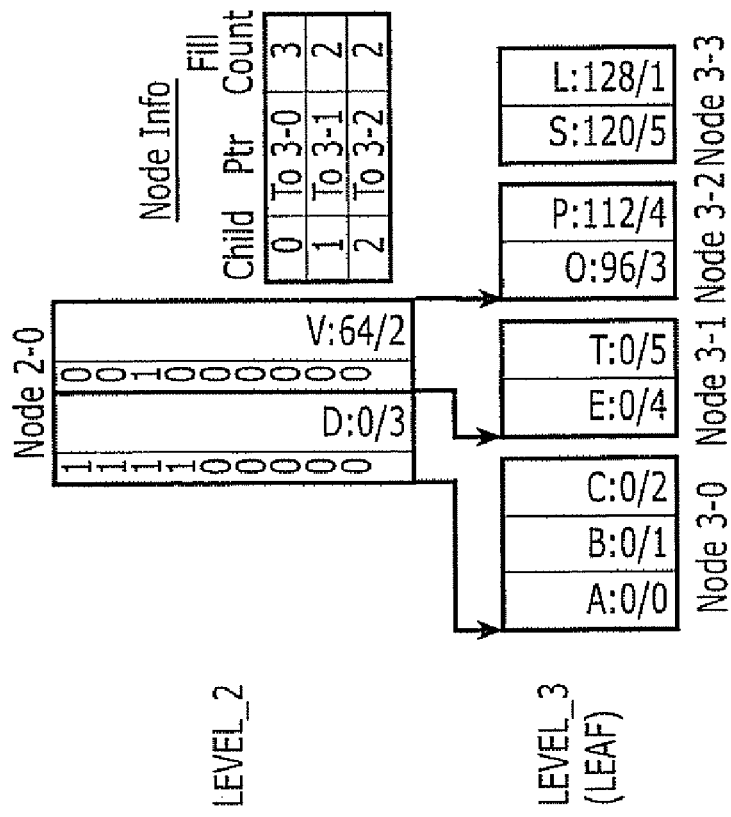

Referring now to FIGS. 9F-9G, the third node maintenance sub-engine 75c then promotes the inserted prefix (X:112/5) and its corresponding SPM up to LEVEL_2 (via interface J), along with its right child pointer to NODE 3-3 (and its future node fill count (2)), and LEVEL_2 buffers these promotions. The third node maintenance sub-engine 75c then updates the third node memory 73c by writing the two remaining annexed prefixes (S:120/5 and L:128/1) into NODE 3-3.

Figure 9H:
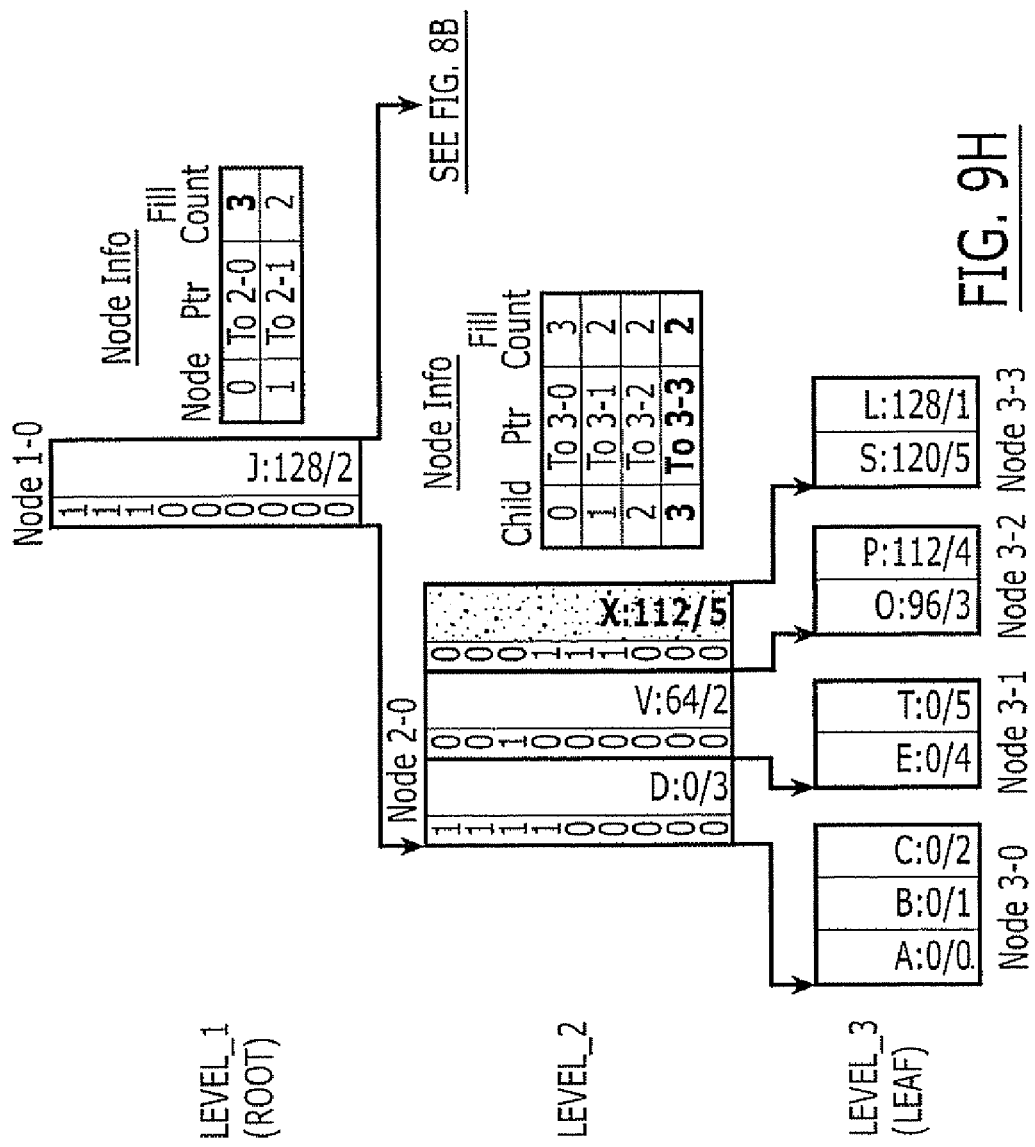

Finally, the third node maintenance sub-engine 75c at LEVEL_3 sends a maintenance ready message on the K interface to LEVEL_2 to thereby indicate that LEVEL_3 is done inserting all prefixes into its nodes. In response, the second node maintenance sub-engine 75b at LEVEL_2 determines that it must now insert the promoted prefix (X:112/5) into a non-full node, which will not overflow. Then, as illustrated by FIG. 9H, the second node maintenance sub-engine 75b inserts the promoted prefix into NODE 2-0 and adds its right side child/pointer information to the node information. LEVEL_2 then sends a child modification message regarding NODE 2-0 to LEVEL_1 via interface I. This child modification message informs the first node maintenance sub-engine 75a that its fill count associated with the left side child pointer (to NODE 2-0) must be increased from 2 to 3. LEVEL_2 also sends a maintenance ready message to LEVEL_1 on the interface K, which indicates that LEVEL_2 is done inserting the prefix X:112/5 into its updated node. LEVEL_1 also determines that it does not have to deal with an overflow because LEVEL_2 did not promote any prefix to LEVEL_1 and LEVEL_1 has already updated its child information (and corresponding SPM, if necessary) associated with the update to NODE 2-0. LEVEL_1 then outputs a maintenance acknowledgment on interface L thereby indicating successful completion of the insert operation and b-tree update (see, FIG. 8B).

Figure 10A:
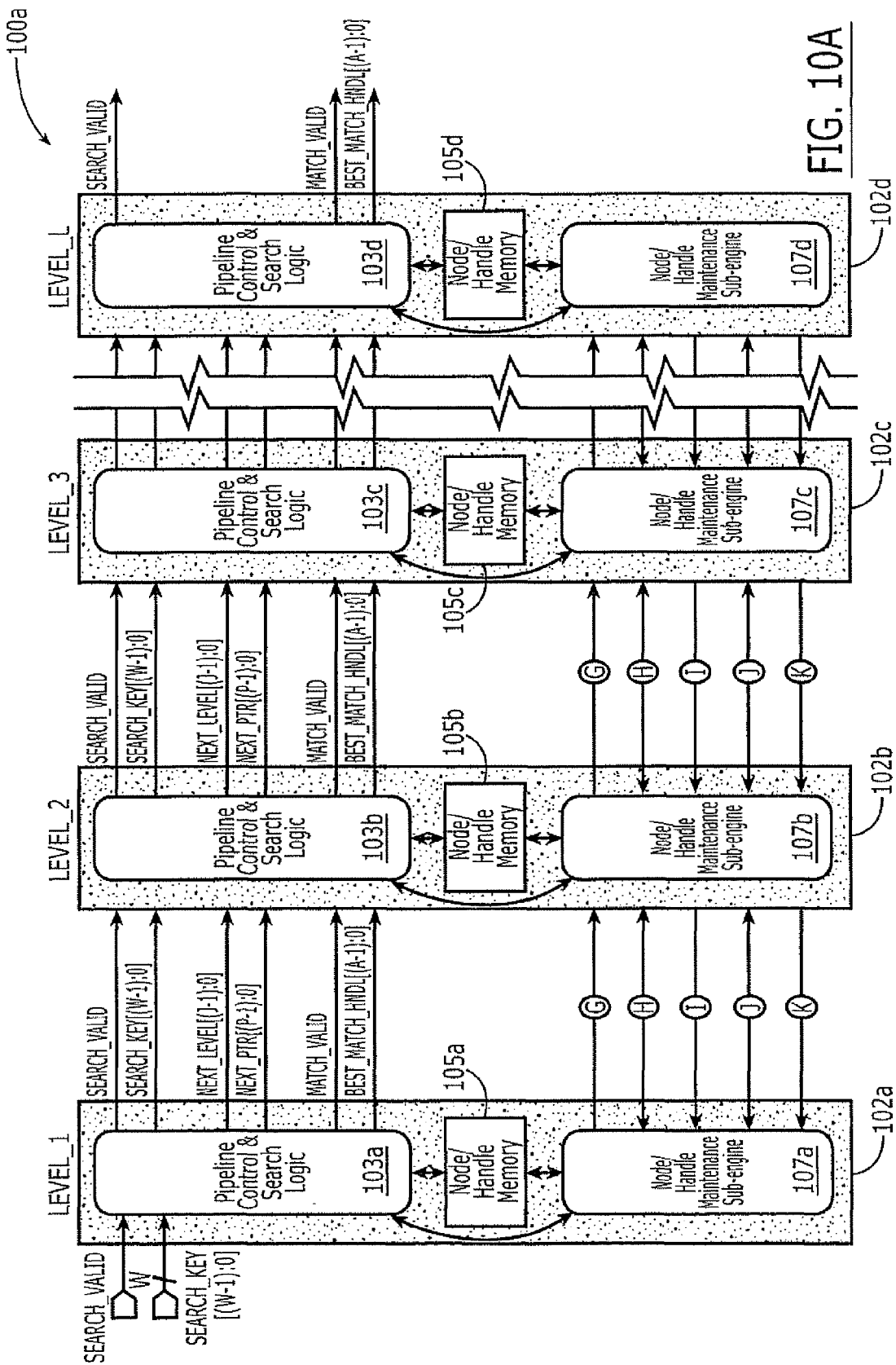

Referring now to FIG. 10A, a pipelined integrated circuit search engine 100a according to additional embodiments of the present invention includes a pipelined arrangement of search and tree maintenance sub-engines 102a-102d therein. Each of these sub-engines 102a-102d includes a corresponding level of a hierarchical memory. Thus, the first search and tree maintenance sub-engine 102a contains the highest level of the hierarchical memory and the fourth search and tree maintenance sub-engine 102d contains the lowest level of the hierarchical memory. The second and third search and tree maintenance sub-engines 102b and 102c contain respective intermediate levels of the hierarchical memory. The number of intermediate levels of the hierarchical memory may vary depending on application. The search and tree maintenance sub-engines 102a to 102d are also identified by the reference labels LEVEL_1, LEVEL_2, LEVEL_3, . . . , LEVEL_L, which identify the memory level supported therein. The reference character "L" represents a positive integer equal to a maximum height of the multi-way tree that may be supported by the search engine 100a.

The hierarchical memory is configured to store a multi-way tree (e.g., b-tree, b*tree, b+tree) of search prefixes that spans the plurality of memory levels. As illustrated by FIGS. 4-5 and 8-9, this hierarchical memory may also be configured to store span prefix masks (SPMs) for search prefixes located on non-leaf nodes of the tree. Moreover, according to the search engine 100a of FIG. 10A, the hierarchical memory is further configured to store data associated with the search prefixes, which is referred to herein as "associated data". As will be understood by those skilled in the art, one type of associated data is typically referred to as a "handle," which may, in some embodiments, represent an address (e.g., router address, memory address, etc.) that is provided to an output interface of the search engine 100a. The hierarchical memory is also configured to support increases in a height of the multi-way tree relative to a leaf node level of the multi-way tree, which is fixed in location at a lowest one of the plurality of memory levels (LEVEL_L) within the fourth search and tree maintenance sub-engine 102d. These increases in the height of the multi-way tree typically occur as a capacity of the multi-way tree increases in response to search prefix insertions.

Referring still to FIG. 10A, the first search and tree maintenance sub-engine 102a is illustrated as including a first pipeline control and search logic module 103a, also referred to herein more generally as a first control module, a first node/handle memory 105a, which operates as a highest memory level within the hierarchical memory, and a node/handle maintenance sub-engine 107a. This node/handle maintenance sub-engine 107a performs operations similar to those described above with respect to the node maintenance sub-engines 75a-75d and handle maintenance sub-engine 85 illustrated by FIG. 7. Upon commencement of a search operation, the first control module 103a receives a search valid signal SEARCH_VALID, which initiates a search operation within the search engine 100a when asserted, and a corresponding applied search key SEARCH_KEY[(W−1):0]. In response, the first control module 103a may generate a plurality of signals that are passed downstream to the next control module within the pipeline. This next control module is illustrated as the second control module 103b.

The plurality of signals that are passed downstream from the first control module 103a are illustrated as: SEARCH_VALID, SEARCH_KEY[(W−1):0], NEXT_LEVEL[(J−1):0], NEXT_PTR[(P−1):0], MATCH_VALID and BEST_MATCH_HNDL[(A−1):0]. This passing of the plurality of signals need not occur during the same clock cycle(s). In particular, whenever a search and tree maintenance sub-engine completes its role in a search operation, the search request and search key are passed, along with the search results, to the next control module (in the pipeline) via the SEARCH_VALID and SEARCH_KEY[(W−1):0] signals so that the search operands propagate downstream from sub-engine to sub-engine.

Upon commencement of a search operation, the first search and tree maintenance sub-engine 102a evaluates a locally stored root level indicator (ROOT_LEVEL) and a locally stored root pointer (ROOT_PTR) to determine whether the highest one of the plurality of memory levels residing therein contains a root node of the multi-way tree and, if so, the location (e.g., memory address) of the root node designated by the root pointer ROOT_PTR. The presence of the root node within the highest memory level (LEVEL_1) indicates that the multi-way tree is at a maximum height and spans all memory levels within the hierarchical memory. When this is the case, the first search and tree maintenance sub-engine 102a participates in the requested search operation, beginning at the memory location identified by the root pointer ROOT_PTR. According to some embodiments of the invention, the root level indicator ROOT_LEVEL and root pointer ROOT_PTR may be stored within the logic (e.g., registers) associated with the first control module 103a.

In the event the root level indicator ROOT_LEVEL specifies that the root node of the multi-way tree resides within the highest memory level (LEVEL_1), then upon completion of a first level search and generation of a non-match result, the first search and tree maintenance sub-engine 102a will: (i) set its output NEXT_LEVEL[(J−1):0] to a value that specifies LEVEL_2 as the next memory level to continue the search operation; and (ii) set its output NEXT_PTR[(P−1):0] to a value that identifies the location of the next node of the multi-way tree in LEVEL_2 to be evaluated during the pipelined search operation. The value of NEXT_PTR[(P−1):0] issued by the first control module 103a is based on a node branching decision made during the search of the root node within LEVEL_1 of the hierarchical memory.

In the event the search engine is configured as an exact match search engine requiring fully specified search prefixes within the b-tree and the first level search results in an exact match search result, thereby indicating a match between a search prefix residing at the root node and the applied search key (i.e., SEARCH_KEY[(W−1):0]), then the output NEXT_LEVEL[(J−1):0] may be set to a default value that precludes all downstream search and tree maintenance sub-engines from participating in the search and corrupting the search results associated with the first level search. The output NEXT_PTR[(P−1):0] may also be set to a default value or a "don't care" value. For example, the output NEXT_LEVEL[(J−1):0] may be set to a default value greater than the numeric value of the last memory level within the pipeline (i.e., greater than the value of integer L), so that none of the downstream search and tree maintenance sub-engines consider a match with the value NEXT_LEVEL[(J−1):0] generated by a preceding sub-engine. The output MATCH_VALID will also be asserted by the first control module 103a to reflect the presence of a match with the search prefix located at the root node. Furthermore, the output BEST_MATCH_HNDL[(A−1):0] will be set to the value of the locally stored handle (or possibly other associated data) that corresponds to the matching search prefix within the LEVEL_1 memory. In alternative embodiments of the present invention, the assertion of the MATCH_VALID signal at the output of a sub-engine can be used to block downstream sub-engines from participating in any search operations. The use of an asserted MATCH_VALID signal to block subsequent search operations can be used to eliminate a need to set the NEXT_LEVEL[(J−1):0] signal to the default value.

As a further alternative, if the root level indicator ROOT_LEVEL designates that the root node of the multi-way tree resides within a lower memory level (e.g., LEVEL_2 through LEVEL_L), then the first search and tree maintenance sub-engine 102a will set its output NEXT_LEVEL[(J−1):0] to a value that specifies the memory level containing the root node of the multi-way tree and set its output NEXT_PTR[(P−1):0] to the value of the root pointer ROOT_PTR that is locally stored within the first control module 103a.

The continuation of the search operation to the next highest memory level causes the second highest search and tree maintenance sub-engine 102b (LEVEL_2) to evaluate its input NEXT_LEVEL [(J−1):0], which specifies whether it is to participate in the search operation (either as a root note or as a branch node stemming from the root node residing in LEVEL_1). If the second search and tree maintenance sub-engine 102b is to participate in the search operation, then the value of the input NEXT_PTR[(P−1):0] will specify the location of the node within the LEVEL_2 memory to continue the search by comparing the applied search prefix SEARCH_KEY[(W−1):0] against the search prefixes stored within the designated node. This continuation of the search may result in the generation of a branching pointer to the LEVEL_3 memory. This means the signals NEXT_LEVEL [(J−1):0] and NEXT_PTR[(P−1):0] generated by the second control module 103b will reflect LEVEL_3 as the next level to participate in the search and also designate the corresponding node within LEVEL_3 to evaluate as the search operation continues. If the search within the second search and tree maintenance sub-engine 102b is successful at identifying a match with the applied search prefix (SEARCH_KEY[(W−1):0], then output MATCH_VALID will be asserted by the second control module 103b to reflect the presence of a match with the applied search prefix. The output BEST_MATCH_HNDL[(A−1):0] will also be set to the value of the handle (or possibly other associated data) that corresponds to the matching search prefix within the LEVEL_2 memory.

On the other hand, if the received NEXT_LEVEL [(J−1):0] signal specifies a value other than LEVEL_2 (e.g., LEVEL_3), then the second search and tree maintenance sub-engine 102b will not participate in the search operation, but will merely pass all its inputs: SEARCH_VALID, SEARCH_KEY[(W−1):0] NEXT_LEVEL [(J−1):0], NEXT_PTR[(P−1):0], MATCH_VALID and BEST_MATCH_HNDL[(A−1):0] downstream to the third search and tree maintenance sub-engine 102c for further processing.

These above-described search operations continue in a similar manner for each of the downstream sub-engines 102c and 102d, as each level of multi-way tree is traversed. In this manner, the search results propagate through the search pipeline until a final result is generated by the last sub-engine 102d associated with LEVEL_L of the hierarchical memory. This final result is reflected in the value of the MATCH_VALID signal, which reflects whether or not a match has been detected. If a match has been detected, then value of the BEST_MATCH_HANDLE[(A−1):0] generated by the last sub-engine 102*d* will correspond to the handle of the matching search prefix within the multi-way tree.

Figure 10B:
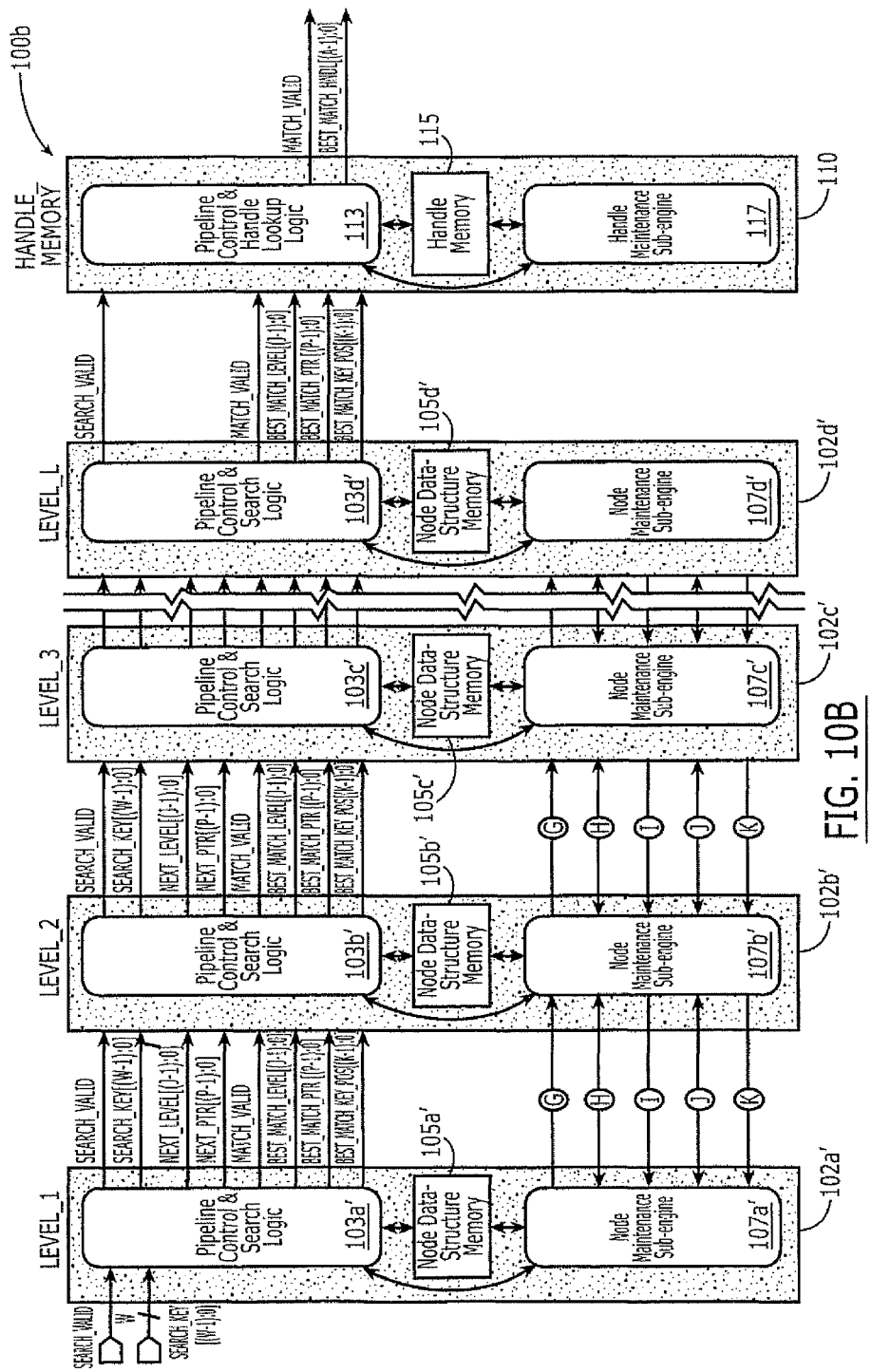

Referring now to FIG. 10B, a pipelined integrated circuit search engine 100*b* according to an additional embodiment of the present invention is illustrated. In this search engine 100*b*, the first, second, third and fourth search and tree maintenance engines 102*a'*-102*d'* are each illustrated as including respective control modules 103*a'*-103*d'*, node memories 105*a'*-105*d'* and node maintenance sub-engines 107*e*-107*d'*.

This search engine 100*b* is similar to the search engine 100*a* of FIG. 10A, however, the associated data (e.g., prefix handles), which was stored locally in each of the plurality of memory levels (LEVEL_1-LEVEL_L) illustrated in FIG. 10A, is now aggregated together within a dedicated handle memory lookup engine 110. This handle memory lookup engine 110 includes a pipeline control and handle lookup module 113, handle memory 115 and a handle maintenance sub-engine 117, which is communicatively coupled by an interface P (not shown) to the node maintenance sub-engines 107*a'*-107*d'*. The handle memory lookup engine 110 is configured as a last stage to the pipelined search engine 100*b*. To support the transfer of the prefix handles to a dedicated handle memory lookup engine 110, the output signal lines associated with the BEST_MATCH_HANDLE[(A−1):0] in FIG. 10A are replaced by the following signal lines: BEST_MATCH_LEVEL[(J−1):0], BEST_MATCH_PTR[(P−1):0] and BEST_MATCH_KEY_POS[(K−1):0]. The signal BEST_MATCH_LEVEL[(J−1):0] identifies the level within the multi-way tree that contains the matching search prefix and the signal BEST_MATCH_PTR[(P−1):0] identifies the "matching" node. The signal BEST_MATCH_KEY_POS [(K−1):0] identifies the location of the search prefix within the "matching" node. These three signals are referred to herein collectively as the BEST_MATCH_* signals.

Figure 11A:
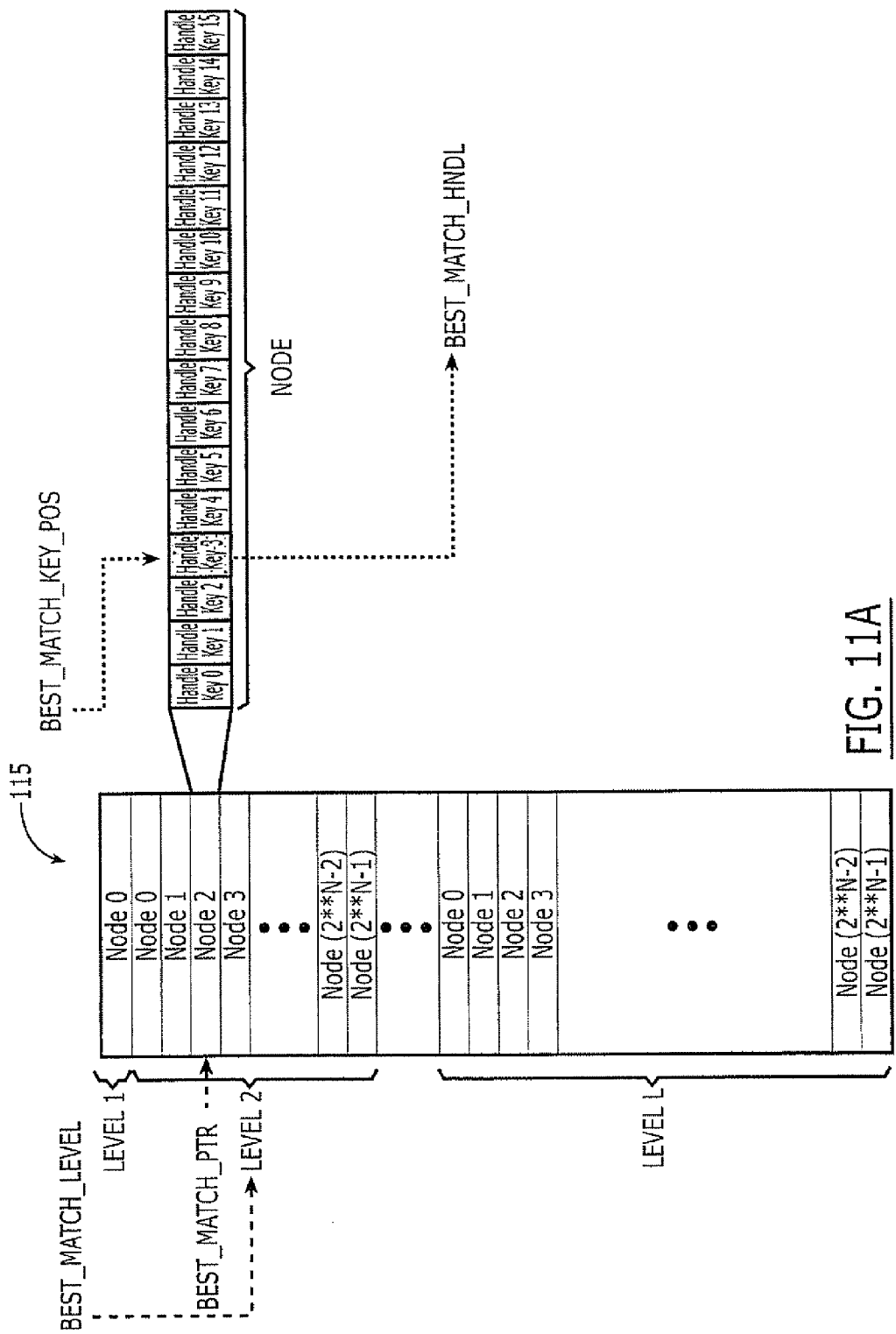
FIGS. 11A-11B are schematic diagrams that illustrate various allocations handles within a handle memory used in integrated search engine devices according to embodiments of the present invention.

Upon detection of an exact match within the search engine 100*b*, the BEST_MATCH_* signals are passed to the handle memory lookup engine 110, where they are then used as corresponding portions of a memory address. This memory address is applied as a read address to handle memory 115, to thereby obtain a handle associated with the matching search prefix (i.e., matching entry) within the multi-way tree. This handle (BEST_MATCH_HNDL[(A−1):0]) is then passed to the output of the search engine device 100*b* to complete the search operation. As illustrated by FIG. 11A, this handle memory 115 may be allocated so that all handles are grouped hierarchically (i) by level within the multi-way tree (selected by BEST_MATCH_LEVEL[(J−1):0]), (ii) by node within a respective level (selected by BEST_MATCH_PTR[(P−1):0]); and (iii) by position within a respective node (selected by BEST_MATCH_KEY_POS[(K−1):0]).

Figure 10C:
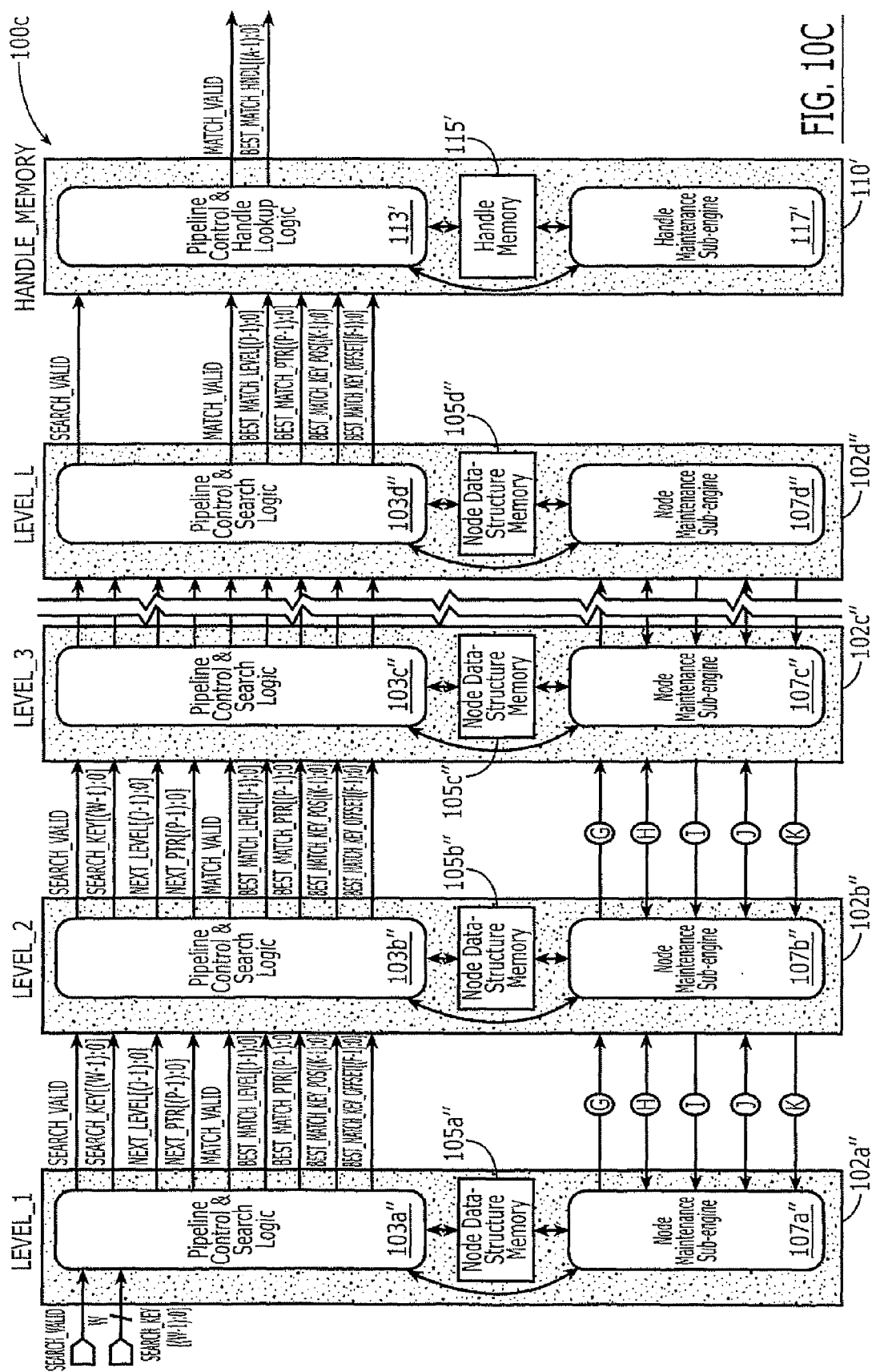

Referring now to FIG. 10C, a pipelined integrated circuit search engine 100*c* according to another embodiment of the invention may be configured to have LPM capability, which is the capability to identify a search prefix that represents a longest prefix match with an applied search prefix. In this case, the hierarchical memory within the search engine 100*c* is configured to store an SPM with each search prefix located above the lowest memory level (LEVEL_L) (i.e., for all search prefixes that do not reside at a leaf level of the multi-way tree). Operations to derive SPMs for search prefixes within a multi-way tree are described more fully hereinabove with respect to FIGS. 4A-4D and TABLES 2-6. In this search engine 100*c*, the first, second, third and fourth search and tree maintenance engines 102*a'''*-102*d'''* are each illustrated as including respective control modules 103*a'''*-103*d'''*, node memories 105*a'''*-105*d'''* and node maintenance sub-engines 107*a'''*-107*d'''*. In addition, the handle memory lookup engine 110' includes a pipeline control and handle lookup module 113', handle memory 115' and a handle maintenance sub-engine 117', which is communicatively coupled by an interface P (not shown) to the node maintenance sub-engines 107*a'''*-107*d'''*.

Figure 11B:
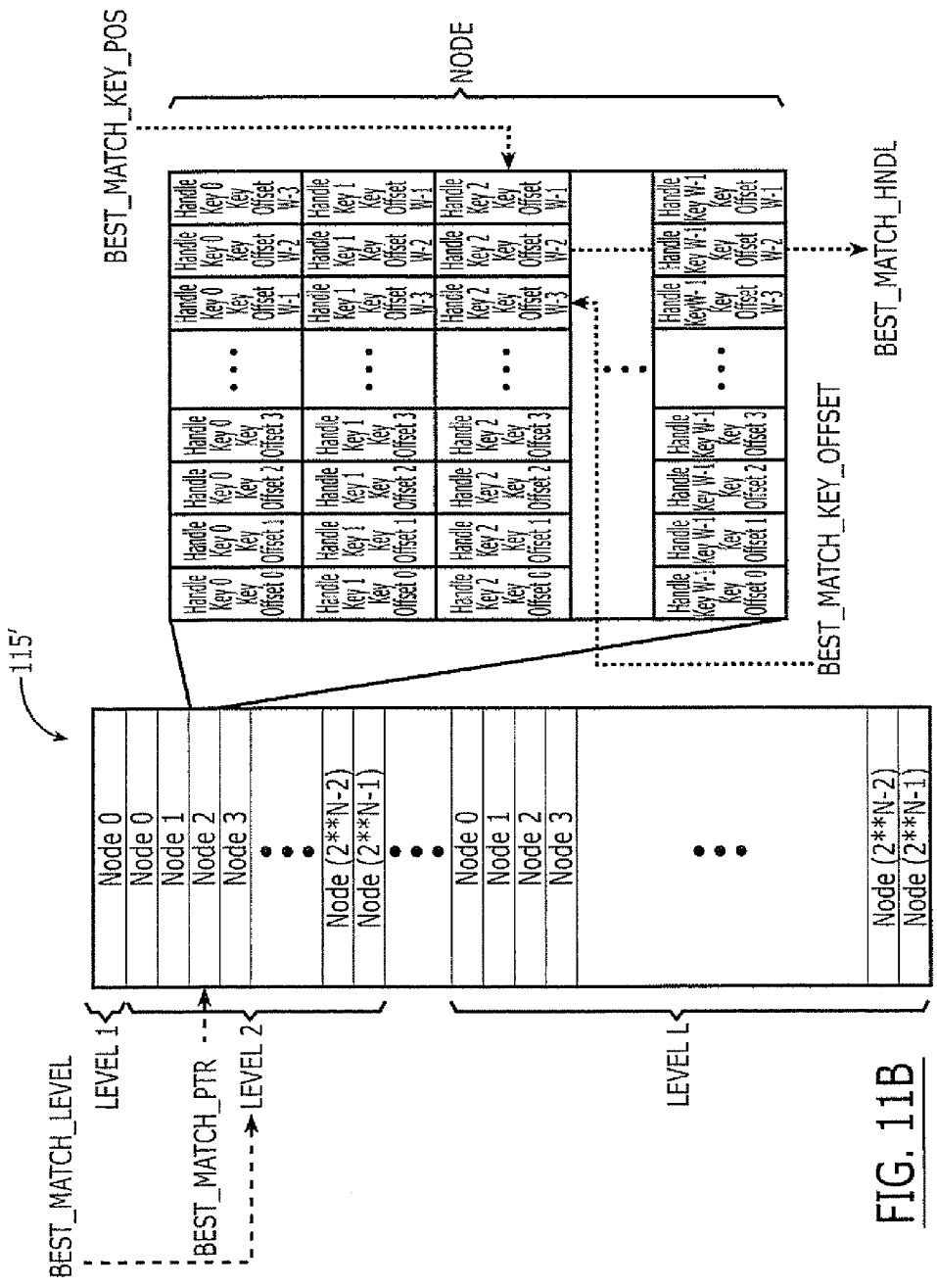
Figure 12:
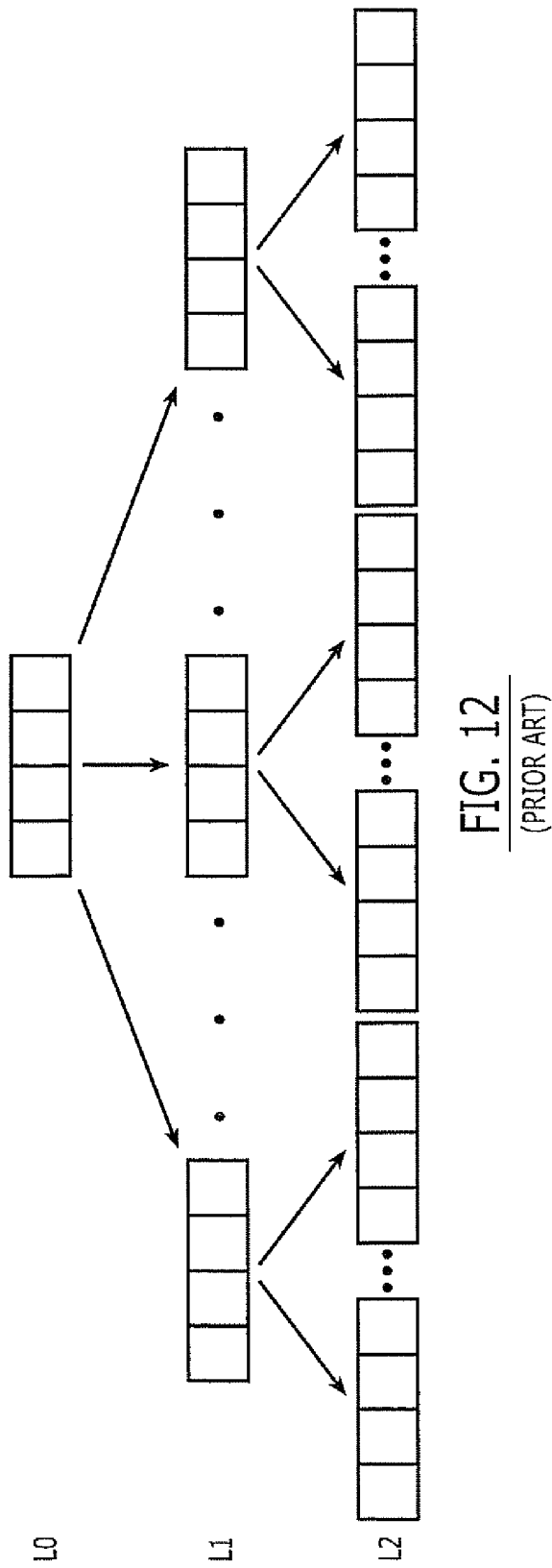
FIG. 12 illustrates a conventional three-level b*tree data structure of 3/4 efficiency (i.e., N/(N+1)=3/4), having four key locations per node.
Figure 13A:
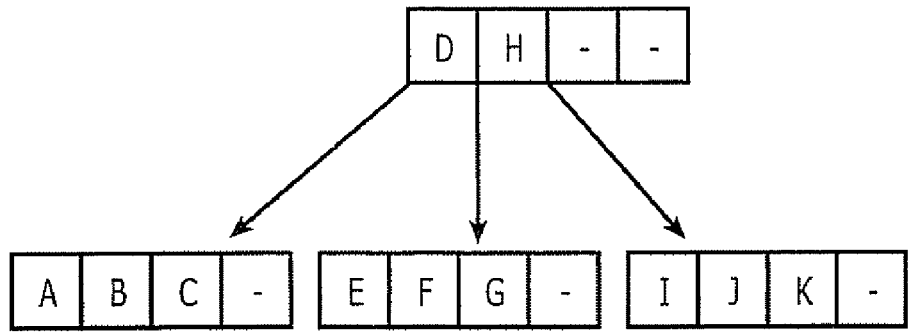
FIG. 13A illustrates a portion of a b*tree having a parent node and three sibling nodes with excess capacity.
Figure 13B:
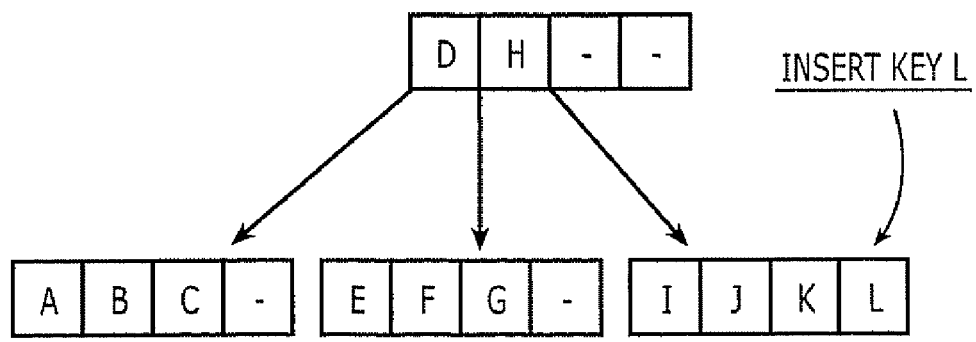
FIG. 13B illustrates an example of a search key insertion into the b*tree of FIG. 13A.
Figure 13C:
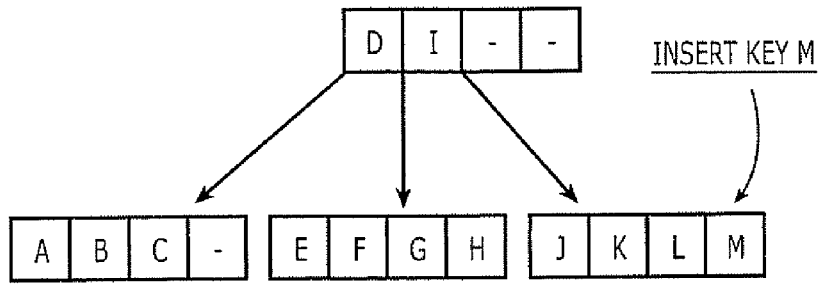
FIG. 13C illustrates an example of a search key insertion into the b*tree of FIG. 13B, which requires an overflow into an adjacent sibling node.
Figure 13D:
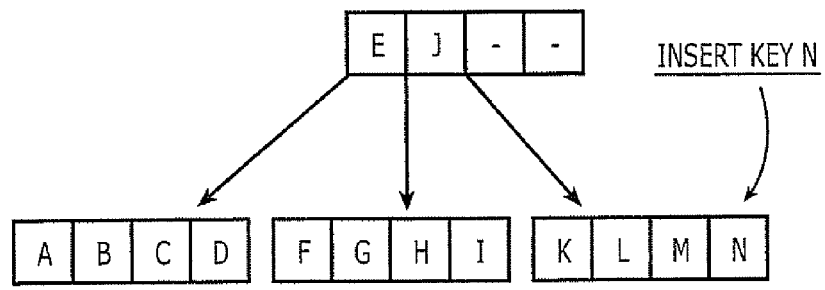
FIG. 13D illustrates an example of a search key insertion into the b*tree of FIG. 13C, which requires an overflow into non-adjacent sibling node.
Figure 13E:
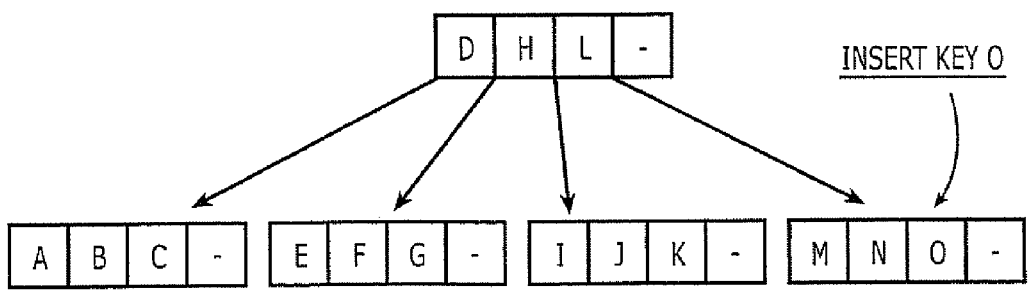
FIG. 13E illustrates an example of a search key insertion into the b*tree of FIG. 13D, which requires a 3-4 split for the b*tree to remain structurally correct.
Figure 14A:
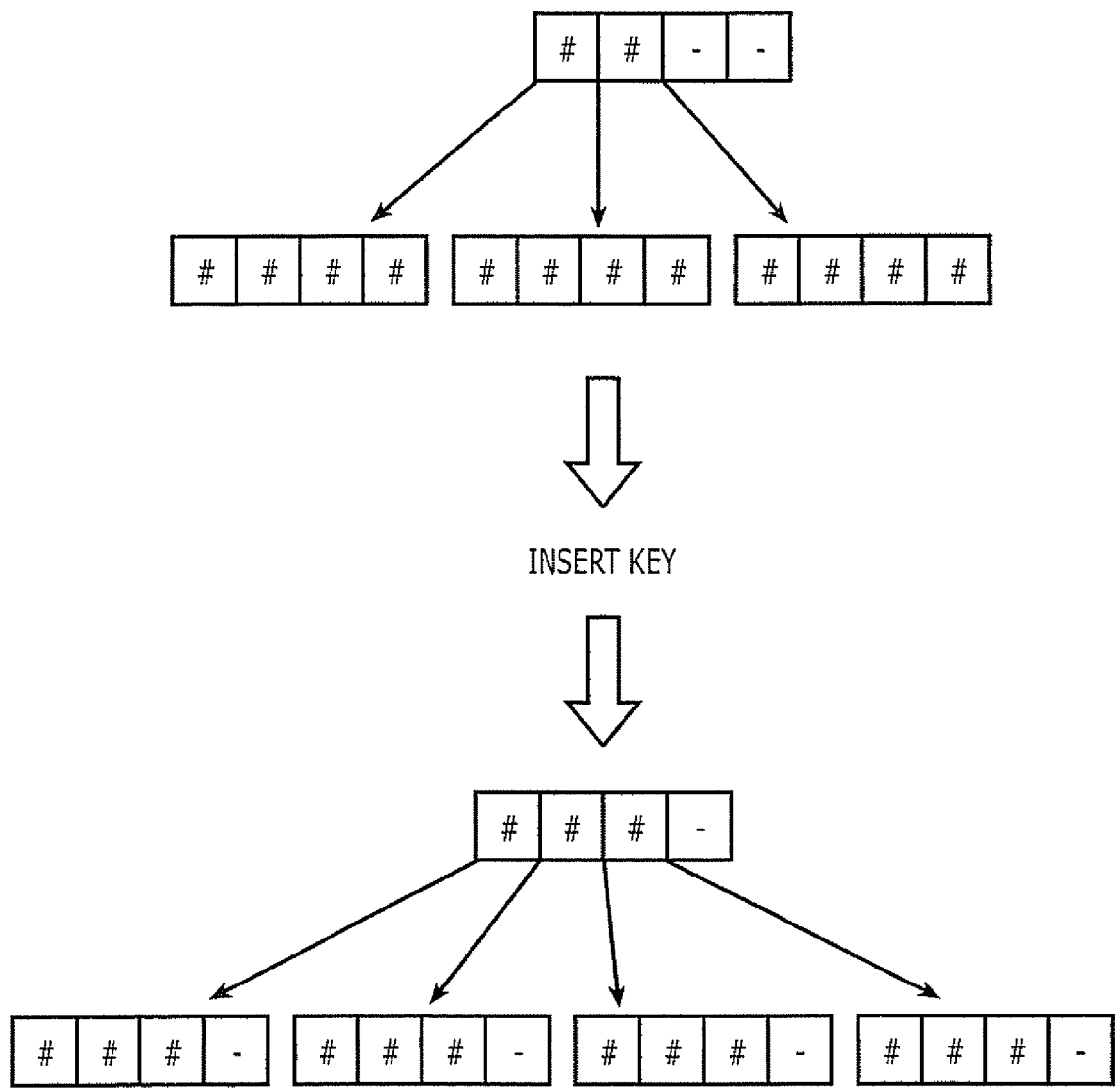
FIG. 14A illustrates an example of a search key insertion into a b*tree that requires a split to remain structurally correct.
Figure 14B:
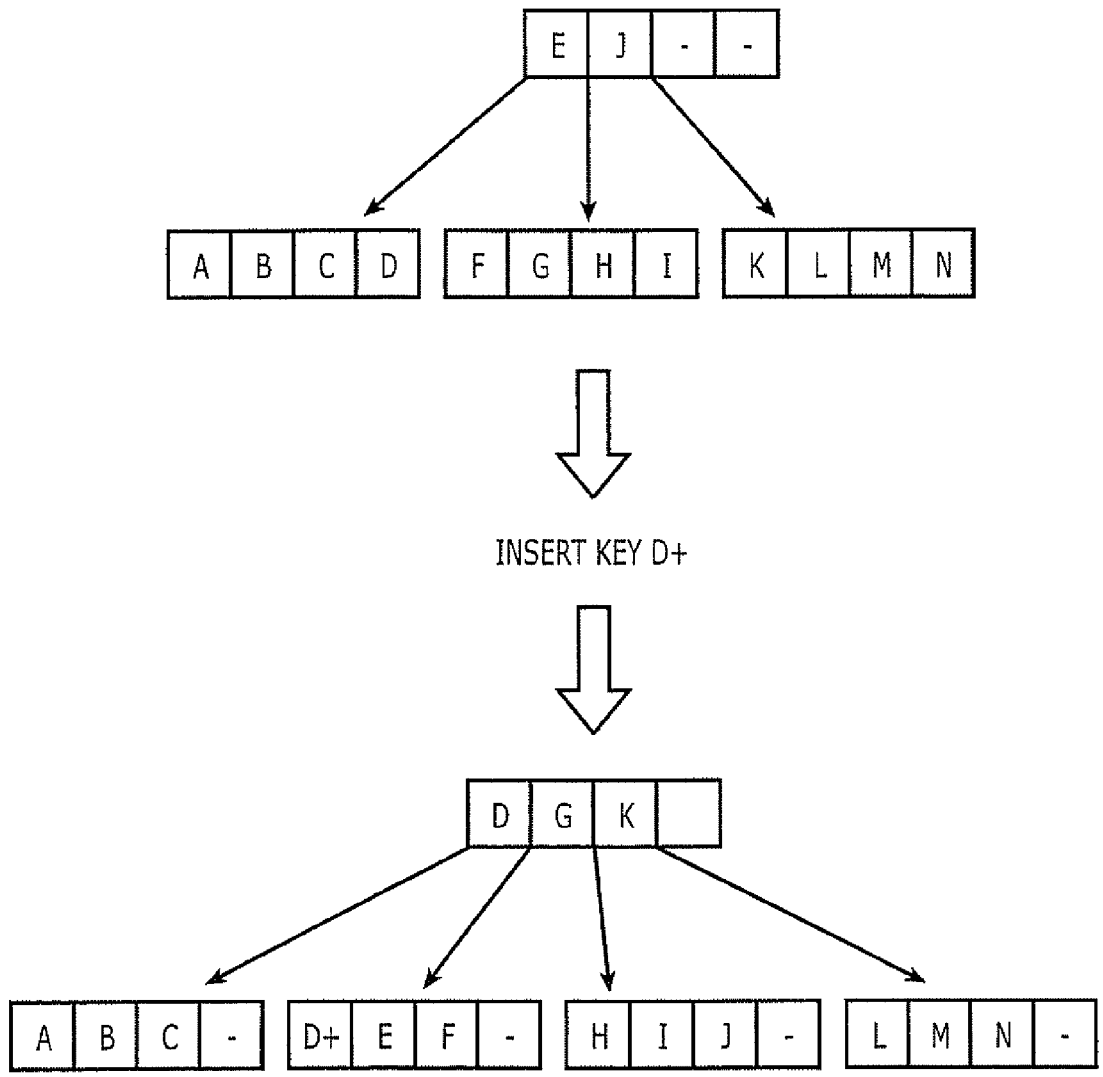
FIG. 14B illustrates an example of a search key insertion (search key D+) into a b*tree that requires a split to remain structurally correct.
Figure 14C:
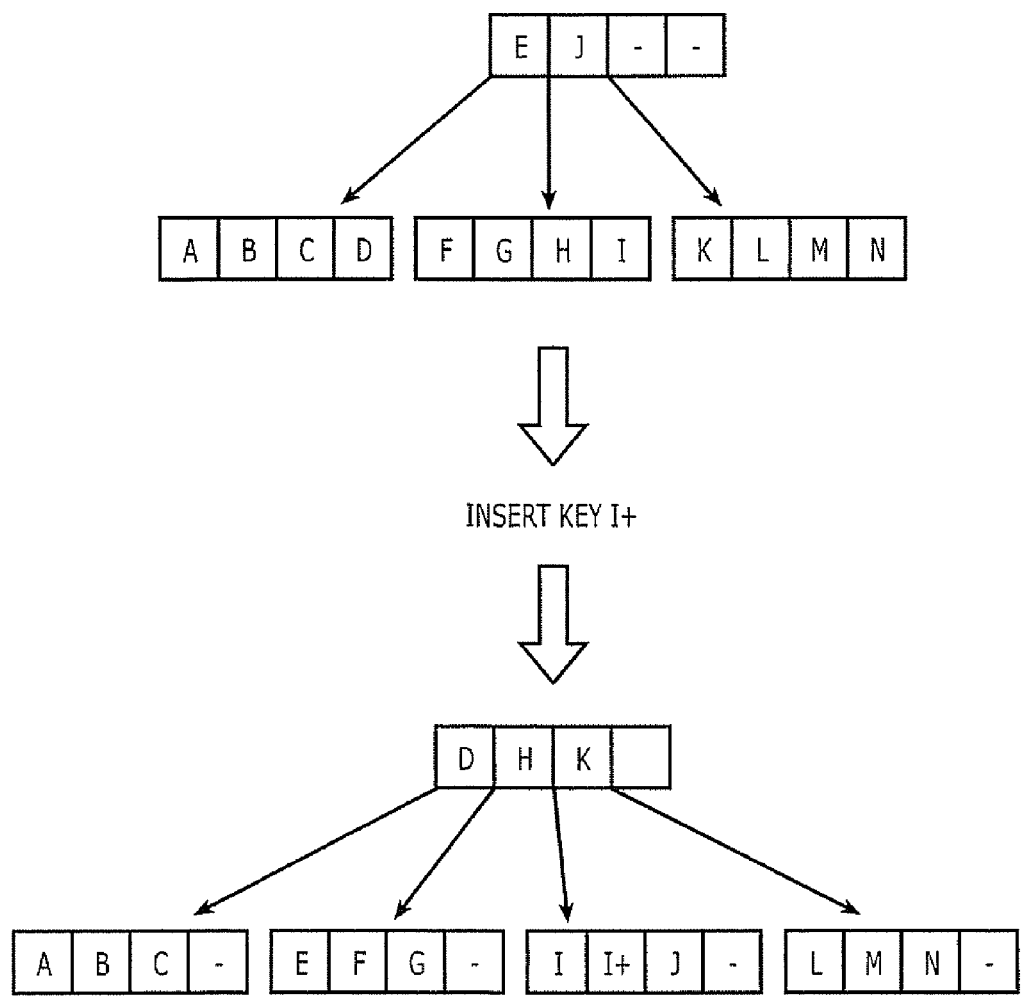
FIG. 14C illustrates an example of a search key insertion (search key I+) into a b*tree that requires a split to remain structurally correct.
Figure 14D:
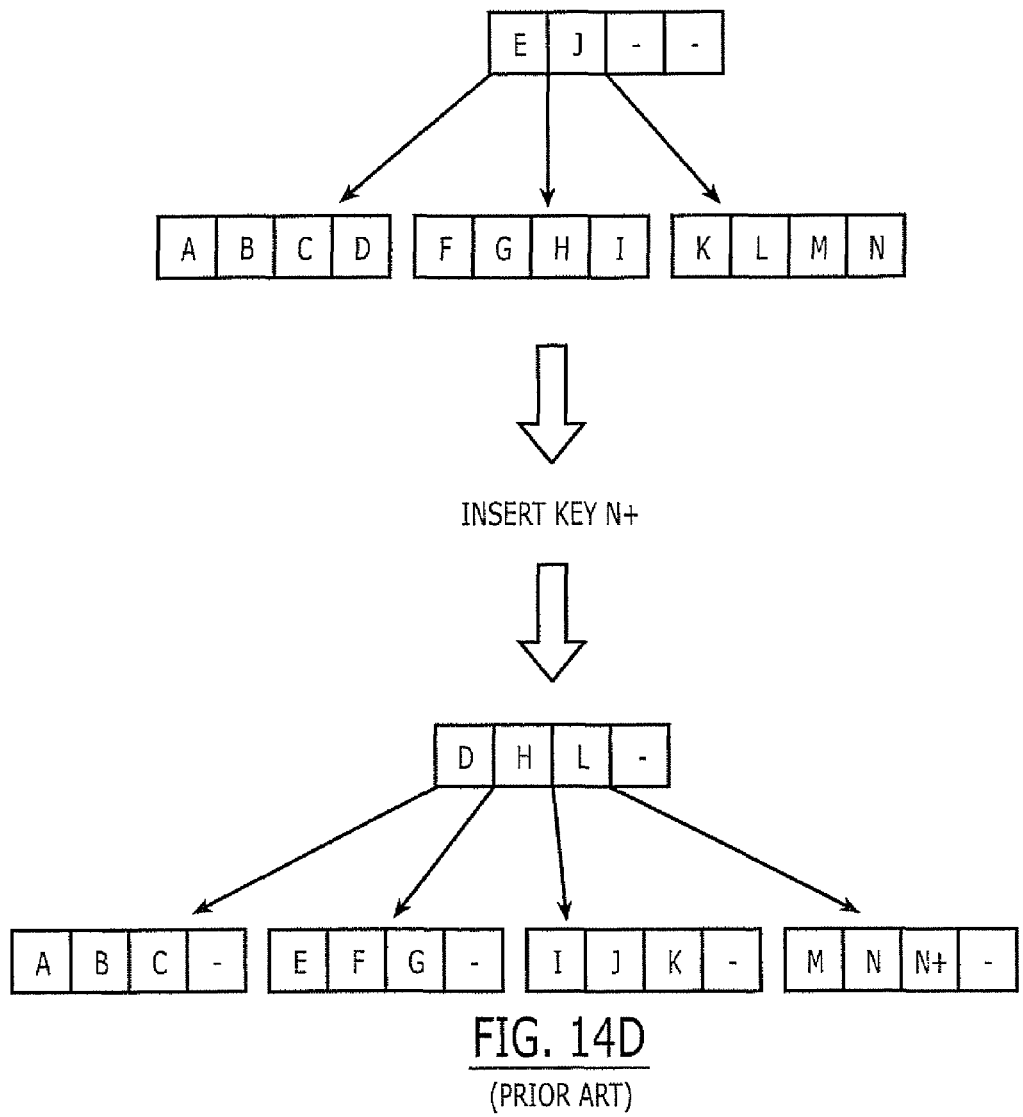
FIG. 14D illustrates an example of a search key insertion (search key N+) into a b*tree that requires a split to remain structurally correct.

In particular, the search engine 100*c* of FIG. 100 is similar to the search engine 100*b* of FIG. 10B, however, an additional signal BEST_MATCH_KEY_OFFSET[(F−1):0] is generated by each of the sub-engines 102*a'''*-102*d'''* within the pipeline. This additional signal identifies the location of an asserted bit (or set bit position) within an SPM associated with a search prefix that is evaluated during a corresponding search operation. Thus, using the b-tree 40 of FIG. 4B as an example of a multi-way tree supported by the search engine 100*c*, the identity of the seventh bit of the SPM associated with the search prefix R:170/8 at node 1-1 of the b-tree 40 would be specified by the signal BEST_MATCH_KEY_OFFSET [(F−1):0] for the case of an applied search prefix equal to 171. Referring now to FIGS. 11B and 4C.2, the handle memory 115' used within the search engine 100*c* may be allocated so that all handles are grouped hierarchically (i) by level within the multi-way tree (selected by BEST_MATCH_LEVEL[(J−1):0]), (ii) by node within a respective level (selected by BEST_MATCH_PTR[(P−1):0]); (iii) by position within a respective node (selected by BEST_MATCH_KEY_POS[(K−1):0]); and (iv) by an offset within a respective position (selected by BEST_MATCH_KEY_OFFSET[(F−1):0]). Alternatively, the handle memory 115' may be configured as illustrated by FIG. 4D.2.

As described hereinabove, each level of the b-tree above the lowermost leaf level stores span prefix masks (SPMs) and potentially large numbers of handles within handle memory that are duplicates of handles associated with leaf level nodes. The set bits within the SPMs and their associated handles are required by the longest prefix match (LPM) detection operations in order to find and resolve matches that exist off the node-to-node path traversed by the b-tree search logic (i.e., a traversal/search path) during a search operation. In other words, because a matching process may not visit the leaf node where the longest prefix match exists (due to the greater-than-or-equal-to comparisons and the storage order of the keys within the b-tree), the b-tree is augmented with SPMs that indicate the existence of prefixes down and to the left within the b-tree relative to a higher node entry being compared. Thus, for the leaf parent level within the b-tree, the location of the leaf node containing a longest prefix match is known because branch information is stored with each b-tree node above the leaf level. However, what is typically not known is the location within that leaf node of the matching entry. To address this limitation, a separate bitmap, also referred to herein as an M-bitmap (because there will be one bit for each entry in a leaf node containing M entries), can be provided.

In particular, the search engine 100*c* of FIG. 10C may utilize a relatively small quantity of additional bitmap memory to achieve potentially significant reductions in overall handle memory requirements by eliminating at least some and preferably most replication of handles within handle memory. As illustrated by FIGS. 5C and 10C, the node data-structure memory at a leaf parent level within the search pipeline may be associated with bitmap tables that correspond to respective nodes at the leaf parent level. In particular, separate M-bitmap memory may be configured to store the M-bitmaps associated with the leaf parent level of the b-tree. This latter configuration, which may result from an expansion of memory within a leaf parent level search and tree maintenance engine (e.g., 102*c'''*), permits access to an M-bitmap associated with a node outside the search path in parallel with access to a leaf node within the search path.

As will now be described with respect to FIG. 5C, these bitmap tables, which require relatively little additional memory capacity, typically eliminate the need for larger quantities of handle duplication within a handle memory. For example, FIG. 5C.1 illustrates a first bitmap table associated with node 1-0 of the b-tree 40 and a second bitmap table associated with node 1-1 of the b-tree 40. The first bitmap table includes three bitmap entries associated with leaf nodes 2-0, 2-1 and 2-2 and the second bitmap table includes three bitmap entries associated with leaf nodes 2-4, 2-5 and 2-6. These six bitmap entries may be stored within memory that is associated with the leaf parent level of the pipeline or, alternatively, with the leaf level of the pipeline (e.g., LEVEL_L). Each bitmap entry has a width equal to a maximum number of prefixes that can be stored within the corresponding leaf node. The value of each M-bit bitmap can be determined as follows. For each prefix in a leaf node at offset X (left-to-right) that has been elevated into the SPM of a corresponding leaf parent node (i.e., it is a prefix of an entry in the leaf parent node), bit X is set to "1". If the prefix in the leaf node at offset X is not a prefix of the corresponding leaf parent prefix, bit X will be set to "0".

The bitmap (BM) at node 1-0 that is associated with leaf node 2-0 includes three set bits (i.e., BM=111). These three set bits reflect the fact that all of the first, second and third prefixes A:0/0, B:0/1 and C:0/2 at leaf node 2-0 are reflected as set bits within the SPM associated with prefix D:0/3 at node 1-0. Alternatively, because the SPM associated with the root node 0-0 also reflects the presence of prefix A:0/0, which means a duplicate of the handle associated with prefix A:0/0 may be stored at the root level of the search engine (see, e.g., FIG. 5C.2), the SPM associated with prefix D:0/3 may omit a set bit associated with prefix A:0/0. In this latter case, the bitmap associated leaf node 2-0 may include only two set bits (i.e., BM-011). Similarly, the bitmap (BM) at node 1-0 that is associated with leaf node 2-1 includes one set bit (i.e., BM-001). This single set bit (as a third set bit) reflects the fact that the third prefix V:64/2 at leaf node 2-1 is also reflected as a set bit within the SPM associated with prefix O:96/3 at node 1-0. Finally, the bitmap (BM) at node 1-0 that is associated with leaf node 2-2 includes all "don't cares", shown by the value X, because this bitmap will never be accessed during search operations when it is associated with a rightmost leaf node below leaf parent node 1-0. However, if the leaf parent node 1-0 is expanded to include three prefixes in response to one or more inserts into the b-tree 40, then a node 2-3 (not shown) may be added at the leaf level and the bitmap associated with leaf node 2-2 may contain one or more valid set bits.

Similarly, the bitmap (BM) at parent node 1-1 that is associated with leaf node 2-4 includes two set bits (i.e., BM=011) as second and third set bits. These two set bits reflect the fact that the second and third prefixes N:160/4 and Q:168/6 at leaf node 2-4 are reflected as set bits within the SPM associated with prefix R:170/8 at node 1-1. In addition, the bitmap (BM) at node 1-1 that is associated with leaf node 2-5 includes two set bits (i.e., BM=110). These two set bits reflect the fact that the first and second prefixes U:192/2 and G:192/3 at leaf node 2-5 are reflected as set bits within the SPM associated with prefix H:224/3 at node 1-1. Finally, the bitmap associated with a rightmost leaf node 2-6 of the entire b-tree represents all "don't cares", shown by the value X, because this bitmap will never be accessed during search operations.

The reduction in handle memory requirements for the leaf parent level of the b-tree, which is supported by the use of M-bitmaps within the search engine 100c, is further illustrated by the handle memory 42''' of FIG. 5C.2. This handle memory 42''' is allocated in a manner similar to the handle memory 42 of FIG. 4C.2. However, as illustrated at level 1 of the handle memory 42''', each key at each leaf parent node is associated with only one handle because duplicate handles (associated with keys stored at the lower leaf level of the b-tree) have been eliminated.

Referring again to FIG. 50.1, the search path of an exemplary search key of 171/8 through the b-tree 40 includes the root node 0-0, the leaf parent node 1-1 and the lowermost leaf node 2-5, as described above with respect to FIG. 4B. The longest matching SPM identified during the traversal of node 1-1 is of length six (SPM=000010101), and specifies a prefix of 168/6 residing at leaf node 2-4. The length of six represents the second leftmost set bit within the SPM. Accordingly, the M-bitmap for node 2-4 is read and the second leftmost set bit within the corresponding M-bitmap (011) is identified. This second leftmost set bit, which is at the third bit position within the bitmap, identifies the rightmost prefix Q:168/6 within the leaf node 2-4 as the "third" prefix. Thus, without accessing the key data within node 2-4, which is outside the search path of the b-tree 40 for the applied search key of 17/8, the leaf parent level of the search engine may present the leaf level with a pointer (e.g., BEST_MATCH_PTR) to the best matching prefix handle thus far in the search of the leaf parent node 1-1. This pointer to the best matching prefix handle will be used by the leaf level of the search engine in the event no matching entry is found within the lowermost node 2-5 within the search path. According to some embodiments of the invention, the pointer passed from the leaf parent level to the leaf level may reflect an offset value (e.g., column within a row in handle memory that is the same as the row of the matching prefix within the node/prefix memory). As illustrated by FIG. 10C, an addition signal (e.g., BEST_MATCH_LEVEL), may be used to indicate whether the pointer is an actual handle (e.g., duplicate handle) being passed from an upper level of the b-tree 40 (i.e., from a level above the leaf parent level) to the leaf level, or is a pointer to a handle when generated at the leaf parent level. Moreover, according to alternative embodiments of the invention, the bitmap memory may be linked with the leaf level of the search engine instead of the leaf parent level. According to these alternative embodiments, the leaf parent level will need to identify what bit within the bitmap corresponds to the matching prefix and identify the b-tree pointer to the leaf node containing the SPM match.

Figure 15B:
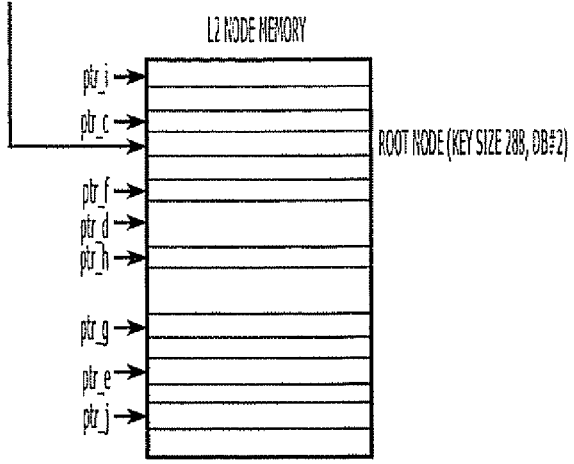
FIG. 15 is an illustration of hierarchical memory that supports a plurality of databases of search keys arranged as a corresponding plurality of multi-way trees of search keys having a shared root node, according to embodiments of the present invention.
Figure 15B:
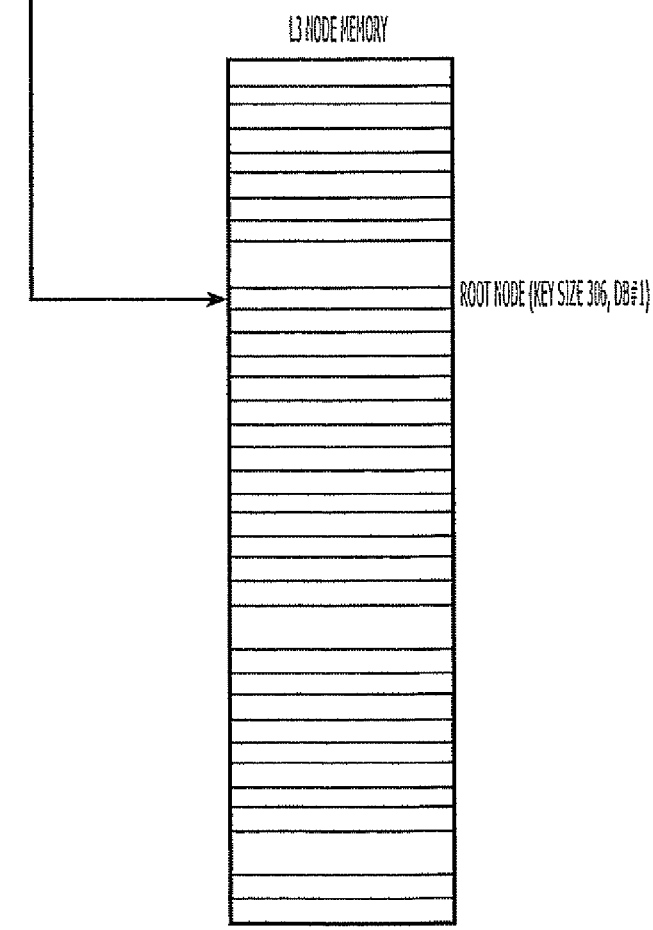

FIG. 15 illustrates a configuration of a hierarchical memory that can be supported by the integrated circuit search engine devices described herein and illustrated by FIGS. 7 and 10A-10C, according to embodiments of the present invention. In particular, FIG. 15 illustrates the top three levels (L1-L3) of a hierarchical memory that is configured to support multiple trees of search keys (a/k/a/ prefixes), which may be fully specified keys for exact match detection or partially specified keys for longest prefix match detection. Each of the searchable trees (e.g., multi-way trees, including b-tree variants) may represent a respective database of search keys and the search keys within each database may have different widths relative to search keys in other databases. FIG. 15 includes FIG. 15A, which illustrates the configuration of a common root node located at the top level (L1) of the hierarchical memory, and FIG. 15B, which illustrates the configuration of node memory at lower levels (e.g., L2 and L3) of the hierarchical memory. As described more fully hereinbelow, the top and lower levels of the hierarchical memory may store root nodes of respective databases.

FIG. 15A also illustrates one embodiment of a searchable (or addressable) database index table associated with the top level of the hierarchical memory. This table may be accessed (e.g., searched or read) upon commencement of a search operation by using the size of an applied search key and database number as a search word (or row address) to retrieve corresponding root node information for the applied search key. In particular, the database index table may include a first column, which identifies whether a database supported by the hierarchical memory is valid (DB_VALID=1) or invalid (DB_VALID=0), and a second column, which identifies the level (ROOT_LVL) at which the root node of a database resides (L1 or L2 or L3 . . . ). A third column of the database index table specifies a root node pointer (ROOT_PTR) for those databases having a root node below the highest level of the hierarchical memory and a fourth column specifies the fill count (ROOT_FCNT) of the corresponding root node. This fill count value identifies the number of search keys located at the root node of a specified database. Because the root node of a respective tree may reside below L1, the maximum number of databases supported by the hierarchical memory may exceed the maximum number of search keys supported by the common root node at L1. As illustrated by the database index table located at the left side of FIG. 15A, the application of a 54-bit key associated with database 0 at the commencement of a search operation will yield an initial determination that the root node of the corresponding tree resides at L1 and has a fill count of one. Likewise, the application of a 54-bit key associated with database 1 will yield an initial determination that the root node of the corresponding tree resides at L1 and has a fill count of two. The application of a 144-bit key associated with database 0 (for 144-bit keys) will yield an initial determination that the root node of the corresponding tree resides at L1 and has a fill count of two. In contrast, the application of a 288-bit key associated with database 2 (for 288-bit keys) will yield an initial determination that the root node of the corresponding tree resides at L2 and has a fill count of one. A pointer, ptr_a, is also retrieved, which specifies the memory location of the root node at L2. As illustrated by FIG. 15B, this root node may be stored within L2 node memory, which may be row-addressable random access memory. Finally, the application of a 306-bit key associated with database 1 (for 306-bit keys) will yield an initial determination that the root node of the corresponding tree resides at L3 and has a fill count of 140. A pointer, ptr_b, is also retrieved, which specifies the memory location of the root node at L3. As illustrated by FIG. 15B, this root node may be stored within L3 node memory, which may be row-addressable random access memory.

The combined root node storage at level L1 of the hierarchical memory is illustrated as including the root nodes for three logical databases: {(Key Size=54, DB#0), (Key Size=54, DB#1) and (Key Size=144, DB#0)}. This combined root node storage may be provided as flip-flop storage to thereby avoid additional address-to-row selection and row-to-read data column muxing latencies. The use of a combined root node also enables a single parallel read operation to be performed from the combined root node storage (e.g., flip-flop storage) to identify the correct database to be searched concurrently with performing key searching and identifying a branching path to a node at a next lower level of memory. Thus, the use of a combined root node eliminates an additional latency associated with performing a preliminary database lookup operation to identify a corresponding root node to be searched using the applied search key.

The root node for Key Size=54, DB#0 stores key size, database number and validity information in memory (e.g., flip-flop storage) identified as L1_KEY_CNTXT_STORE and a single key (Key 0) in memory (e.g., flip-flop storage) identified as L1_KEY_STORE. This single key occupies Key 0 storage within the combined root node. Storage is also provided a pair of child pointers. These child pointers include a left child pointer (L1_KEY_LCH_PTR_STORE), ptr_c, associated with the single key (Key 0) and a right child pointer (L1_DB_RCH_PTR_STORE), ptr_d, associated with the corresponding logical database (Key Size=54, DB#0). As illustrated by FIG. 15B, these left and right child pointers point to respective nodes at L2 of the hierarchical memory. Storage for the left child and right child fill count designations for the nodes at L2, which are associated with ptr_c and ptr_d, are provided in: L1_KEY_LCH_FCNT_STORE and L1_DB_RCH_FCNT_STORE.

The root node for Key Size=54, DB#1 stores key size, database number and validity information in L1_KEY_CNTXT_STORE and two keys (Key 0, Key 1) in L1_KEY_STORE. These two keys occupy Key 1 and Key 2 storage within the combined root node. Storage is also provided for a left child pointer, ptr_e, associated with Key 1, a left child pointer, ptr_f, associated with Key 2 and a right child pointer, prt_g, associated with the corresponding logical database (i.e., the database for key size Key Size=54, DB#1). These three pointers, ptr_e, ptr_f and ptr_g, point to three nodes at L2 of the hierarchical memory, which have respective fill counts specified as: Key 1 LCH_FCNT, Key 2 LCH_FCNT and DB 54,1 RCH_FCNT.

Finally, the root node for Key Size=144, DB#0 stores key size, database number and validity information in L1_KEY_CNTXT_STORE and two keys (Key 0, Key 1) in L1_KEY_STORE. These two keys occupy Key 3 and Key 4 storage within the combined root node. Storage is also provided for a left child pointer, ptr_h, associated with Key 3, a left child pointer, ptr_i, associated with Key 4 and a right child pointer, prt_j, associated with the corresponding logical database (i.e., the database for key size Key Size=144, DB#0). These three pointers, ptr_h, ptr_i and ptr_j, point to three nodes at L2 of the hierarchical memory, which have respective fill counts specified as: Key 3 LCH_FCNT, Key 4 LCH_FCNT and DB 144,0 RCH_FCNT.

Figure 16:
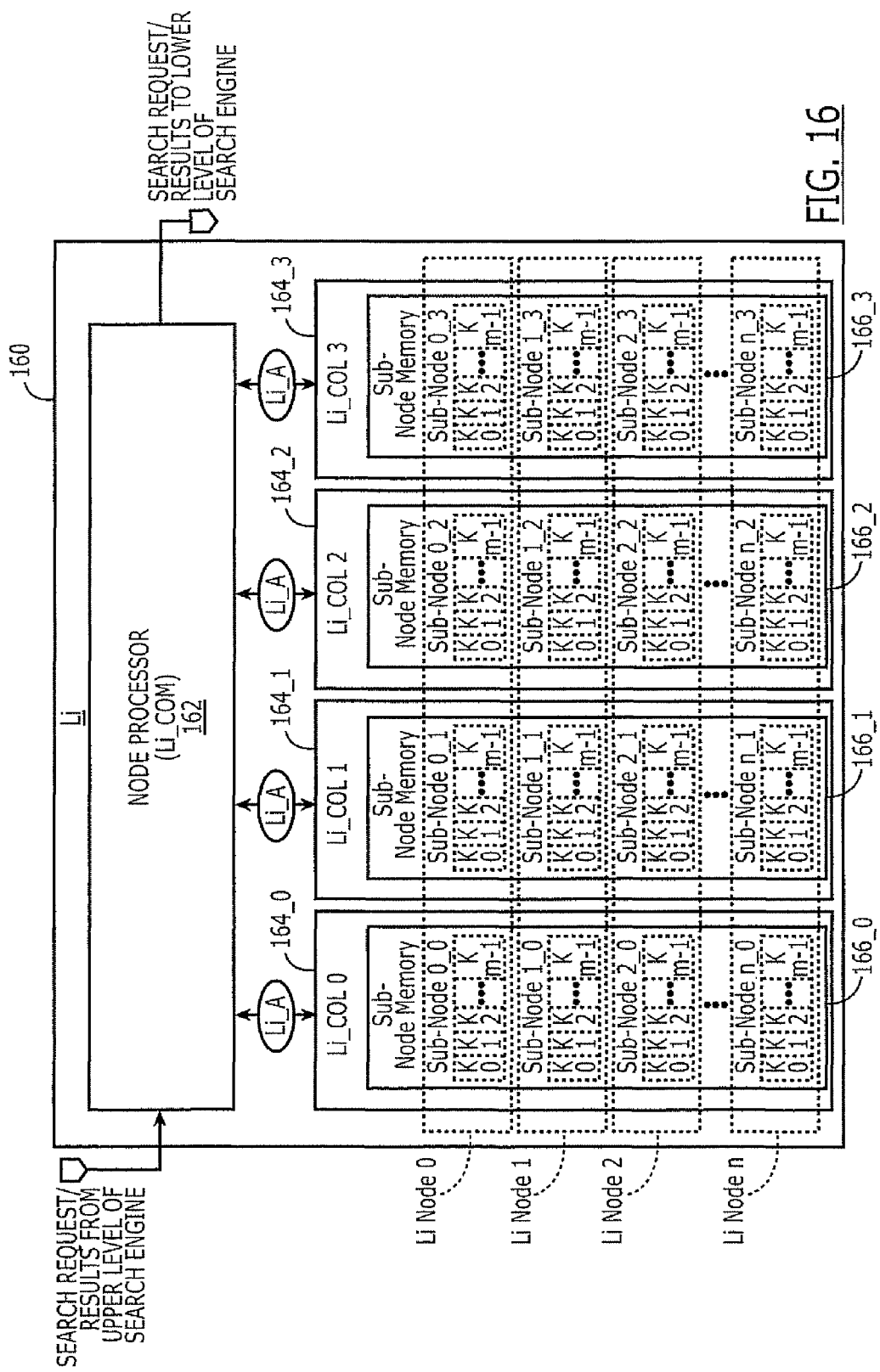
FIG. 16, is a block diagram of a multi-node sub-engine within a search engine device, according to embodiments of the present invention.
Figure 17B:
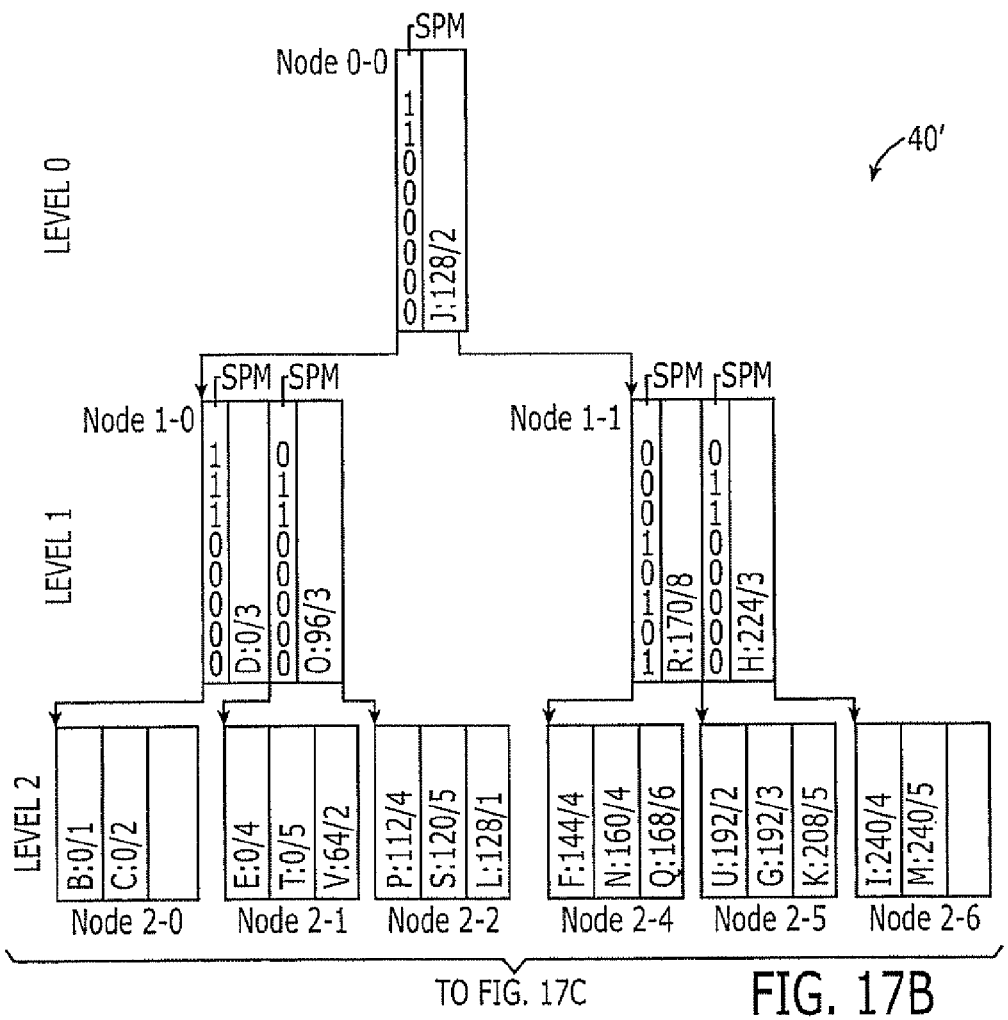
FIG. 17B illustrates a three-level b-tree data structure that contains W-bit search prefixes and W-bit span prefix masks (SPMs) according to embodiments of the present invention.
Figure 17C:
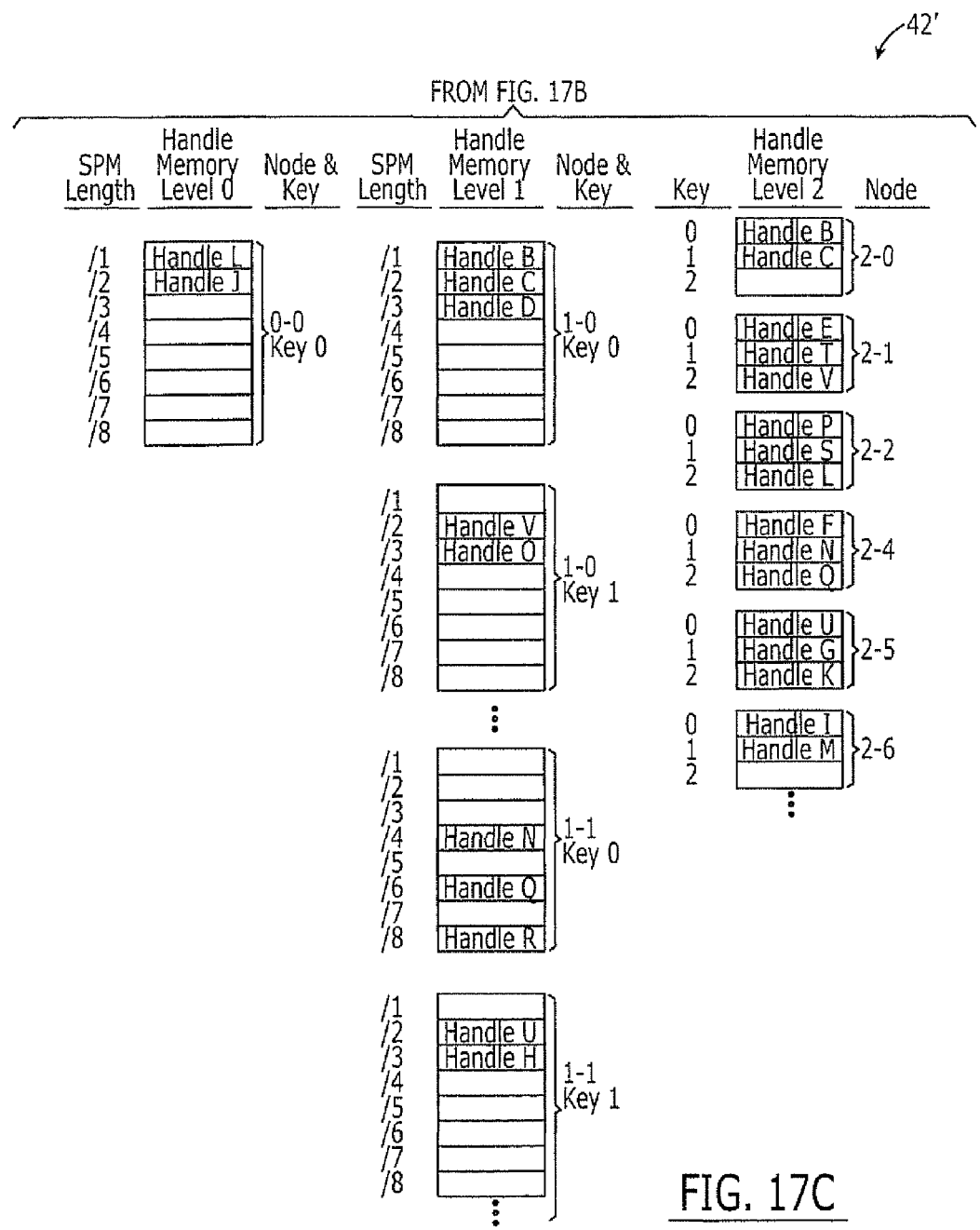
FIG. 17C illustrates an allocation of handle memory that supports the b-tree data structure of FIG. 17B.

Referring now to FIG. 16, the pipelined arrangement of search and tree maintenance sub-engines within the search engines illustrated by FIGS. 7, 10A-10C and 11A-11B, may be configured to support a combined multi-node sub-engine 160 located at a non-leaf level of a multi-way tree, such as a b*tree or other b-tree variant. In the illustrated embodiment of FIG. 16, the multi-node sub-engine 160 may be located at an intermediate level (Li) of a pipelined search engine, where 1<i<L for the case where L1 includes the root node of the tree and the integer L designates the leaf level of the tree. Variants of the node sub-engine 160 illustrated by FIG. 16 may also be used to store search keys at the root node of the tree at LEVEL_1 (see, e.g., FIG. 15) or store search keys (w/o child pointers) for nodes located at the leaf level (i.e., LEVEL_L) of the tree, according to further embodiments of the present invention.

In particular, the multi-node sub-engine 160 illustrated by FIG. 16 is configured to efficiently support a plurality of nodes having a large number of keys (and sub-tree "child" pointers) associated with each node. The multi-node sub-engine 160 is illustrated as including a node processor 162 and a plurality of columns of sub-nodes 164_0-164_3, which are operatively coupled to the node processor 162 by corresponding data/control interfaces Li_A. The plurality of columns of sub-nodes 164_0-164_3 include corresponding sub-node memories 166_0-166_3, which provide, among other things, key storage. Each of the sub-node memories 166_0-166_3 is illustrated as supporting as many as "m" keys (K0-K(m-1)) for as many as "n+1" nodes at a corresponding level of the tree. Thus, in the illustrated embodiment of FIG. 16, which contains four (4) columns of sub-nodes, the multi-node sub-engine 160 is configured to support as many as 4m keys for each of "n+1" nodes located at level "i" of a multi-way tree. The node processor 162 is also configured to store child pointers associated with the search keys stored in the plurality of columns of sub-nodes 164_0-164_3.

The node processor 162 is configured to respond to an incoming search request (and upper level search results received at an input port) by distributing an applied search key in parallel via the data/control interfaces Li_A to each of the plurality of columns of sub-nodes 164_0-164_3 so that sub-node search operations may be performed therein. The node processor 162 is further configured to receive corresponding sub-node search results generated by the plurality of columns of sub-nodes 164_0-164_3. These sub-node search results include sub-node branching results that enable the node processor 162 to resolve a branching decision. The node processor 162 may also use the data/control interfaces Li_A to control insert and delete processing within the plurality of columns of sub-nodes 164_0-164_3.

In particular, each of the plurality of columns of sub-nodes 164_0-164_3 is configured to perform a sub-node search of a designated node (i.e., Node 0, Node 1, . . . , or Node n) by comparing the applied search key in parallel with the corresponding sub-node keys stored in the corresponding sub-node memory 166_0-166_3 and identifying a respective branching key (one from each sub-node memory in each column) from the respective stored keys. In response to the parallel search operations, each of the plurality of columns of sub-nodes 164_0-164_3 returns, among other things, an indicator of position of its identified branching key and a relative relationship between the applied search key and its branching key (e.g., less than, greater than or equal to branching key, greater than smallest x keys in the sub-node but less than largest y keys in the sub-node, etc.), as sub-node branching results. Where appropriate, a column of sub-nodes may return a match valid indicator and an indicator of a matching key to the node processor 162, which generates an overall search result from the information received from the plurality of columns of sub-nodes 164_0-164_3. In particular, the node processor 162 evaluates the multiple sub-node branching results received from the plurality of columns of sub-nodes 164_0-164_3 and resolves a final node branching result by generating, among other things, a child pointer (a/k/a branching node pointer) associated with a selected branching key and relative relationship to the applied search key, as a search result. This search result is passed via an output port of the node processor 162 to a lower level node within the search engine.

According to further embodiments of a search engine that is capable performing longest prefix match (LPM) operations, one of the plurality of columns of sub-nodes 164_0-164_3 may perform a sub-node search operation by passing a best match prefix length (and possibly a best match SPM offset) to the node processor 162 in the event a search key in the corresponding sub-node matches the applied search key. As described hereinabove, these search operations may utilize SPMs (stored with the search keys in the sub-node memories) to identify a best match condition. The corresponding sub-node also passes an indicator of position of the best matching search key to the node processor 162 so that the node processor 162 can identify a handle associated with the best matching key.

Referring now to FIGS. 10C and 17A-17C, additional embodiments of the invention include a pipelined search engine that is configured to store at least one b-tree 40' of W-bit search prefixes therein along with corresponding W-bit span prefix masks (SPMs) and handles stored in handle memory 42'. According to some of these embodiments of the invention, the handle memory 42' may be maintained within a handle memory lookup engine 110. The organization of this b-tree 40' and handle memory 42' is similar to the organization of the b-tree 40 and handle memory 42 of FIGS. 4B-4C, however, search prefix A, which has a zero prefix length, has been eliminated from the leaf node 2-0 of the b-tree 40 and all three instances of Handle A associated with search prefix A (i.e., default route prefix A:0/0) have been omitted from the handle memory 42' to thereby reduce handle memory capacity requirements. Moreover, in contrast to the handle memory 42 of FIG. 4C, all handle memory blocks associated with prefixes stored at non-leaf nodes of the b-tree 40' omit handle memory storage for the /0 SPM length, which was necessary to support a b-tree having a zero length prefix entry.

The removal of the default route prefix A:0/0 from the b-tree 40' facilitates the use of shorter W-bit SPMs instead of (W+1)-bit SPMs, which saves memory, and also enables the SPMs to more efficiently encode key prefix length, as described in U.S. application Ser. No. 11/768,646, filed Jun. 26, 2007, entitled "Integrated Search Engine Devices that Support LPM Search Operations Using Span Prefix Masks that Encode Prefix Length, the disclosure of which is hereby incorporated herein by reference.

To compensate for the removal of the zero-length prefix (a/k/a default route prefix) from the search path of the hierarchical b-tree, a database index table is provided to store a zero prefix length indicator far each of the b-tree databases supported by the search engine along with any corresponding handle associated with a zero-length prefix. This database index table of FIG. 17A is similar to the table illustrated on the left side of FIG. 15A, however, two additional columns are provided to store a zero prefix length indicator (PREF_LEN_0<20>) and a corresponding 20-bit handle (PREF_LEN_HNDL<19:0>), if the indicator has been set. The columns associated with a selected database may be accessed in advance of or concurrently with operations to search a corresponding b-tree of search prefixes, to thereby identify whether the database contains a zero-length prefix that matches all applied search keys and, if so, retrieve a corresponding handle. A zero-length prefix may be indicated when the indicator has been set to a logic 1 value (i.e., PREF_LEN_0<20>=1) and, if so, the corresponding handle read from the database index table is returned as the best match handle in the event the search of the b-tree fails to detect a match.

Accordingly, as described above, a pipelined search engine according to additional embodiments of the present invention is configured to detect a match between an applied search key and a default prefix associated with a b-tree without traversing the b-tree during an LPM search operation. This default prefix may be a prefix having a zero prefix length (e.g., 0/0) and the pipelined search engine may be configured to block insertions of a default prefix into the corresponding b-tree. Moreover, in the event the search engine supports multiple databases of search prefixes, the search engine may also operate to store handles associated with default prefixes received by the pipelined search engine, in a database index table (or other memory) located outside the search paths of a corresponding plurality of databases supported by the search engine. According to these embodiments, the search engine may configured to respond to a search instruction by performing a longest prefix match (LPM) search operation within the b-tree and a default prefix match (DPM) search operation outside the multi-way tree (e.g., by accessing the database index table).

FIG. 18A is a flow diagram of operations 180 to dump a plurality of keys (and associated handles) from a selected pipelined database within an integrated circuit search engine device and then pass those keys to another device, such as a command host requesting the database contents from the search engine device. As illustrated, these operations 180 may include performing a "read this key" operation by searching the pipelined database with a smallest possible search key, which is illustrated as a default route key (e.g., 0/0, which represents a zero prefix length key (i.e., all masked bits)), Block 180a. These operations of Block 180a may be performed in accordance with the operations illustrated above with respect to FIGS. 17A-17C in the event the default route key for a selected database is maintained in a database index table. Alternatively, the "read this key" operation may include searching the pipelined database with a "starting point" key that is greater than the default route key. This starting point key may be designated by the command host in the event a sub-set of all keys (and associated handles) supported by the database is requested.

Referring now to Block 180b, a check is then made to determine whether the search detected a default route key (a/k/a default route prefix) within the database. If "yes", then the default route key (including prefix length) and associated handle may be read from the search engine device, Block 180c. Thereafter, a plurality of "read next key" operations are performed in a repeating sequence. These next key read operations include searching the pipelined database with, for example, a previously retrieved key, to thereby identify either zero, one or a plurality of next key candidates that are greater than the previously retrieved key, Block 180d. If the pipelined database has L levels, then one or more of the L search and tree maintenance sub-engines (see, e.g., sub-engine 102a", 102b", 102d" in FIG. 10D) within the search engine device may generate a respective next key candidate.

Then, as illustrated by Block 180e, a "next key fetch" operation may be performed to identify a next key from the next key candidate(s) identified in Block 180d. A check is made at Block 180f to see whether a next key has been identified from the next key candidate(s). If the check at Block 180f results in a "no" answer, then all remaining keys have been retrieved from the pipelined database and the read next key operations associated with a database key dump operation are completed. However, if the answer is "yes", then the identified next key (including prefix length indicator) and its associated handle are transferred to another device (e.g., command host). The steps illustrated by Blocks 180d-180g are then repeated, using the identified next key as the "previously retrieved key" in the subsequent cycle of operations. The steps illustrated by Blocks 180d-180g may be performed using first and second passes through the stages of a pipelined search engine device 100d, as described hereinbelow with respect to FIG. 10D. However, according to alternative embodiments of the present invention, the search engine device 100d may also be configured so that the operations illustrated by Blocks 180d-180g may be performed by making only a single pass through the pipelined stages (e.g., 102a", 102b", 102c" and 102d"). According to these embodiments of the invention, the passing of the previously retrieved key through each stage of the pipelined search engine may be performed concurrently with operations to pass a next key candidate, if any, to each lower stage and then resolve the next key at the final stage of the pipeline (e.g., LEVEL_L in FIG. 10D).

Figure 18B:
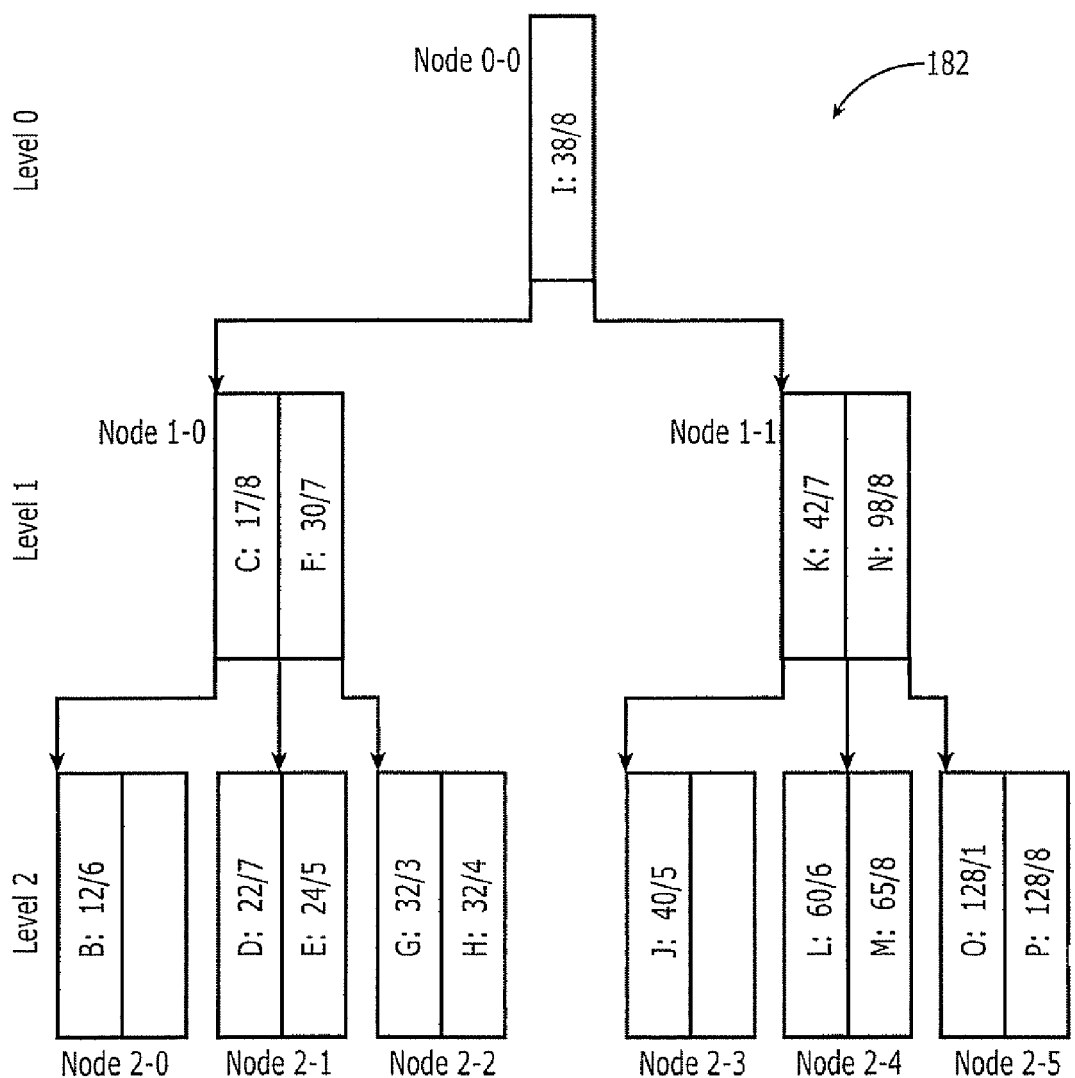
FIG. 18B is a three-level b-tree data structure that contains the database of search prefixes illustrated by TABLE 7.

The operations described above with respect to FIG. 18A may also be highlighted with reference to TABLE 7 and the corresponding three-level b-tree data structure 182 of FIG. 18B. This table and b-tree data structure 182 illustrate the contents of an exemplary 3-level database containing 16 (8-bit) keys within a pipelined search engine device, such as the search engine device 100d illustrated by FIG. 10D. As illustrated by TABLE 7 and FIG. 18B, the database contains a root node at LEVEL 0, which supports a single key (38/8), two nodes (1-0, 1-1) at LEVEL 1, which support two keys per node, and six leaf nodes (2-0, 2-1, 2-2, 2-3, 2-4 and 2-5) at LEVEL 2. The arrangement of these nodes is similar to the arrangement of nodes shown in the b-tree of FIG. 17B.

TABLE 7

| KEY NO. | KEY | HANDLE | LEVEL | NODE |
|---|---|---|---|---|
| 1 | 0/0 | A | — | — |
| 2 | 12/6 | B | 2 | 2-0 |
| 3 | 17/8 | C | 1 | 1-0 |
| 4 | 22/7 | D | 2 | 2-1 |
| 5 | 24/5 | E | 2 | 2-1 |
| 6 | 30/7 | F | 1 | 1-0 |
| 7 | 32/3 | G | 2 | 2-2 |
| 8 | 32/4 | H | 2 | 2-2 |
| 9 | 38/8 | I | 0 | 0-0 |
| 10 | 40/5 | J | 2 | 2-3 |
| 11 | 42/7 | K | 1 | 1-1 |
| 12 | 60/6 | L | 2 | 2-4 |
| 13 | 65/8 | M | 2 | 2-4 |
| 14 | 98/8 | N | 1 | 1-1 |
| 15 | 128/1 | O | 2 | 2-5 |
| 16 | 128/8 | P | 2 | 2-5 |

Referring now to FIGS. 18A-18B and TABLE 7, the search engine device may perform a key dumping operation by initially performing a "read this key" operation using the default route key (i.e., 0/0) as a "starting point" search key, which may be specified by an external device (e.g., command host). Because the 3-level database of TABLE 7 and FIG. 18B contains a default route key, which may be maintained in a database index table (see, e.g., FIG. 17A), the default route key and its corresponding handle A are retrieved from the search engine device and passed to an external device (e.g., command host). As illustrated by Block 180d in FIG. 18A, the default route key is also used as a search key during a first "read next key" operation. This operation results in the identification of three next key candidates: key 38/8 at LEVEL 0, key 17/8 at LEVEL 1 and key 12/6 at LEVEL 2. Each of these candidates represents a next larger key (at a respective level) within a traversal path of the search key. A next key fetch operation is then performed, which yields key 12/6 as the smallest of the three next key candidates and its corresponding handle B. Key 12/6 and handle B are then passed from the search engine device to the external device, as illustrated by Block 180g of FIG. 18A.

Referring again to Block 180d, the key 12/6, which is now the previously retrieved key, is then used as a search key during a second "read next key" operation to identify one or more next key candidates. This search operation results in the identification of two next key candidates: key 38/8 at LEVEL 0 and key 17/8 at LEVEL 1. A next key fetch operation is then performed, which yields key 17/8 as the smallest of the two next key candidates and its corresponding handle C. Key 17/8 and handle C are then passed from the search engine device to the external device, as illustrated by Block 180g of FIG. 18A.

Referring again to Block 180d, the key 17/8, which is now the previously retrieved key, is then used as a search key during a third "read next key" operation to identify one or more next key candidates that are greater than the previously retrieved key. This search operation results in the identification of three next key candidates: key 38/8 at LEVEL 0, key 30/7 at LEVEL 1 and key 22/7 at LEVEL 2. A next key fetch operation is then performed, which yields key 22/7 as the smallest of the three next key candidates and its corresponding handle D. Key 22/7 and handle D are then passed from the search engine device to the external device, as illustrated by Block 180g of FIG. 18A.

The key 22/7, which is now the previously retrieved key, is then used as a search key during a fourth "read next key" operation to identify one or more next key candidates. This search operation results in the identification of three next key candidates: key 38/8 at LEVEL 0, key 30/7 at LEVEL 1 and key 24/5 at LEVEL 2. A next key fetch operation is then performed, which yields key 24/5 as the smallest of the three next key candidates and its corresponding handle E. Key 24/5 and handle E are then passed from the search engine device.

The key 24/5, which is now the previously retrieved key, is then used as a search key during a fifth "read next key" operation to identify one or more next key candidates. This search operation results in the identification of two next key candidates: key 38/8 at LEVEL 0 and key 30/7 at LEVEL 1. A next key fetch operation is then performed, which yields key 30/7 as the smallest of the two next key candidates and its corresponding handle F. Key 30/7 and handle F are then passed from the search engine device to the external device.

The key 30/7, which is now the previously retrieved key, is then used as a search key during a sixth "read next key" operation to identify one or more next key candidates that are greater than the previously retrieved key. This search operation results in the identification of two next key candidates: key 38/8 at LEVEL 0 and key 32/3 at LEVEL 2. A next key fetch operation is then performed, which yields key 32/3 as the smallest of the two next key candidates and its corresponding handle G. Key 32/3 and handle G are then passed from the search engine device to the external device.

The key 32/3, which is now the previously retrieved key, is then used as a search key during a "read next key" operation to identify one or more next key candidates that are greater than the previously retrieved key. This search operation results in the identification of two next key candidates: key 38/8 at LEVEL 0 and key 32/4 at LEVEL 2. A next key fetch operation is then performed, which yields key 32/4 as the smallest of the two next key candidates and its corresponding handle H. Key 32/4 and handle H are then passed from the search engine device to the external device.

The key 32/4, which is now the previously retrieved key, is then used as a search key during a "read next key" operation to identify one or more next key candidates that are greater than the previously retrieved key. This search operation results in the identification of only one next key candidate: key 38/8 at LEVEL 0. A next key fetch operation is then performed, which yields key 38/8 as the next key and its corresponding handle I. Key 38/8 and handle I are then passed from the search engine device to the external device.

The key 38/8, which is now the previously retrieved key, is then used as a search key during a "read next key" operation to identify one or more next key candidates that are greater than the previously retrieved key. This search operation results in the identification of two next key candidates: key 42/7 at LEVEL 1 and key 40/5 at LEVEL 2. A next key fetch operation is then performed, which yields key 40/5 as the next key and its corresponding handle J. Key 40/5 and handle J are then passed from the search engine device to the external device.

The key 40/5, which is now the previously retrieved key, is then used as a search key during a "read next key" operation to identify one or more next key candidates that are greater than the previously retrieved key. This search operation results in the identification of one next key candidate: key 42/7 at LEVEL 1. A next key fetch operation is then performed, which yields key 42/7 as the next key and its corresponding handle K. Key 42/7 and handle K are then passed from the search engine device to the external device.

The key 42/7, which is now the previously retrieved key, is then used as a search key during a "read next key" operation to identify one or more next key candidates that are greater than the previously retrieved key. This search operation results in the identification of two next key candidates: key 98/8 at LEVEL 1 and key 60/6 at LEVEL 2. A next key fetch operation is then performed, which yields key 60/6 as the next key and its corresponding handle L. Key 60/6 and handle L are then passed from the search engine device to the external device.

The key 60/6, which is now the previously retrieved key, is then used as a search key during a "read next key" operation to identify one or more next key candidates that are greater than the previously retrieved key. This search operation results in the identification of two next key candidates: key 98/8 at LEVEL 1 and key 65/8 at LEVEL 2. A next key fetch operation is then performed, which yields key 65/8 as the next key and its corresponding handle M. Key 65/8 and handle M are then passed from the search engine device to the external device.

The key 65/8, which is now the previously retrieved key, is then used as a search key during a "read next key" operation to identify one or more next key candidates that are greater than the previously retrieved key. This search operation results in the identification of one next key candidate: key 98/8 at LEVEL 1. A next key fetch operation is then performed, which yields key 98/8 as the next key and its corresponding handle N. Key 98/8 and handle N are then passed from the search engine device to the external device.

The key 98/8, which is now the previously retrieved key, is then used as a search key during a "read next key" operation to identify one or more next key candidates that are greater than the previously retrieved key. This search operation results in the identification of one next key candidate: key 128/1 at LEVEL 2. A next key fetch operation is then performed, which yields key 128/1 as the next key and its corresponding handle O. Key 128/1 and handle O are then passed from the search engine device to the external device.

The key 128/1, which is now the previously retrieved key, is then used as a search key during a "read next key" operation to identify one or more next key candidates that are greater than the previously retrieved key. This search operation results in the identification of one next key candidate: key 128/8 at LEVEL 2. A next key fetch operation is then performed, which yields key 128/8 as the next key and its corresponding handle P. Key 128/8 and handle P are then passed from the search engine device to the external device.

The key 128/8, which is now the previously retrieved key, is then used as a search key during a "read next key" operation to identify one or more next key candidates that are greater than the previously retrieved key. Because this search operation results in the identification of no next key candidates, the next key read operations are completed and the external device may be notified that the entire contents of the database have been retrieved.

The operations described above with respect to FIGS. 18A-18B and TABLE 7 may be further described with respect to the pipelined integrated circuit search engine 100d of FIG. 10D. This search engine 100d, which includes the pipelined arrangement of sub-engines illustrated by the search engine 100c of FIG. 10C, further includes a maintenance engine controller 122. This maintenance engine controller 122 may commence a "read this key" operation by issuing a key read request and corresponding key to the search and tree maintenance sub-engine 102a" via a lookup core maintenance request interface E. The sub-engine 102a" responds to the key read request, which is subordinate to other higher priority operations, by waiting for an idle cycle(s) before commencing the key read operation and placing the key to be read into the pipeline control and search logic and search pipeline, which includes the internal lookup core pipeline interface F. Each level (LEVEL_1-LEVEL_L) of the search engine 100d and the handle memory lookup engine 110' performs key read operations. In particular, the handle memory lookup engine 110' receives the key read request on interface F and, depending on whether a valid match was found or not, reads the associated handle from the handle memory 115'. The handle memory lookup engine 110' outputs the key (including a prefix length indicator) and associated handle to the maintenance engine controller 122 via the maintenance key read reply interface S (along with an indication of whether the desired key was found or not).

The maintenance engine controller 122 may then perform a read next key operation by issuing a read next key request and associated key (e.g., previously retrieved key) to the LEVEL_1 search and tree maintenance sub-engine 102a" via interface E. The pipeline control and search logic 103a" at LEVEL_1 waits for a necessary idle cycle(s) and then inserts a "first pass" command as a next key search command into the forward pipeline along with the search key received from the maintenance engine controller 122. In response to this first pass command, each level (LEVEL_1-LEVEL_L) of the search engine 100d does a search to identify a smallest key at each level that is just larger than the search key. Completion of the "first pass" operations is communicated back to the LEVEL_1 sub-engine 102a" via the lookup core maintenance ready interface K. In particular, the LEVEL_L sub-engine 102d" may store the results of its search for the next larger key relative to the search key (i.e., a level L next key candidate), if any, in corresponding flip-flops and then pass a maintenance ready message upstream through the pipeline on interface K. Likewise, the LEVEL_3 sub-engine 102c" may store the results of its search for the next larger key relative to the search key (i.e., a level 3 next key candidate), if any, in corresponding flip-flops and then pass a maintenance ready message upstream on interface K only after receiving a ready message from the immediately next lower sub-engine. The LEVEL_2 sub-engine 102b" may store the results of its search for the next larger key relative to the search key (i.e., a level 2 next key candidate), if any, in corresponding flip-flops and then pass a maintenance ready message upstream on interface K to the LEVEL_1 sub-engine 102a" only after receiving a ready message from the LEVEL_3 sub-engine 102c".

Upon receipt of a maintenance ready message associated with the first pass operations on interface K, the LEVEL_1 sub-engine 102a" again waits for a necessary idle cycle(s) to commence "second pass" operations by inserting a "next key fetch" command into the pipeline. In response to this command, each sub-engine outputs (e.g., on interface F) it's smallest key candidate stored in flip-flops and passes this candidate key to the next lower level sub-engine. Accordingly, if the LEVEL_1 sub-engine 102a" has a valid next key candidate stored within its flip-flops, then the sub-engine 102a" passes this "first level" candidate to the LEVEL_2 sub-engine 102b". This "first level" candidate will then be passed from the LEVEL_2 sub-engine 102b" to the LEVEL_3 sub-engine 102c" only if the LEVEL_2 sub-engine 102b" does not have a valid next key candidate stored within its flip-flops. If the LEVEL_2 sub-engine 102b" has a valid next key candidate, then the LEVEL_2 sub-engine 102b" will update the "first level" candidate by dropping it and passing its "second level" candidate to the LEVEL_3 sub-engine 102c". This sequence of operations continues through the pipeline until the LEVEL_L sub-engine 102d" checks its flip-flops for the presence of a valid next key candidate. Thus, as described herein, the lowest level sub-engine to update the next key candidate is the level that had the next larger key in the database during the "first pass" operations. Accordingly, at the end of the second pass operations, the LEVEL_L sub-engine 102d" passes the next key on interface F to the handle memory lookup engine 110'. In response, the handle memory lookup engine 110' outputs the next key (including prefix length indicator) and associated handle to the maintenance engine controller 122 on interface S. The maintenance engine controller 122 may then report the results (next key and handle) to the external device (e.g., command host) responsible for issuing the database dump command(s) and then seek the next key in the database by issuing another "read next key" request on interface E. According to alternative embodiments of the invention, the operations described above may be performed in a reverse-order sequence by repeatedly seeking the next smaller key within the database instead of repeatedly seeking the next larger key within the database as described herein. In such alternative embodiments, the first key specified during a "read this key" operation may be a fully-specified key containing all logic 1 bits.

The pipelined integrated circuit search engine 100d of FIG. 10D is also configured to perform database flush operations in response to a database flush command. In particular, the maintenance engine controller 122 may receive a register write instruction from an external device (e.g., command host) to its flush control register (FCR) 124, which operates as a request to flush all keys from a logical database specified in the FCR 124. In response to this register write instruction, the controller 122 clears a corresponding DONE bit within a flush status register (FSR) 123 and issues the database flush command (DB_FLUSH) and the specified logical database over the lookup core maintenance request interface E to the LEVEL_1 sub-engine 102a". Among other things, the LEVEL_1 sub-engine 102a" waits for an idle cycle(s) and then forwards the database flush command and the specified logical database to the LEVEL_2 sub-engine 102b" via the internal pipeline interface F. Similarly, the LEVEL_2 sub-engine 102b" forwards the database flush command and the specified logical database to the LEVEL_3 sub-engine 102c" and these forwarding operations continue until the LEVEL_L sub-engine 102d" receives the database flush command and the specified logical database. Moreover, as illustrated by FIGS. 15A and 17A, the LEVEL_1 sub-engine 102a" will update its database index table (associated with a combined root node) by resetting the DB_VALID entry (and the other entries in the same row) associated with the specified database to thereby reflect the removal of the specified database from the search engine 100d.

Furthermore, the pipeline control and search logic 103d" within the LEVEL_L sub-engine 102d" receives the database flush command for the specified logical database and forwards the flush command to its node maintenance sub-engine 107d", which passes the flush command on the LLM_B interface to a node access list manager 108d. The node access list manager 108d processes the flush command by reading through all node locations in a node access list 109d (accessed via interface LLM_A) and for those assigned to the specified logical database it returns the node to the free list by updating the node access list 109d accordingly. These operations, which effectively flush all keys stored for the specified logical database from LEVEL_L and makes all resources assigned to the logical database available for future use, are performed essentially as background operations which do not further limit a search bandwidth of the search engine device 100d by utilizing additional cycles and resources associated with the lookup core internal pipeline interface F. Upon updating the node access list 109d, the node access list manager 108d gives a done indication to the node maintenance sub-engine 107d" via the interface LLM_B. In response, the LEVEL_L node maintenance sub-engine 107d" sends a maintenance ready message on interface K to the next higher level sub-engine in the pipeline.

The pipeline control and search logic 103c" within the LEVEL_3 sub-engine 102c", which previously received the database flush command for the specified logical database, forwards the flush command to its node maintenance sub-engine 107c", which passes the flush command on the L3M_B interface to a node access list manager 108c. The node access list manager 108c processes the flush command by reading through all node locations in a node access list 109c (accessed via interface L3M_A) and for those assigned to the specified logical database it returns the node to the free list by updating the node access list 109c accordingly. These operations, which effectively flush all keys stored for the specified logical database from LEVEL_3 and makes all resources assigned to the logical database available for future use, are performed essentially as background operations which do not further limit a search bandwidth of the search engine device 100d by utilizing additional cycles and resources associated with the lookup core internal pipeline interface F. Upon updating the node access list 109c, the node access list manager 108c gives a done indication to the node maintenance sub-engine 107c" via the interface LL3_B. In response to this done indication and a receipt of a maintenance ready message received from the next lower level in the pipeline, the LEVEL_3 node maintenance sub-engine 107c" sends a maintenance ready message on interface K to the LEVEL_2 sub-engine 102b".

The pipeline control and search logic 103b" within the LEVEL_2 sub-engine 102b", which previously received the database flush command for the specified logical database, forwards the flush command to its node maintenance sub-engine 107b", which passes the flush command on the L2M_B interface to a node access list manager 108b. The node access list manager 108b processes the flush command by reading through all node locations in a node access list 109b (accessed via interface L2M_A) and for those assigned to the specified logical database it returns the node to the free list by updating the node access list 108b accordingly. These operations, which effectively flush all keys stored for the specified logical database from LEVEL_2 and makes all resources assigned to the logical database available for future use, are performed essentially as background operations which do not further limit a search bandwidth of the search engine device 100d by utilizing additional cycles and resources associated with the lookup core internal pipeline interface F. Upon updating the node access list 108b, the node access list manager 109b gives a done indication to the node maintenance sub-engine 107b" via the interface LL2_B. In response to this done indication and a receipt of a maintenance ready message received from the next lower LEVEL_3 sub-engine 102c", the LEVEL_2 node maintenance sub-engine 107b" sends a maintenance ready message on interface K to the LEVEL_1 sub-engine 102a".

The pipeline control and search logic 103a" within the LEVEL_1 sub-engine 102a", which previously received the database flush command for the specified logical database, forwards the flush command to its node maintenance sub-engine 107a", which passes the flush command on the L1M_B interface to a node access list manager 108a. The node access list manager 108a processes the flush command by reading through all node locations in a node access list 109a (accessed via interface L1M_A) and for those assigned to the specified logical database it returns the node to the free list by updating the node access list 109a accordingly. These operations, which effectively flush all keys stored for the specified logical database from LEVEL_1 and makes all resources assigned to the logical database available for future use, are performed essentially as background operations which do not further limit a search bandwidth of the search engine device 100d by utilizing additional cycles and resources associated with the lookup core internal pipeline interface F.

Upon updating the node access list 109a, the node access list manager 108a gives a done indication to the node maintenance sub-engine 107a" via the interface LL1_B. In response to this done indication and a receipt of a maintenance ready message received from the next lower LEVEL_2 sub-engine 102b", the LEVEL_1 sub-engine 102a" issues a done message to the maintenance engine controller 122 on the lookup core maintenance acknowledgment interface L. This done message indicates that the database flush operations have been completed across all levels of the pipeline. In response to the done message, the maintenance engine controller 122 sets the corresponding done bit in the flush status register 123. The contents of this flush status register 123 may be communicated to the external device that issued the original request to perform a database flush operation in order to confirm deletion of the selected database from the search engine 100d.

These database flush operations described above with respect to FIG. 10D contrast with alternative flush operations that may not require the use of additional node access list storage 109a-109d. In particular, alternative database flush operations may eliminate the need to manage separate node access list storage by relatively heavily utilizing the resources of the lookup core internal pipeline interface F to perform recursive "tree-walk" operations that sequentially remove pointers to nodes of a selected database at each of the levels (LEVEL_1 to LEVEL_L) of the search engine using downstream and upstream communications. These operations may include initially visiting the root node of a selected database at LEVEL_1 to identify a first child pointer to a lower level node at LEVEL_2. The corresponding lower level node at LEVEL_2 is then visited to identify a second child pointer to yet another node at LEVEL_3 and the first child pointer is deleted. Similarly, the corresponding node at LEVEL_3 is visited to identify a third child pointer to a lower level node and the second child pointer is deleted. These downstream operations continue until a first leaf node is identified. The child pointer associated with this first leaf node is deleted and an upstream operation is then performed to revisit the node containing the now deleted pointer to the first leaf node. Another child pointer associated with this node, if any, is then identified and followed in a downstream direction to the next lower level in the pipeline. These downstream operations continue until a next leaf node is encountered. At this time, a repeating sequence of alternating upstream and downstream operations are performed until all lower level nodes containing pointers are visited and the root node is revisited. Upon revisiting the root node, another child pointer, if any, is identified and the recursive "walk" through the nodes of the selected database continues until all child pointers associate with the selected database to be flushed have been deleted and the root node freed.

in the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of operating a search engine device, comprising:
evaluating a span prefix mask for a key residing at a leaf parent level of a search tree, maintained in a hierarchical memory of the search engine device, to identify a prefix match to an applied search key that resides at a leaf node of the search tree that is outside a search path of the search tree for the applied search key; and
reading a bitmap associated with the leaf node from the memory to identify a pointer to associated data for the prefix match, said pointer having a value that is based on a position of a set bit within the bitmap that corresponds to a set bit within the span prefix mask that signifies the prefix match.

2. The method of claim 1, wherein said reading a bitmap is followed by reading a handle for the prefix match from a handle memory in the event the prefix match is a longest prefix match that resides outside the search path of the search tree for the applied search key.

3. The method of claim 1, wherein a width of the bitmap is equivalent to a prefix capacity of the leaf node.

4. The method of claim 1, wherein the search engine device has a pipelined architecture; and wherein said reading a bitmap is followed by passing the pointer from a leaf parent level of the pipelined architecture to a leaf level of the pipelined architecture.

5. The method of claim 1, wherein the search engine device has a pipelined architecture, and wherein the memory is linked to a leaf level of the search engine device.

6. The method of claim 1, wherein the search engine device has a pipelined architecture, and wherein the memory is linked to a leaf parent level of the search engine device.

7. An integrated search engine device, comprising:
a pipelined arrangement of a plurality of search and tree maintenance sub-engines comprising a hierarchical memory configured to store a plurality of databases of keys therein arranged as a corresponding plurality of search trees that span multiple levels of the hierarchical memory, said plurality of search and tree maintenance sub-engines configured to:
evaluate a span prefix mask for a key residing at a leaf parent level of a search tree to identify a prefix match to an applied search key that resides at a leaf node of the search tree yet is outside a search path of the search tree for the applied search key; and
read a bitmap associated with the leaf node to identify a pointer to associated data for the prefix match, said pointer having a value that is based on a position of a set bit within the bitmap that corresponds to a set bit within the span prefix mask that signifies the prefix match.

8. The search engine device of claim 7, wherein the plurality of search and tree maintenance sub-engines are further configured to:
read a handle for the prefix match from a handle memory in the event the prefix match is a longest prefix match that resides outside the search path of the search tree for the applied search key.

9. The search engine device of claim 7, wherein a width of the bitmap is equivalent to a prefix capacity of the leaf node.

10. The search engine device of claim 7, wherein the plurality of search and tree maintenance sub-engines are further configured to:
pass the pointer from a leaf parent level of the pipelined arrangement to a leaf level of the pipelined architecture.

11. The search engine device of claim 7, wherein the memory is linked to a leaf level of the search engine device.

12. The search engine device of claim 7, wherein the memory is linked to a leaf parent level of the search engine device.

13. A search engine device, comprising:
means for evaluating a span prefix mask for a key residing at a leaf parent level of a search tree to identify a prefix match to an applied search key that resides at a leaf node of the search tree that is outside a search path of the search tree for the applied search key; and
means for reading a bitmap associated with the leaf node from a memory to identify a pointer to associated data for the prefix match, said pointer having a value that is based on a position of a set bit within the bitmap that corresponds to a set bit within the span prefix mask that signifies the prefix match.

14. The search engine device of claim 13, wherein the means for reading, following reading the bitmap, reads a handle for the prefix match from a handle memory in the event the prefix match is a longest prefix match that resides outside the search path of the search tree for the applied search key.

15. The search engine device of claim 13, wherein a width of the bitmap is equivalent to a prefix capacity of the leaf node.

16. The search engine device of claim 13, wherein the search engine device has a pipelined architecture, and wherein the means for reading the bitmap, following reading the bitmap, passes the pointer from a leaf parent level of the pipelined architecture to a leaf level of the pipelined architecture.

17. The search engine device of claim 13, wherein the search engine device has a pipelined architecture, and wherein the means for reading comprises means for reading a bitmap from a memory linked to a leaf level of the search engine device.

18. The search engine device of claim 13, wherein the search engine device has a pipelined architecture, and wherein the means for reading comprises means for reading a bitmap from a memory linked to a leaf parent level of the search engine device.

* * * * *